US005274775A

United States Patent [19]

Croson

[11] Patent Number: 5,274,775

[45] Date of Patent: Dec. 28, 1993

[54] PROCESS CONTROL APPARATUS FOR EXECUTING PROGRAM INSTRUCTIONS

[75] Inventor: Eddie B. Croson, Ojai, Calif.

[73] Assignee: The United States of America as represented by the Secretary of the Navy, Washington, D.C.

[21] Appl. No.: 644,809

[22] Filed: Jan. 22, 1991

[51] Int. Cl.[5] .......... G06F 9/06; G06F 9/30

[52] U.S. Cl. .......... 395/375; 395/250; 395/550; 395/800; 364/942.8; 364/944.7; 364/946.2; 364/947.1; 364/950.5; 364/DIG. 1; 364/DIG. 2

[58] Field of Search .......... 395/375, 400, 550, 500, 395/800, 250; 364/DIG. 1, DIG. 2, 942.8, 944.7, 946.2, 947.1, 950.5

[56] References Cited

U.S. PATENT DOCUMENTS 4,255,785 3/1981 Chamberlin .......... 395/375
4,393,469 7/1983 Boute .......... 364/900
4,875,160 10/1989 Brown, III .......... 395/375
5,041,969 8/1991 Kawasaki et al. .......... 395/375
5,153,822 10/1992 Yubazaki et al. .......... 364/140

*Primary Examiner*—Alyssa H. Bowler
*Assistant Examiner*—Dzung C. Nguyen
*Attorney, Agent, or Firm*—David S. Kalmbaugh; Melvin J. Sliwka

[57] ABSTRACT

A binary decision apparatus comprising a control unit which generates the binary decision apparatus' control signals from an operation code contained in the first byte of an instruction, a program counter which provides addressing for an external program memory, and a memory buffer register for holding digital instruction data provided by the external program memory. External control signals provided to the binary decision apparatus include a single phase system clock, a system reset signal and a wait signal that can be used to single-step the binary decision apparatus. Program instructions are provided from the external program memory to the binary decision apparatus via an eight-bit data bus, while an internal twelve-bit data bus routes digital information between the registers and counters of the binary decision apparatus. The binary decision apparatus of the present invention also includes an input register for receiving and then latching into the register external binary signals, an output register which is a bit or word address register that provides the digital logic output signals for the binary decision apparatus, a flag register in which status bits are stored and counters and registers for performing the counting and other functions/operations of the binary decision apparatus.

11 Claims, 14 Drawing Sheets

| TRUTH TABLE BDA DEVICE CODE ASSIGNMENTS | |
|---|---|
| CODE | DEVICE |
| 0 0 0 | COUNTER 44 |
| 0 0 1 | COUNTER 46 |
| 0 1 0 | REGISTER 40 |
| 0 1 1 | REGISTER 42 |
| 1 0 0 | OUTPUT REGISTER 34 |
| 1 0 1 | INPUT REGISTER 32 |
| 1 1 0 | TRANSIENT REGISTER 36 |
| 1 1 1 | PROGRAM COUNTER 26 |

| INSTRUCTION | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|
| | D7 | D6 | D5 | D4 | D3 | D2 | D1 | D0 | D7 | D6 | D5 | D4 | D3 | D2 | D1 | D0 | D7 | D6 | D5 | D4 | D3 | D2 | D1 | D0 |
| BR (addr) | 0 | 0 | 0 | 0 | A11 | A10 | A09 | A08 | A07 | A06 | A05 | A04 | A03 | A02 | A01 | A00 | | | | | | | | |
| BF (dev): (bit),(addr) | 0 | 0 | 0 | 1 | 0 | s2 | s1 | so | b3 | b2 | b1 | bo | A11 | A10 | A09 | A08 | A07 | A06 | A05 | A04 | A03 | A02 | A01 | A00 |
| BT (dev): (bit),(addr) | 0 | 0 | 0 | 1 | 1 | s2 | s1 | so | b3 | b2 | b1 | bo | A11 | A10 | A09 | A08 | A07 | A06 | A05 | A04 | A03 | A02 | A01 | A00 |
| BNZ0 (addr) | 0 | 0 | 1 | 0 | A11 | A10 | A09 | A08 | A07 | A06 | A05 | A04 | A03 | A02 | A01 | A00 | | | | | | | | |
| BNZ1 (addr) | 0 | 0 | 1 | 1 | A11 | A10 | A09 | A08 | A07 | A06 | A05 | A04 | A03 | A02 | A01 | A00 | | | | | | | | |
| BBT (addr) | 0 | 1 | 0 | 0 | A11 | A10 | A09 | A08 | A07 | A06 | A05 | A04 | A03 | A02 | A01 | A00 | | | | | | | | |
| SET (dest),(bit) | 0 | 1 | 0 | 1 | 0 | d2 | d1 | do | b3 | b2 | b1 | bo | 0 | 0 | 0 | 1 | | | | | | | | |
| RESET (dest),(bit) | 0 | 1 | 0 | 1 | 0 | d2 | d1 | do | b3 | b2 | b1 | bo | 0 | 0 | 0 | 0 | | | | | | | | |
| OUTB (bit),(value) | 0 | 1 | 1 | 0 | 0 | 0 | 0 | 0 | b3 | b2 | b1 | bo | 0 | 0 | 0 | 0,1 | | | | | | | | |
| CEF0 | 0 | 1 | 1 | 0 | 0 | 0 | 0 | 0 | 1 | 1 | 1 | 0 | 0 | 0 | 0 | 0 | | | | | | | | |
| CEF1 | 0 | 1 | 1 | 0 | 0 | 0 | 0 | 0 | 1 | 1 | 1 | 1 | 0 | 0 | 0 | 0 | | | | | | | | |
| OUTW (data) | 0 | 1 | 1 | 1 | d11 | d10 | d09 | d08 | d07 | d06 | d05 | d04 | d03 | d02 | d01 | d00 | | | | | | | | |
| DEC (counter) | 1 | 0 | 0 | 0 | 0 | 0 | 0 | ctr | | | | | | | | | | | | | | | | |
| SHR (counter) | 1 | 0 | 0 | 1 | 0 | 0 | 0 | ctr | | | | | | | | | | | | | | | | |
| TEST (dev),(bit) | 1 | 0 | 1 | 0 | 0 | s2 | s1 | so | b3 | b2 | b1 | bo | 0 | 0 | 0 | 0 | | | | | | | | |
| TEF0 | 1 | 0 | 1 | 0 | 0 | 1 | 0 | 1 | 1 | 1 | 1 | 0 | 0 | 0 | 0 | 0 | | | | | | | | |
| TEF1 | 1 | 0 | 1 | 0 | 0 | 1 | 0 | 1 | 1 | 1 | 1 | 1 | 0 | 0 | 0 | 0 | | | | | | | | |
| LD (dest),(sourct) | 1 | 0 | 1 | 1 | 0 | d2 | d1 | do | 0 | s2 | s1 | so | 0 | 0 | 0 | 0 | | | | | | | | |
| LD1 C0,(data) | 1 | 1 | 0 | 0 | d11 | d10 | d09 | d08 | d07 | d06 | d05 | d04 | d03 | d02 | d01 | d00 | | | | | | | | |
| LD1 C1,(data) | 1 | 1 | 0 | 1 | d11 | d10 | d09 | d08 | d07 | d06 | d05 | d04 | d03 | d02 | d01 | d00 | | | | | | | | |
| LD1 R0,(data) | 1 | 1 | 1 | 0 | d11 | d10 | d09 | d08 | d07 | d06 | d05 | d04 | d03 | d02 | d01 | d00 | | | | | | | | |
| LD1 R1,(data) | 1 | 1 | 1 | 1 | d11 | d10 | d09 | d08 | d07 | d06 | d05 | d04 | d03 | d02 | d01 | d00 | | | | | | | | |

*Fig. 2.*

PROCESS CONTROL APPARATUS FOR EXECUTING PROGRAM INSTRUCTIONS

BACKGROUND OF THE INVENTION

1. Field of the Invention

This invention relates generally to digital data processing apparatus. In particular, this invention relates to a process control apparatus for reading the condition of a selected variable and for generating a next instruction to be implemented based on the observed condition of the selected variable.

2. Description of the Prior Art

C. Y. Lee in his paper "Representations of Switching circuits by Binary Decision Programs" published in the Bell System Technical Journal of July, 1959, pages 985 to 999 described a binary decision program wherein the choice of the next instruction depends on the binary value of the input variable. For this purpose Lee created the following computer instruction:

T x; A,B where

T=Test x=Boolean variable

A,B=transfer addresses

Lee described the operation of the instruction as "if x is a logic zero then proceed to address A. Otherwise, go to address B." Lee then proceeded to show that a program can be composed of a sequence of instructions consisting only of conditional transfers and terminating in an output and that this binary decisions program can be created to solve any Boolean function.

Raymond T. G. Boute in his paper "The Binary-Decision Machine as a Programmable Controller", Euromico Newsletter, Vol 1, No. 2, 1976, pp. 16–22 described a binary decision apparatus designed to execute binary decision programs. Boute's binary decision machine is also the subject of U.S. Pat. No. 4,393,469 to Raymond T. G. Boute which issued Jul. 12, 1983. There is described therein a process control apparatus which reads the condition of a selected variable and generates a next instruction to be implemented based on the condition of the selected variable. The next instruction is that of reading one of two possible instructions, one of which causes the state of an output variable to be read and/or set and the other calls for reading the value of another selected input. In this manner, a program cycle is completed so that the values of all output variables can be set and read.

While Boute's process control apparatus was a significant departure from processor apparatus of the time and functions adequately to evaluate Boolean control problems as quickly as possible, Boute's process control apparatus has certain limitations which prevented this binary decision controller from being a fast and efficient means of controlling portions of entire robotic systems. Specifically, the invention of U.S. Pat. No. 4,393,469 does not provide for a system reset which would reset the components thereof to a known state and may have timing problems that are correctable by using external hardware. In addition, the invention of U.S. Pat. No. 4,393,469 assumes that the input variables are stable during the evaluation process, allows only a single bit to be output as opposed to a word, does not provide for the use of external event indicators and for the capability of using subroutines. Further, the invention of U.S. Pat. No. 4,393,469 does not provide for the need to count which is required by the majority of control problems such as the displacement of a stepping motor and does not provide for serial communications with external devices.

SUMMARY OF THE INVENTION

It is therefore an object of the present invention to provide a binary decision apparatus which is fast, simple and efficient and will preform a variety of robotic control tasks.

Another object of the present invention is to provide a binary decision apparatus which allows for serial communication with external devices.

A further object of the present invention is to provide a binary decision apparatus with external event indicators which indicate whether or not an external event occurs.

It is still another object of the present invention to provide a binary decision apparatus by which the outputs are both bit and word addressable.

Yet another object of the invention is to provide a binary decision apparatus which provides a means for holding digital data/information for processing at a later time.

It is yet another object of the present invention to provide a binary decision apparatus which provides for counting and detecting when a condition has been reached.

These and other objects of the invention are accomplished by a binary decision apparatus comprising a control unit which generates the binary decision apparatus' control signals from an operation code contained in the first byte of an instruction, a program counter which provides addressing for an external program memory, and a memory buffer register for holding digital instruction data provided by the external program memory. External digital control signals provided to the binary decision apparatus include a single phase system clock, a system reset signal and a wait signal that can be used to single-step the binary decision apparatus. Program instructions are provided from the external program memory to the binary decision apparatus via an eight bit data bus, while an internal twelve bit data bus routes digital information between the registers and counters of the binary decision apparatus. The binary decision apparatus of the present invention also includes an input register for receiving and then latching into the register external binary signals, an output register which is a bit or word address register that provides the digital logic output signals for the binary decision apparatus, a flag register in which status bits are stored and counters and registers for performing the counting and other functions/operations of the binary decision apparatus of the present invention.

BRIEF DESCRIPTION OF THE DRAWINGS

FIG. 2 is the instruction and operation code assignments for the binary decision apparatus;

DETAILED DESCRIPTION OF THE PREFERRED EMBODIMENT

Figures 1, 3:
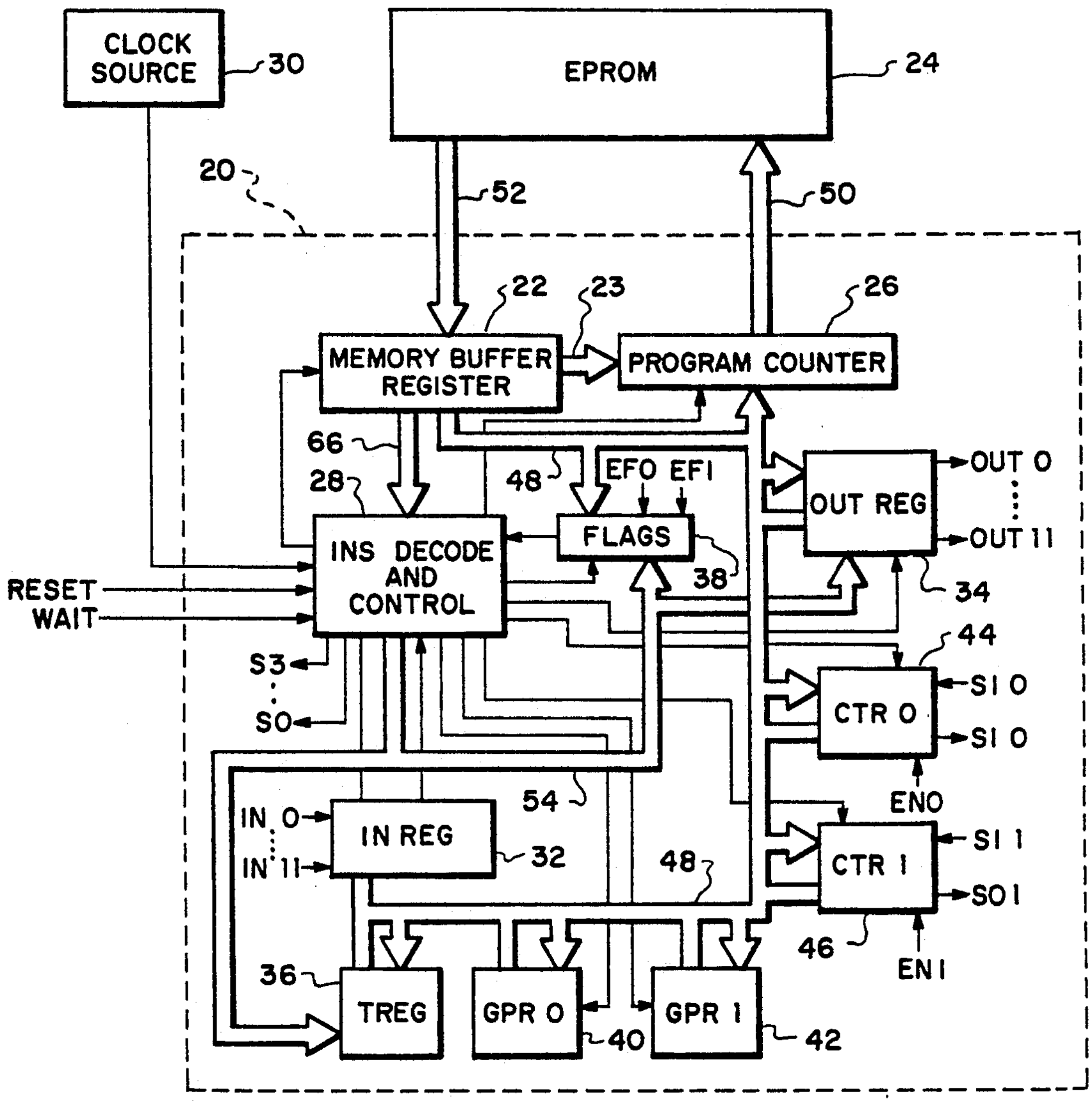
FIG. 1 is a block diagram of the binary decision apparatus constituting the present invention.
FIG. 3 is a truth table illustrating the binary codes assigned to the registers and counters of the present invention.

Referring first to FIG. 1, there is shown a binary decision apparatus 20 constituting the present invention. Binary decision apparatus 20 includes a memory buffer register 22 adapted to receive and hold therein the twenty-two basic operating instructions for the apparatus 20 from an erasable programmable read only memory 24 (EPROM), a twelve bit program counter 26 with parallel load capabilities which is used to provide addressing for EPROM 24, and an instruction decode and control unit 28 which provides the digital logic control for the binary decision apparatus by decoding an operation code contained in the first byte of an instruction code.

At this time it should be noted that the EPROM selected to provide the twenty-two basic operating instructions for the binary decision apparatus is a model TMS27C32-100 erasable programmable read only memory manufactured by Texas Instrument, although it should be understood that any commercially available read only memory or erasable programmable read only memory would suffice to hold operating instructions utilized by binary decision apparatus 20.

The system clock signal which is variable depending upon the particular application is a single phase clock provided by a source 30. The wait signal is an external logic signal provided through the wait input of apparatus 20, is active at a logic "1" state and is used to provide a pause to control unit 28 after the completion of an instruction. The reset signal is an external logic "0" signal provided through the reset input of apparatus 20 and is used to reset the components of apparatus 20 to known states.

Binary decision apparatus 20 also includes an input register 32 which allows a twelve bit external binary signal/word to be loaded into the register and then latched therein at the beginning of each instruction cycle, an output register 34 which is a bit or word addressable register that provides the output signals for apparatus 20 with each output signal having from one to twelve digital data bits, a transient register 36 which allows any bit in any register or counter of apparatus 20 to be set or reset except program counter 22 and input register 32, and a flag register 38 which has three one bit registers for storing status bits. A pair of general purpose registers 40 and 42 are provided for the storage of digital data. A pair of counter units 44 and 46 are also provided for preforming the counting function of binary decision apparatus 20 and for serial communication with external devices, not shown. Digital information is transferred between the counters and registers of binary decision apparatus 20 via a twelve bit data bus 48, while program counter 26 communicates with EPROM 24 via a twelve bit data bus 50 and program instruction bytes are provided to memory buffer register 22 from EPROM 24 via an eight bit data bus 52. There is also a four bit data bus 54 which connects instruction decode and control unit 28 to flag register 38 and output register 34.

Referring now to FIG. 2, there is shown the twenty-two basic instructions used to control the movement and manipulation of digital data in binary decision apparatus 20. In this figure, the first column defines the instruction, the second column defines the first byte, the third column defines the second byte and the fourth column defines the third byte. For example, when bits D4–D7 of the first byte are respectively 0, 0, 0, 0 the instruction is the branch instruction. It should also be noted that the first and sometimes second bytes of certain instructions specify a three bit source and/or destination code which are defined in the truth table of FIG. 3. For example, the load (LD) instruction may specify a destination of 0, 0, 1 (bits D2–D0 of byte one) which is counter 46 and a source of 0, 0, 0 (bits D6–D4 of byte two) which is counter 44. The following is a detailed description of the instructions for apparatus 20 with the number of memory bytes required for the instruction as well as the execution time in clock cycles.

The instruction "BR <addr>" requires binary decision apparatus 20 to unconditionally branch to the specified address. For example, the instruction BR 123 will cause program counter 22 to be set to the binary equivalent of 123. This instruction requires two eight bit bytes of digital information from EPROM 24 and also has an execution time of three clock cycles.

The instruction "BF <dev>:<bit>,<addr>" requires binary decision apparatus 20 to test the specified bit in the specified device and, if the bit is logic "0", branch to the specified address. Otherwise, binary decision apparatus 20 proceeds to the next instruction in sequence. The device can be any register or counter except program counter 26. For example, BF RO:3,123 means to test bit 3 in general purpose register 40 and branch to address 123 if bit 3 is "0". A special form of this instruction references the state of an event flag in flag register 38. This would have the form: BF EFn, <addr>, where n refers to an event flag 0 or 1 in flag register 38. This instruction requires three eight bit bytes of digital information from EPROM 24 and also has an execution time of 5 clock cycles.

The instruction BT <dev>:<bit>,<addr> requires binary decision apparatus 20 to test the specified bit in the specified device and if the specified bit is a logic "1" branch to the specified address. This instruction requires three eight bit bytes of digital information from EPROM 24, and also has an execution time of five clock cycles.

The instruction BNZO <addr> requires binary decision apparatus 20 to branch to the specified address if counter 44 is not zero, otherwise go onto the next instruction in sequence. BNZ1 <address> is the same except it refers to the state of counter 46. These instructions require two eight bit bytes of digital information from EPROM 24, and also has an execution time of four clock cycles.

The instruction SET <dest>,<bit> requires binary decision apparatus 20 to set the specified bit in the specified device to a logic "1". The device selected may not be program counter 26 or input register 32. The instruction requires two eight bit bytes of digital information from EPROM 24 and also has an execution time of four clock cycles.

The instruction RESET <dest>,<bit> requires binary decision apparatus 20 to reset the selected bit in the specified device to a logic "0". The device selected may not be program counter 26 or input register 32. The instruction requires two eight bit bytes of digital information from EPROM 24 and also has an execution time of four clock cycles.

The instruction OUTB <bit>,<value> requires binary decision apparatus 20 to set the selected bit in the output register 34 to the specified value ("0" or "1"). The actual value is contained in the least significant bit of the second byte of this instruction. No other bits in the output register 34 are affected by this instruction. The instruction requires two eight bit bytes of digital information from EPROM 24 and also has an execution time of four clock cycles.

The instruction CEFO requires binary decision apparatus 20 to clear an event flag 0 within flag register 38. CEF1 performs the same operation on an event flag 1 with flag register 38. The instruction requires two eight bit bytes of digital information from EPROM 24 and also has an execution time of four clock cycles.

The instruction OUTW <data> requires binary decision apparatus 20 to replace the contents of output register 34 with the twelve data bits (d00-d11) of the instruction specified as an operand. The instruction requires two eight bit bytes of digital information from EPROM 24 and also has an execution time of four clock cycles.

The instruction DEC <counter> requires binary decision apparatus 20 to decrement the specified counter which may be either counter 44 or 46. The instruction requires one eight bit byte of digital information from EPROM 24 and also has an execution time of two clock cycles.

The instruction SHR <counter> requires binary decision apparatus 20 to shift the specified counter 44 or 46 right one position. The instruction requires one eight bit byte of digital information from EPROM 24 and also has an execution time of two clock cycles.

The instruction TEST <dev>,<bit> requires binary decision apparatus 20 to set the test flag in flag register 38 to the state of the specified bit in the specified device. The device may not be program counter 26. Bits in the specified device are not altered. The instruction requires two eight bit bytes of digital information from EPROM 24 and also has an execution time of four clock cycles.

The instruction TEFO requires binary decision apparatus 20 to set the test flag in register 38 to the state of event flag 0. The event flag is not altered. TEF1 performs the same operation with event flag 1. The instruction requires two eight bit bytes of digital information from EPROM 24 and also has an execution time of four clock cycles.

The instruction LD <dest>,<source> requires binary decision apparatus 20 to replace the contents of the specified destination device with the contents of the specified source device. The contents of the source device remain unchanged. The destination device may not be the input register 32 and the source may not be the program counter 26. For example, LD PC,INR means to transfer the contents of the input register 32 to the program counter 26 (an input vectored branch). A "snapshot" of the input variables is done by: LD RO-,INR. The instruction requires two eight bit bytes of digital information from EPROM 24, and also has an execution time of four clock cycles.

The instruction LDI <dest>,<data> requires binary decision apparatus 20 to load immediate the specified device with the data (d00-d11) that is specified as part of the instruction. The destination is restricted to the general purpose registers 40 and 42 and counters 44 and 46. LDI C1,512, for instance, loads counter unit 46 with the value 512. The instruction requires two eight bit bytes of digital information from EPROM 24 and also has an execution time of four clock cycles.

Referring now to FIGS. 1, 4(A) to 4(D) there is shown a detailed electrical schematic diagram of memory buffer register 22 and instruction decode and control unit 28. Memory buffer register 22 includes a first eight bit latch 60 and a second eight bit latch 62 with each latch 60 and 62 comprising eight positive edge triggered D flip-flops, not illustrated. During the positive or logic "1" portion of the SO signal of FIG. 5(C) the first eight bit byte of an instruction is latch/stored in latch 60 by the mbrh (memory buffer register high) signal of FIG. 5(H). The outputs of latch 60 are, in turn, connected to the inputs of an eight bit instruction register 64 by an eight bit data bus 66. Eight bit instruction register 64 which comprises eight positive edge triggered D flip-flops (not illustrated) latches or stores the first eight bit byte of each instruction therein on the rising edge of the oclt (operation code latched) signal of FIG. 5(I) for decoding by an instruction decoding circuit 28.

At the same time program counter 26 is incremented by the pcinc (program counter increment) signal of FIG. 5(K) and thereby provide the next address to EPROM 24 for the next memory read by binary decision apparatus 20. The second byte of each instruction except DEC and SHR is then latched or stored in memory buffer register 22 during the S1 signal of FIG. 5(D). For the BR, BNZ0, BNZ1, BBT, SET, RESET, OUTB, CEF0, CEF1, OUTW, TEST, TEF0, TEF1, LD, LDI C0, LDI C1, LDI R0 and LDI R1 instructions the second byte is latched into eight bit latch 62 by the mbrl (memory buffer register low) signal provided by nand gate 190, FIG. 4. For the BT and BF instructions the second byte is latched into eight bit latch 60 by the mbrh illustrated in FIG. 5(H).

Program counter 22 is again incremented to either provide an address for the third byte of the BF or BT instructions when required or to proceed to the next instruction in sequence. The third byte of the BT or BF instruction is then latch or stored in latch 62 during the logic "1" portion of the S2A signal of FIG. 5(F) by the rising edge of the mbrl signal of FIG. 5(J).

Figure 4A:
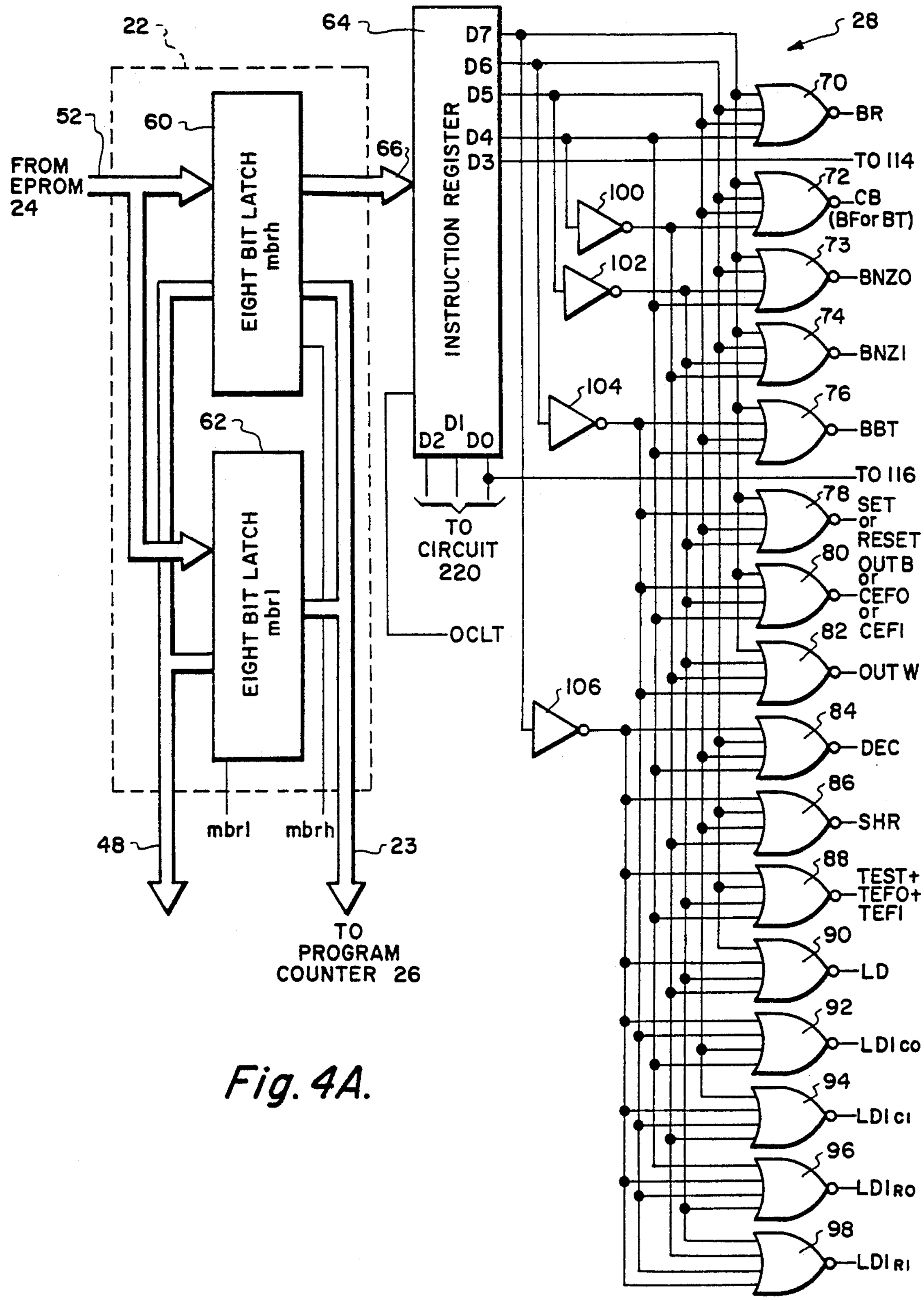
FIGS. 4(A), 4(B), 4(C), 4(D), 4(E), and 4(F) are detailed circuit diagrams of the instruction decode and control unit.
Figure 4B:
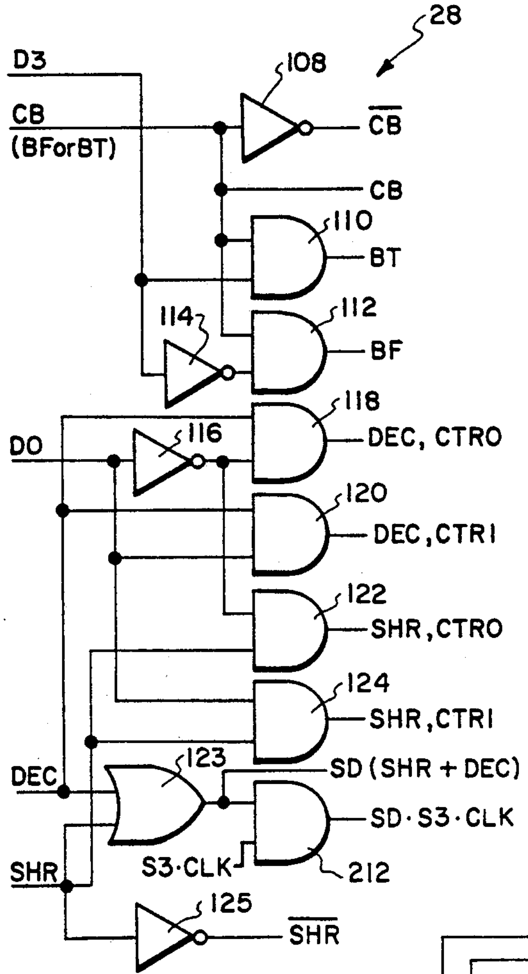

Referring to FIGS. 4(A) and 4(B) instruction decoding circuit 68 comprises sixteen four input nor gates 70–98 with each nor gate decoding one of the operation codes of binary decision apparatus 20, that is bits D4–D7 of the first byte of the twenty-two basic instructions of binary decision apparatus 20. For example, when the instruction is the BR instruction logic zeros are provided to the first, second, third and fourth inputs of nor gate 70 which results in the output of nor gate 70 being at the logic "1" state. Similarly, when the instruction is the LDI R1 instruction logic ones from the D4–D7 outputs of instruction register 64 are respectively provided through inverters 100, 102, 104, and 106 inverting the logic ones to logic zeros and then provided to the first, second, third and fourth inputs of nor gate 98 resulting in a logic "1" at the output of nor gate 98. The BF and BT instructions are decoded by nor gate 72 when logic zeros are provided from the D5–D7 outputs of instruction register 64 to the first, second and third inputs of nor gate 72 and a logic "1" is provided from the D4 output of instruction register 64 through invertor 100 which inverts the logic "1" to a logic "0" and then provides the logic "0" to the fourth input of nor gate 72. The output of nor gate 72 which is at the logic "1" state when binary decision apparatus 20 is processing the BT or BF instructions is, in turn, provided to the input of an invertor 108, the first input of a and gate 110 and the first input of an and gate 112. The output of invertor 108 is the $\overline{CB}$ (not conditional branch) signal which is active at the logic "0" state, while the output of nor gate 72 is the CB (conditional branch) signal which is active at the logic "1" state. When the D3 output of instruction register 64 is at the logic "1" state and the output of nor gate 72 is a logic "1" circuit 28 decodes the BT instruction resulting in a logic "1" at the output of and gate 110. Similarly, when the D3 output of instruction register 64 is a logic "0" which is then inverted by invertor 114 and the output of nor gate 72 is a logic "1" circuit 28 decodes the BF instruction resulting in a logic "1" at the output of and gate 112. When instruction decode circuit 68 decodes either a logic "1" at the output of nor gate 84 indicating a DEC instruction or the output of nor gate 86 indicating a SHR instruction, the output of or gate 123 provides a logic "1" which is the SD (shift decrement) signal.

When circuit 28 decodes the DEC instruction which results in the output of nor gate 84 going to a logic "1" state and the D0 output of instruction register 64 is a logic "0" which is then inverted by an invertor 116 the output of an and gate 118 goes to a logic "1" state resulting in the DEC CTRO signal being provided at the output of and gate 118. Similarly, when the output of nor gate 84 is a logic "1" and the D0 output of instruction register 64 is a logic "1" the output of an and gate 120 goes to a logic "1" state resulting in the DEC CTR1 signal being provided at the output of and gate 120.

When circuit 28 decodes the SHR instruction which results in the output of nor gate 86 going to a logic "1" state and the D0 output of instruction register 64 is a logic "0" which is then inverted by invertor 116 the output of an and gate 122 goes to a logic "1" state resulting in the SHR CTRO signal being provided at the output of and gate 122. Similarly, when the output of nor gate 86 is a logic "1" and the DO output of instruction register 64 is a logic "1" the output of an and gate 124 goes to a logic "1" state resulting in the SHR CTR1 signal being provided at the output of and gate 124. The output of an or gate 123 goes to a logic "1" state whenever the nor gate 84 or nor gate 86 is at a logic "1" state resulting in the SD (shift decrement) signal being provided at the output of or gate 123.

Figure 4F:
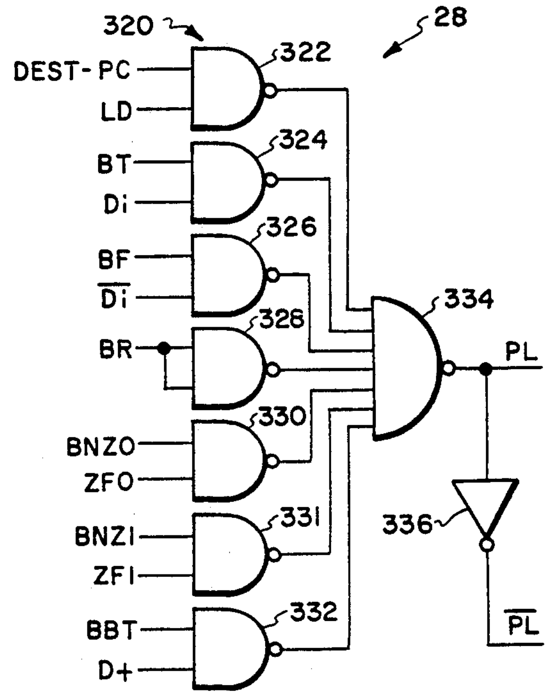
Figure 4E:
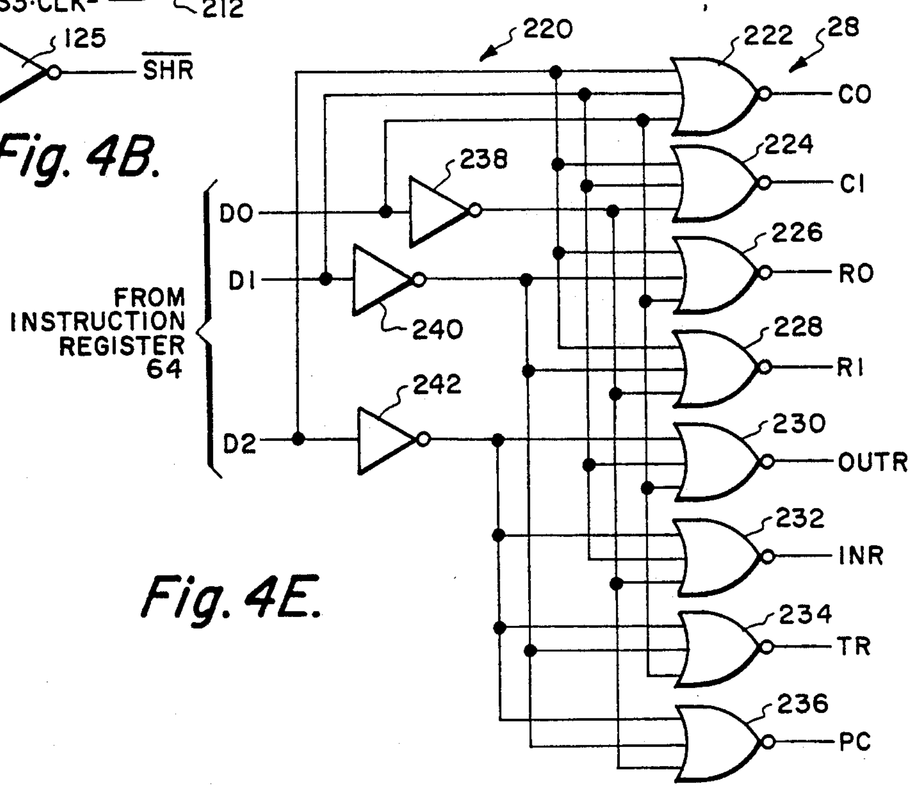
Figure 4C:
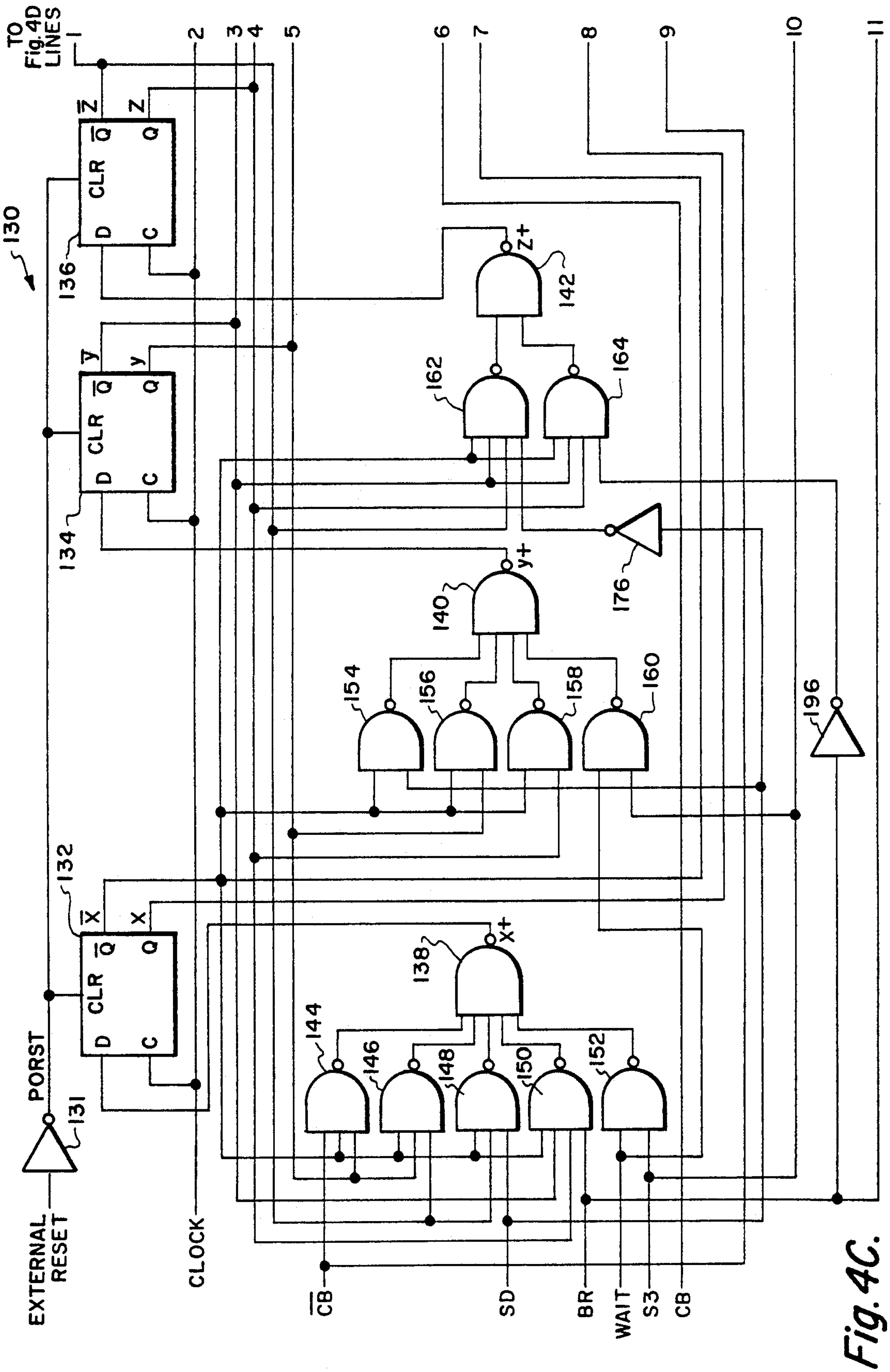
Figure 4D:
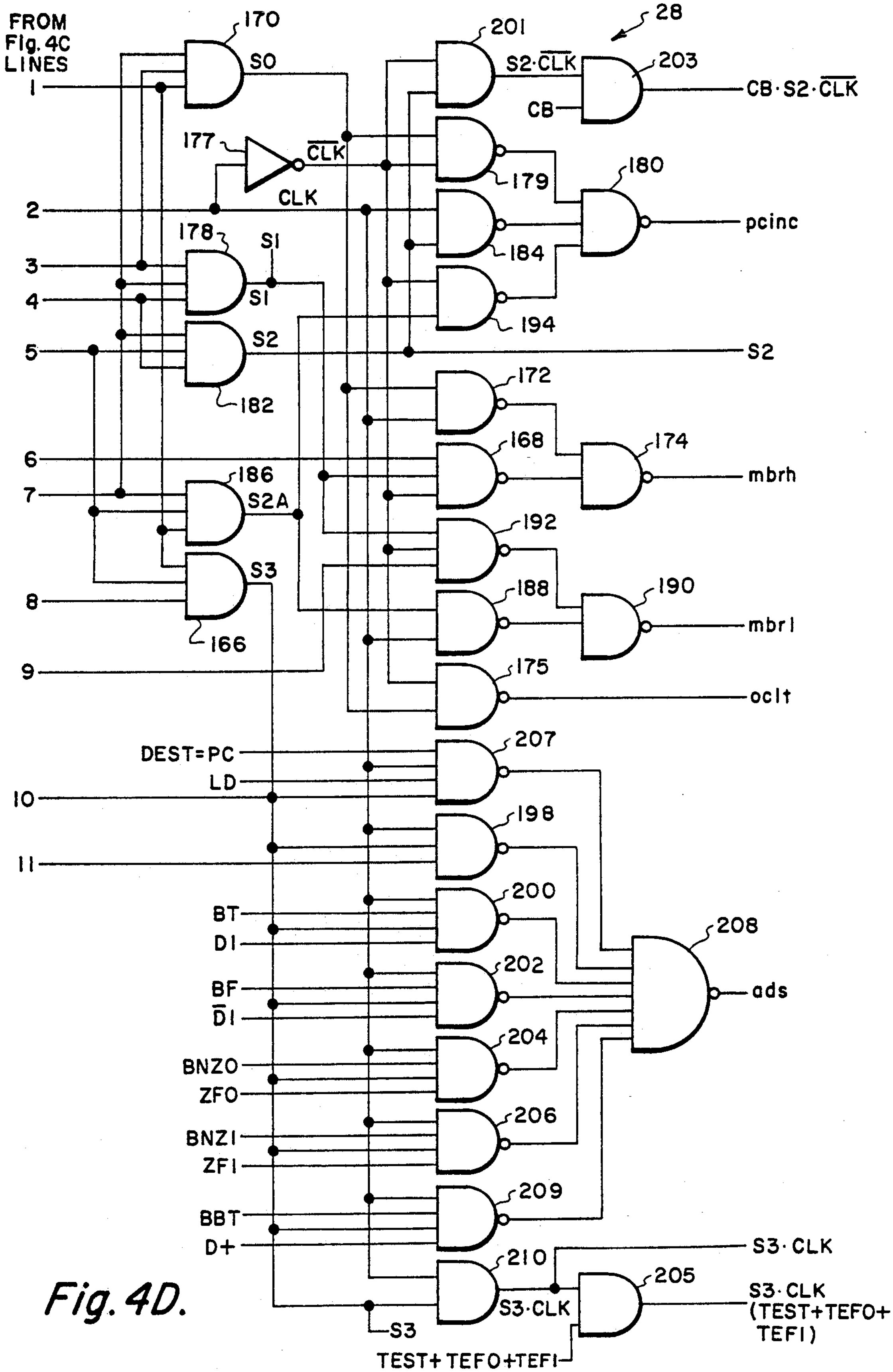

Referring to FIGS. 4(C) and 4(D) instruction decode and control unit 28 includes a machine cycle timing generator circuit 130 which generates the timing signals of FIG. 5(A)–5(L). Machine cycle timing generator circuit 130 comprises three positive edge triggered master slave D flip-flops 132, 134 and 136 and three nand gates 138, 140 and 142 having their outputs respectively connected to the D inputs of flip-flops 132, 134 and 136. The output of nand gate 138 provides the next state for flip-flop 132 and is expressed by the following equation:

$$X+=\overline{X}\cdot Y\cdot\overline{CB}+\overline{X}\cdot Y\cdot\overline{Z}+\overline{X}\cdot\overline{Z}\cdot SD+\overline{X}\cdot\overline{Y}\cdot Z\cdot BR+S3\cdot WAIT \quad (1)$$

The output of nand gate 140 provides the next state for flip-flop 134 and is expressed by the following equation:

$$Y+=\overline{X}\cdot SD+\overline{X}\cdot Y+\overline{X}\cdot Z+S3\cdot WAIT \quad (2)$$

The output of nand gate 142 provides the next state for flip-flop 136 and is expressed by the following equation:

$$Z+=\overline{X}\cdot\overline{Y}\cdot\overline{Z}\cdot\overline{SD}+\overline{X}\cdot\overline{Y}\cdot Z\cdot\overline{BR} \quad (3)$$

In each of the equations 1, 2 and 3 X+, Y+ and Z+ represent the next state of the flip-flop, X and $\overline{X}$ are respectively the Q and $\overline{Q}$ outputs of flip-flop 132, Y and $\overline{Y}$ are respectively the Q and $\overline{Q}$ outputs of flip-flop 134 and Z and $\overline{Z}$ are respectively the Q and $\overline{Q}$ outputs of flip-flop 136.

Referring again to FIGS. 4(C) and 4(D), the first, second, third, fourth and fifth inputs of nand gate 138 are respectively connected to the outputs of nand gates 144, 146, 148, 150 and 152 thereby forming an and or circuit, that is whenever the output of at least one of the nand gates 144–152 is at the logic "1" state the output of nand gate 138 will be at the logic "1" state. The first, second, third and fourth inputs of nand gate 140 are respectively connected to the outputs of nand gates 154, 156, 158 and 160 again forming an and or circuit, while the first and second inputs of nand gate 142 are respectively connected to the outputs of nand gates 162 and 164 thereby forming a third and or circuit.

Figure 5:
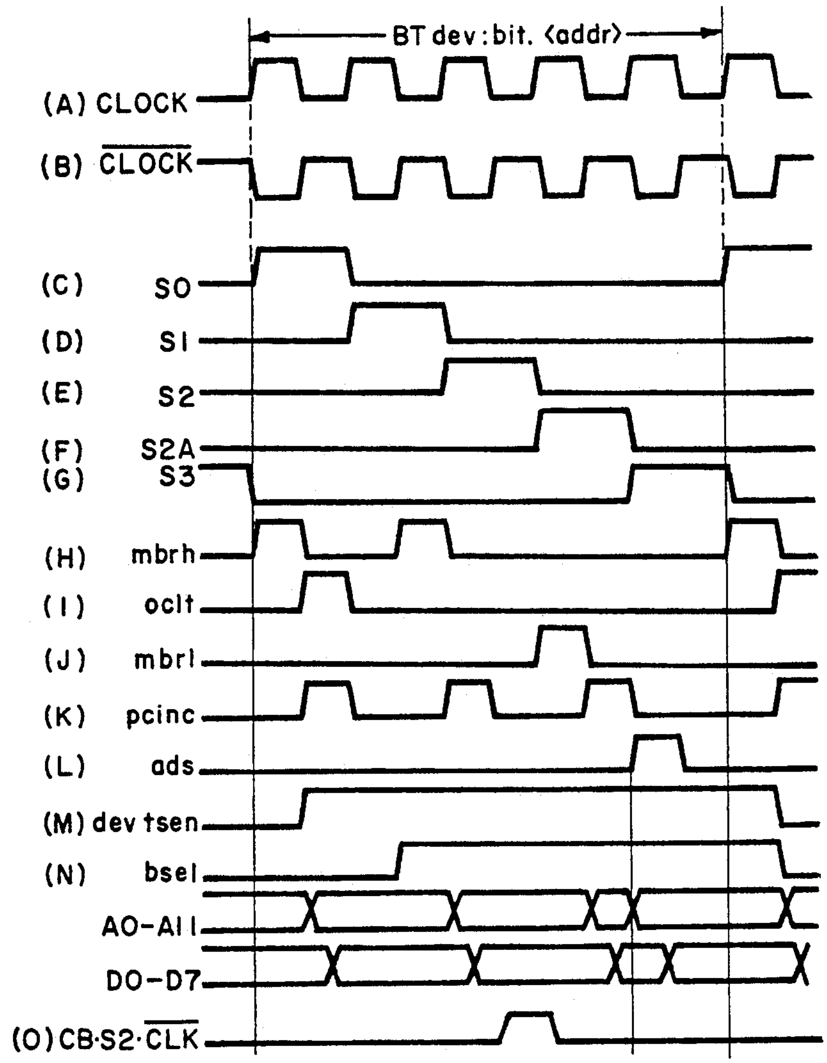
FIGS. 5(A), 5(B), 5(C), 5(D), 5(E), 5(F), 5(G), 5(H), 5(I), 5(J), 5(K), 5(L), 5(M), 5(N) are an illustration of the timing signals generated by the instruction and decode circuit for the Branch Transfer instruction.

Referring now to FIGS. 4(A) to 4(D) and FIG. 5, the S3 signal of FIG. 5(G) is the execute/final signal for each of the twenty-two basic instructions for the binary decision apparatus 20. As is best illustrated by the machine state diagram of FIG. 6, the S3 signal is defined as X, Y, Z being respectively 1, 1, 0, that is the Q outputs of flip-flops 132, 134 and 136 are respectively 1, 1, 0. This, in turn, results in the output of an and gate 166 being at a logic "1" state since the logic "1" at the Q output of flip-flop 132 is provide to the first input thereof, the logic "1" at the Q output of flip-flop 134 is provided to the second input thereof and the logic "1" at the $\overline{Q}$ output of flip-flop 136 is provided to the third input thereof.

Figure 6:
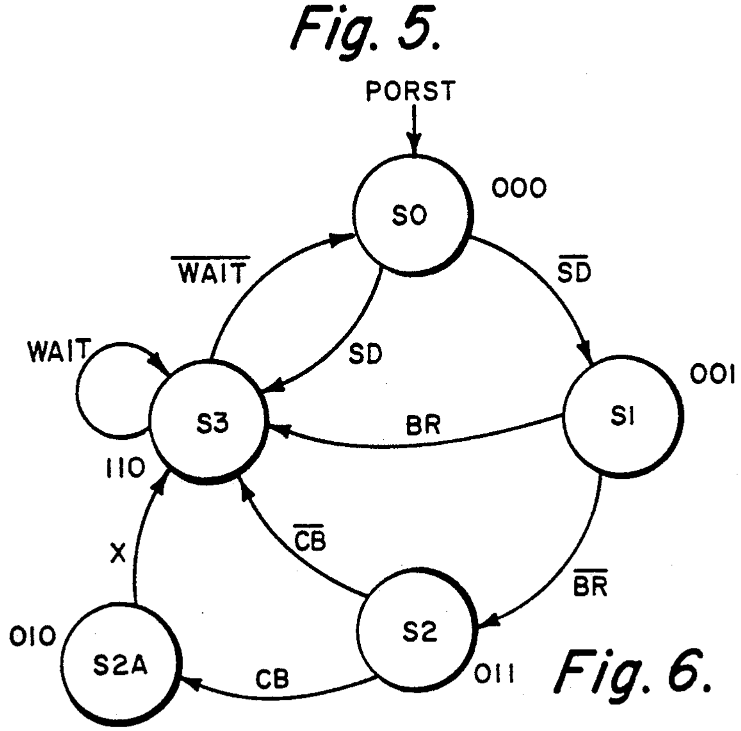
FIG. 6 is a state diagram illustrating the operation of the machine cycle timing generator circuit of FIG. 4(B)

For the purpose of illustrating the operation of machine cycle timing generator circuit 130 the following discussion will be with respect to the BT instruction illustrated in FIG. 5 which requires circuit 130 to generate the SO, S1, S2, S2A and S3 signals of FIG. 5 in order that binary decision apparatus 20 may execute this instruction. After binary decision apparatus 20 executes an instruction the wait input of circuit 130 will change from a logic "1" state to a logic "0" state as is best illustrated by FIG. 6. The Q outputs of flip-flops 132, 134 and 136 are still respectively 1, 1 and 0, while the $\overline{Q}$ outputs of flip-flops 132, 134 and 136 are still respectively 0, 0, 1.

The output of nand gate 144 remains at a logic "1" state since the $\overline{CB}$ input of circuit 130 is a logic "1", the $\overline{Q}$ output of flip-flop 132 is a logic "0" and the Q output of flip-flop 134 is a logic "1". The output of nand gate 146 also remains at a logic "1" state since the $\overline{Q}$ output of flip-flop 132 is a logic "0", the Q of flip-flop 134 is a logic "1" and the $\overline{Q}$ output of flip-flop 136 is a logic "1". In addition, the output of nand gate 148 remains at a logic "1" state since the SD input of circuit 130 is a logic "0", the $\overline{Q}$ output of flip-flop 132 is a logic "0" and the $\overline{Q}$ output of flip-flop 136 is a logic "0". Further, the output of nand gate 150 remains at a logic "1" state since the SD input of circuit 130 is a logic "0", the $\overline{Q}$ output of flip-flop 132 is a logic "0", the $\overline{Q}$ output of flip-flop 134 is a logic "0" and the Q output of flip-flop 136 is a logic "0". The output of nand gate 152 will however change from a logic "0" state to a logic "1" state since the wait signal changed from a logic "1" to a logic "0" and the S3 signal remained a logic "1". This, in turn, results in a logic "0" at the output of nand gate 138 which is the next state for flip-flop 132.

The output of nand gate 154 remains at a logic "1" state since the SD input of circuit 130 and the $\overline{Q}$ output of flip-flop 134 are at the logic "0" state. The output of nand gate 156 also remains at the logic "1" state since the $\overline{Q}$ output of flip-flop 132 is a logic "0" and the Q output of flip-flop 134 is a logic "1". Further, the output of nand gate 158 remains a logic "1" since the $\overline{Q}$ output of flip-flop 132 is a logic "0" and the Q output of flip-flop 136 is a logic "0". The output of nand gate 160 will however change from a logic "0" state to a logic "1" state since the wait signal changed from a logic "1" to a logic "0" and the S3 signal remained a logic "1". This, in turn, results in a logic "0" at the output of nand gate 140 which is the next state for flip-flop 134.

The output of nand gate 142 will remain at a logic "0" state since each of the inputs to nand gates 162 and 164 have not changed state.

After binary decision apparatus 20 executes the previous instruction, the leading edge of the first clock pulse of the clock signal of FIG. 5(A) will transfer the logic zeros at the D inputs of flip-flops 132, 134 and 136 to the Q outputs thereof and change the $\overline{Q}$ outputs of flip-flops 132, 134 and 136 to a logic "1". This, in turn, causes the output of and gate 170 to change from a logic "0" state to a logic "1" state, FIG. 5(C) and the output of and gate 166 to change from a logic "1" to a logic "0", FIG. 5(G). The logic "1" at the output of and gate 170 is supplied to the first input of a nand gate 172 while the clock signal of FIG. 5(A) is supplied to the second input of nand gate 172. The output of nand gate 168 is also a logic "1" since the CB signal is a logic "0". Since both the first input of nand gate 172 and the first input of nand gate 174 are at the logic "1" state the first clock pulse will pass through gates 172 and 174 resulting in the first pulse of the mbrh signal of FIG. 5(H). The leading edge of this mbrh pulse latches the first data byte of the BT instruction into the eight bit data latch 60 of memory buffer register 22.

The logic "1" at the output of and gate 170 is also supplied to the first input of nand gate 175 which allows the inverted clock signal of FIG. 5(B) to pass through nand gate 175 resulting in the oclt signal of FIG. 5(I). The leading edge of the oclt pulse signal of FIG. 5(I) latches the first byte of the BT instruction into instruction register 64 for decoding by circuit 68.

The logic "1" at the output of and gate 170 is also supplied to the first input of nand gate 179 which allows the inverted clock signal of FIG. 5(B) to pass through nand gates 179 and 180 resulting in the first pulse of the pcinc signal of FIG. 5(K). The first pulse of the pcinc signal increments the program counter providing a new address to EPROM 24, which results in EPROM 24 providing the second byte of the BT instruction to the memory buffer register 22.

The output of nand gate 138 remains at a logic "0" state since each of the outputs of nand gates 144–152 have not changed state, that is, each of the outputs of nand gates 144–152 remain at the logic one state. Similarly, the output of nand gate 140 remains at the logic "0" state since each of the outputs of nand gates 154–160 have not changed state.

Since the $\overline{Q}$ output of each flip-flop 132–136 is at the logic "1" state and invertor 176 inverts the SD signal from a logic "0" to a logic "1", thereby providing logic ones to the first, second, third and fourth inputs of nand gate 162 the output of nand gate 142 will change from a logic "0" state to a logic "1" state. The leading edge of the second clock pulse of the clock signal of FIG. 5(A) will then clock the logic zeros at the D inputs of flip-flops 132 and 134 to the Q outputs thereof and the logic "1" at the D input of flip-flop 136 to its Q output. This, in turn, results in the output of and gate 170 changing from a logic "1" state to a logic "0" state, FIG. 5(C) and the output of nand gate 178 changing from a logic "0" state to a logic "1" state, FIG. 5(D).

When circuit 28 decodes a BT instruction the CB input of circuit 130 is at a logic "1" state which is provided to the first input of nand gate 168. The $\overline{CB}$ input of circuit 130 is now at a logic "0" state which is provided to the first input of nand gate 144. The second input of nand gate 144 is provided with a logic "0" from the $\overline{Q}$ output of flip-flop 132 while the third input of nand gate 144 is provided with a logic "1" resulting in the output of nand gate 144 remaining at the logic "1" state.

The logic ones supplied to the first and second inputs of nand gate 168 respectively by nor gate 72 and gate 178 allow the inverted clock signal of FIG. 4(B) to pass through gates 168 and 174 resulting in the second pulse of the mbrh signal of FIG. 4(H). This second pulse of the mbrh signal of FIG. 4(H) latches the second byte of the BT instruction into the eight bit latch 60 of memory buffer register 22.

Referring to FIGS. 4 and 6, since the BR input to circuit 130 is at a logic "0" state binary decision apparatus will proceed to the S2 state, that is, the Q outputs of flip-flops 132, 134 and 136 will respectively be 0, 1, 1 after the third clock pulse of the clock signal of FIG. 5(A). The output of nand gate 156 changed from a logic "1" state to a logic "0" state after the second clock pulse since the Q output of flip-flop 136 changed from "0" to "1". This, in turn, results in a logic "1" at the output of nand gate 140 which is supplied to the D input of flip-flop 134. The third clock pulse of the clock signal of FIG. 5(A) will clock the zero at the D input of flip-flop 132 to its Q output and the ones at the D input of flip-flops 134 and 136 to their Q outputs.

As illustrated in FIG. 5(E), the output of and gate 182 changes from a logic "0" to a logic "1" and as illustrated in FIG. 5(D) the output of and gate 178 changes from a logic "1" to a logic "0". The logic "1" at the output of and gate 182 is supplied to the first input of nand gate 184 allowing the clock signal of FIG. 5(A) to pass through nand gates 184 and 18 resulting in the second pulse of the pcinc signal of FIG. 5(I). The leading edge of this second pulse of the pcinc signal increments program counter 26 thereby providing a new address to EPROM 24 which results in EPROM 24 providing the third byte of the BT instruction to the memory buffer register 22.

Referring to FIGS. 4 and 6, since the CB input to circuit 130 is at a logic "1" state binary decision apparatus will proceed to the S2A state, that is the Q output of flip-flops 132, 134 and 136 will respectively be 0, 1, 0 after the fourth clock pulse of the clock signal of FIG. 5(A). The output of nand gates 162 and 164 are at the logic "0" state after the third clock pulse of the clock signal of FIG. 5(A), since the $\overline{Q}$ output of flip-flop 134 changed from a logic "0" state to a logic "1" state. This, in turn, results in a logic "0" at the output of nand gate 142 which is supplied to the D input of flip-flop 136. The fourth clock pulse of the clock signal of FIG. 5(A) will clock the zeros at the D input of flip-flop 132 and 136 to their Q outputs and the one at the D input of flip-flops 134 to its Q output.

The output of and gate 186 changes from a logic "0" to a logic "1" as illustrated by FIG. 5(F), while the output of and gate 182 changes from a logic "1" to a logic "0" as illustrated by FIG. 5(E). A logic "1" supplied from the output of and gate 186 to the first input of nand gate 188 allows the clock signal of FIG. 5(A) to pass through gates 188 and 190 resulting in the pulse of mbrl signal of FIG. 5 (J). The leading edge of this pulse, in turn, latches the third byte of the BT instruction into an eight bit latch 61 within memory buffer register 22.

The logic "1" at the output of and gate 186 is also supplied to the first input of a nand gate 194 allowing the inverted clock signal of FIG. 5(B) to pass through nand gates 194 and 180 which results in the third pulse of the pcinc signal of FIG. 5(K). The leading edge of this third pulse of the pcinc signal increments program counter 26 thereby providing a new address to EPROM 24 with the new address being either the A11–A00 address bits, FIG. 2, of the BT instruction if the tested bit is a logic "1" or the next instruction in sequence if the tested bit is not a logic "1". This, in turn, results in EPROM 24 providing the eight bit byte at the address specified by program counter 26 to memory buffer register 22 for processing by binary decision apparatus 20.

The address strobe, FIG. 5(L), for the BT instruction is also generated when the S3 signal is at a logic "1" state and if the selected bit tested matches the conditional transfer state. For the BT and BF instructions the address strobe may be defined by the following expression:

$$ads = S3 \cdot CLK \cdot (BF \cdot \overline{Di} + BT \cdot Di) \quad (4)$$

When the address strobe is active, that is, the output of nand gate 202 transitions from a logic "0" to a logic "1", FIG. 5(L) the A00–A11 bits of the BT instruction are transferred from memory buffer register 22 to program counter 26.

The complete address strobe for binary decision apparatus 20 is defined by the following equation:

$$ads = Dt \cdot BBT \cdot S3 \cdot CLK + Di \cdot BT \cdot S3 \cdot CLK + \overline{Di} \cdot BT \cdot S3 \cdot CLK + BR \cdot S3 \cdot CLK + BNZ0 \cdot ZF0 \cdot S3 \cdot CLK + BNZ1 \cdot ZF1 \cdot S3 \cdot CLK + LD \cdot (dest = PC) \cdot S3 \cdot CLK \quad (5)$$

which is implemented by the and or logic circuitry of nand gates 198–209. It should be noted that dest=PC is a logic "1" signal provided by nor gate 236.

Figure 7:
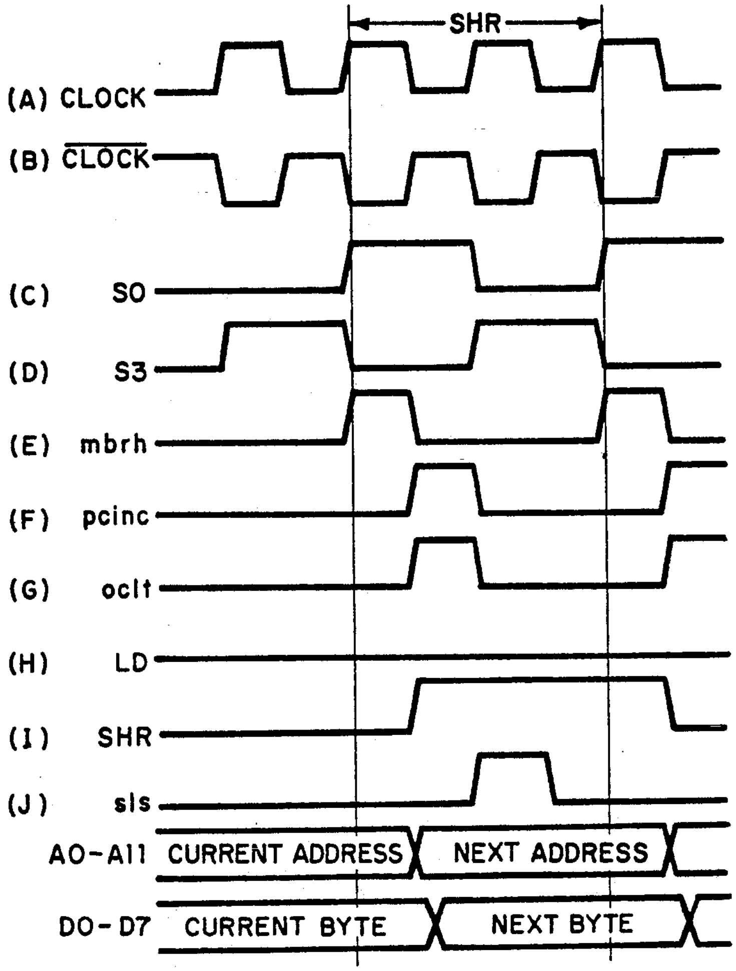
FIG. 7(A), 7(B), 7(C), 7(D), 7(E), 7(F), 7(G), 7(H), 7(I), and 7(J) are an illustration of the timing signals generated by the instruction and decode circuit for the SHR instruction.
Figure 10:
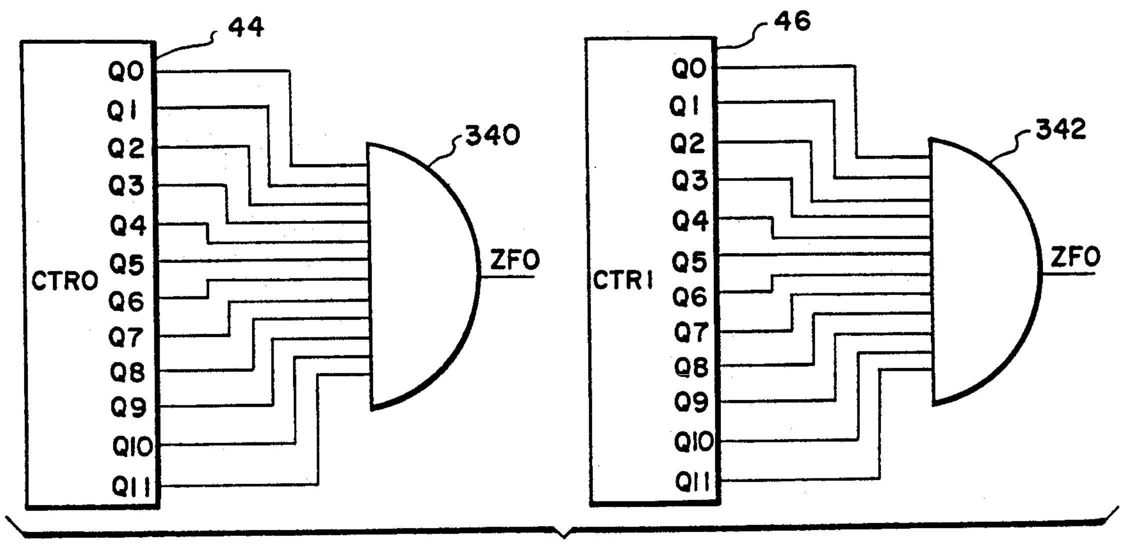
FIG. 10 is a detailed circuit diagram illustrating the circuitry by which binary decision apparatus generates the ZF0 and ZF1 flags.

Referring now to FIGS. 4, 6 and 7, the timing diagram of FIG. 7 illustrates the timing signals generated by instruction and decode circuit 28 to implement the SHR of FIG. 2. The first clock pulse of the clock signal of FIG. 7(A) after the previous instruction is executed will cause the Q output of flip-flop 132 to transition from a logic "1" to a logic "0", the Q output of flip-flop 134 to transition from a logic "1" to a logic "0" and the Q output of flip-flop 136 to remain at the logic "0" state. This, in turn, causes the output of and gate 170 to change from a logic "0" to a logic "1", FIG. 7(C). The logic "0" at the output of and gate 170 is supplied to the first input of nand gate 172 allowing the clock signal of FIG. 7(A) to pass through and gates 172 and 174 resulting in the mbrh signal of FIG. 7(E). The transition of the mbrh signal latches the SHR instruction into memory buffer register 22. Machine cycle timing generator circuit 130 next generates the pcinc signal of FIG. 7(F). The leading edge of this pulse of the pcinc signal increments program counter 26 thereby providing a new address to EPROM 24 which results in EPROM 24 providing the next instruction in sequence to the memory buffer register 22. At the same time machine cycle timing generator 130 also generates the oclt signal of FIG. 7(G). The leading edge of the pulse of the oclt signal causes the eight bit byte of the SHR instruction to be latched into instruction register 64 for decoding by circuit 28. The operation code is next decoded by circuit 28 resulting in a logic "1" at the output of nor gate 86 and the outputs of the remaining nor gates 70–98 being at the logic "0" state. The output of or gate 123 also goes to a logic "1" state whenever the SHR or the DEC instruction are decoded by circuit 68. When the D0 output of register 64 is at the logic "1" state the SHR instruction is provided to counter 46 through and gate 124 while a logic "0" at the D0 output of counter 46 provides the SHR instruction to counter 44 through and gate 122.

During the S3 state the signal of FIG. 7(J) is generated by instruction decode and control circuit 28. The S3 output of and gate 166 is supplied to the first input of and gate 210 allowing the clock signal of FIG. 7(A) to pass therethrough to the first input of and gate 212 when the S3 signal of FIG. 7(D) is a logic one. Since the SD signal at the second input of and gate 212 is active or at the logic "1" state the resulting output of and gate 212 is the signal of FIG. 7(J). Because a shift instruction is being processed by binary decision apparatus 20, the shift/latch strobe that is the signal of FIG. 7(J) is asserted and routed to the appropriate counter as defined by data bit D0 of the SHR instruction. When D0 is a logic "1" the output of and gate 124 is a logic "1" which results in counter 46 being shifted to the right, while a logic "0" at the D0 output of instruction register 64 results in counter 44 being shifted to the right.

When binary decision apparatus 20 is processing the DEC instruction, a logic "0" at the D0 output of instruction register 64 decrements counter 44 (the output of and gate 118 is a logic "1"). A logic "1" at the DO output of instruction register 64 decrements counter 46 (the output of and gate 118 is a logic "1").

Referring now to FIGS. 3, 4(A), 4(B) and 4(E), there is shown a device decode circuit 220 which decodes bits D0-D2 (latched in instruction register 64) of the first byte of the BT, BF, SET, RESET, TEST and LD instructions. Circuit 220 comprises eight nor gates 222-236 with each nor gate 222-236 decoding one of the registers or counters of binary decision apparatus 20. For example, if the device specified by the first byte of the BT instruction is the general purpose register 40, the D2, D1 and DO outputs of instruction register 64 are respectively 0, 1, 0, the logic "1" at the D1 output of register 64 will be inverted by invertor 240 resulting in logic zeros at the first, second and third inputs of nor gate 226 which, in turn, results in a logic "1" at the output of nor gate 226. Similarly, if the device specified by the first byte of the BF instruction is the counter 46, the D2, D1 and D0 outputs of instruction register 64 are respectively 0, 0, 1, the logic "1" at the D0 output of register 64 will be inverted by invertor 238 resulting in logic zeros at the first, second and third inputs of nor gate 224 which, in turn, results in a logic "1" at the output of nor gate 224. In a similar manner, circuit 220 decodes all of the registers and counters of binary decision apparatus 20 for the first byte of the BT, BF, SET, RESET, TEST and LD instructions of FIG. 2.

Figure 8A:
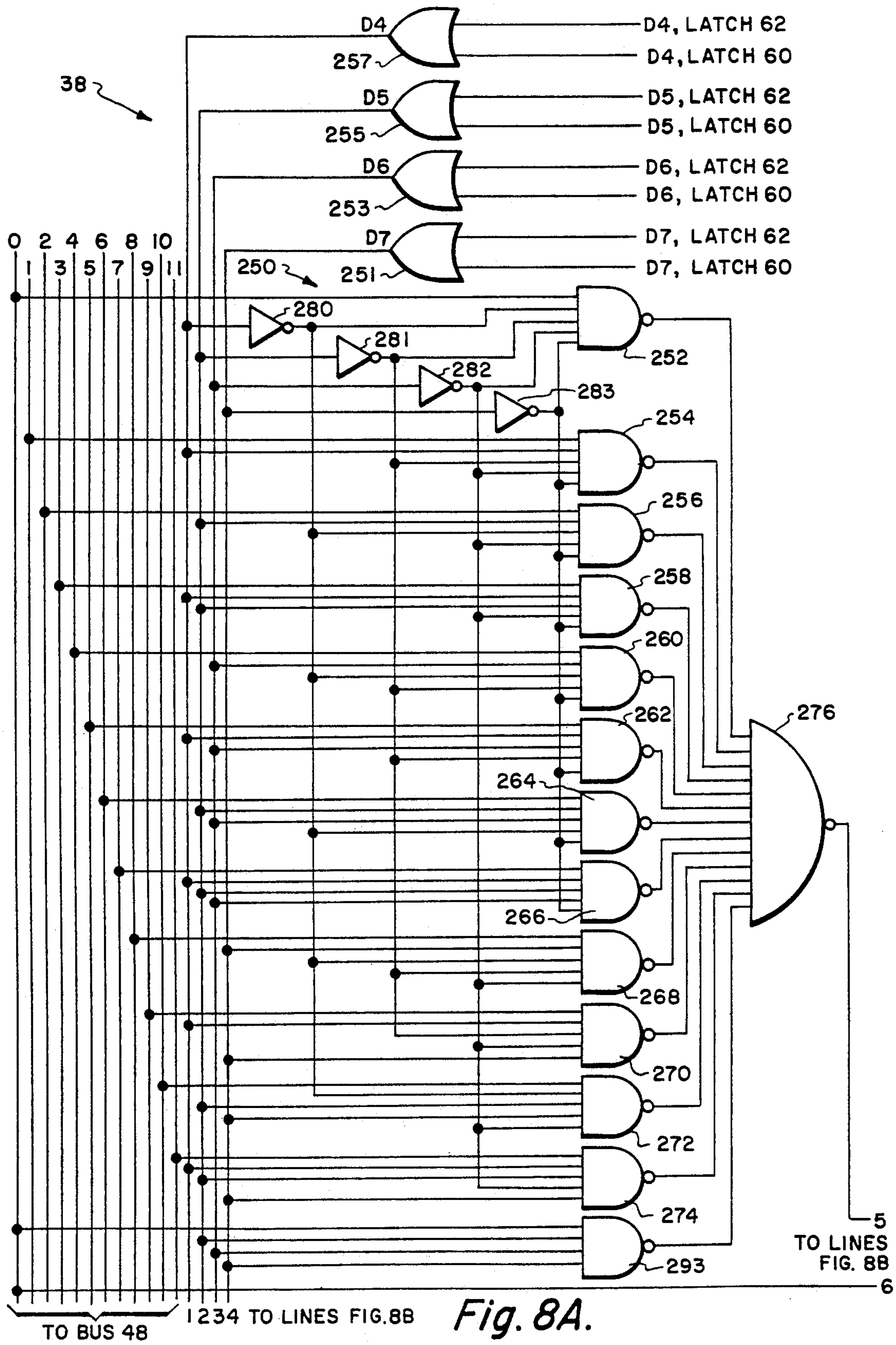
FIGS. 8(A) and 8(B) are detailed circuit diagrams of the flag register.
Figure 8B:
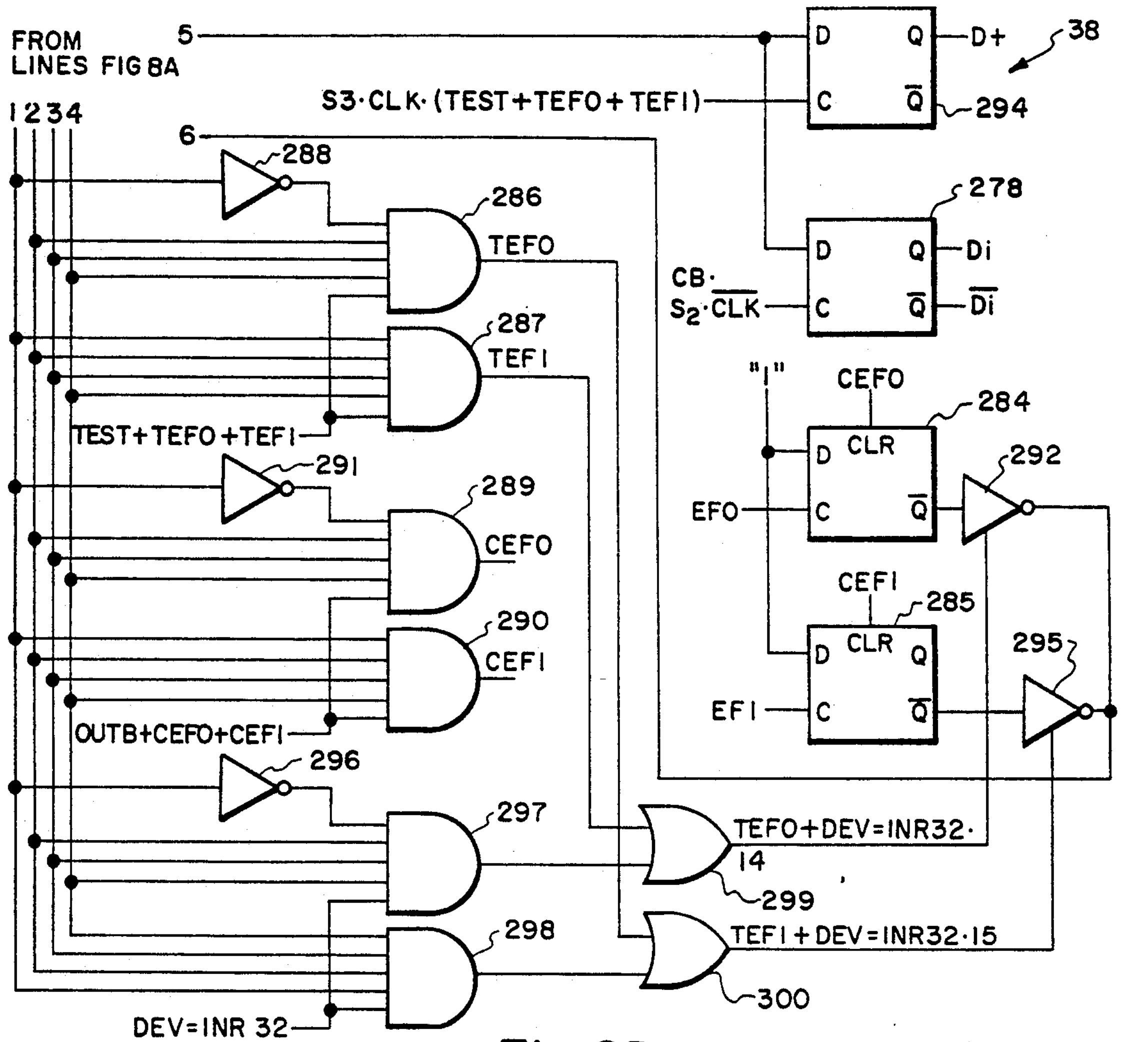

Referring now to FIGS. 1, 8(A) and 8(B), there is shown a detailed electrical schematic of a data bit state test circuit 250 within the test flag register 38 which test the state of a selected bit from a selected register or counter of binary decision apparatus 20 after the selected bit has been put onto data bus 48. Data bit state test circuit 250 includes twelve nand gates 252-274 with each gate providing a logic "0" at the output thereof when the selected bit from the selected register or counter is at the logic "1" state, a nand gate 276 which provides a logic "1" at the output thereof whenever the selected bit is at the logic "1" state and a one bit D type latch 278 which holds the tested bit and is clocked by the signal CB·S2·$\overline{CLK}$ supplied by and gate 203. The BT instruction, FIG. 2 will be used for the purpose of illustrating the operation of data bit state test circuit 250. The first byte of the BT instruction is transferred from memory buffer register 22 to internal register 64 and loaded therein on the leading edge of the oclt pulse signal of FIG. 5(H). When the first byte of the BT instruction specifies counter 46 as the counter to be tested, device decode circuit 220, FIG. 4(E) decodes data bits D0-D2 of the first byte of the BT instruction which results in a logic "1" at the output of nor gate 224, FIG. 4(E). This, in turn, results in data bits 0 thru 11 of counter 46 being loaded onto data bus 48 for testing by circuit 250. It should be noted that the dev tsen signal of FIG. 5(M) is a timing signal indicating that device decode circuit 220 has determined which register or counter of binary decision apparatus 20 is to be tested. For the purpose of testing a bit within counter 46 the dev tsen signal is the output of nor gate 224.

The first pulse of the pcinc signal increments the program counter providing a new address to EPROM 24, which results in EPROM 24 providing the second byte of the BT instruction to the memory buffer register 22. The second pulse of the mbrh signal of FIG. 5(H) then latches the second byte of the BT instruction into the eight bit latch 60 of memory buffer register 22. It should be noted that the bsel signal of FIG. 5(N) is a timing signal indicating that the selected bit is on internal data bus 54 and will be decoded by data bit state test circuit 250.

Bits D4-D7 of the second byte of the BT instruction specify which bit of the specified register or counter of apparatus 20 is to be tested. For example, when the BT instruction specifies that bit 5 of counter 46 is to be tested for the presence of a logic "1", the D4, D5, D6 and D7 lines of circuit 250 are respectively 1, 0, 1, 0, that is the outputs of or gates 251, 253, 255 and 257 are respectively 1, 0, 1, 0. The logic "1" on the D4 line is supplied to the first input of nand gate 262, the logic "0" on the D5 line is supplied to an invertor 281 which inverts the logic "0" to a logic "1" which is supplied to the second input of nand gate 262, the logic "1" on the D6 line is supplied to the third input of nand gate 262, and the logic "0" on the D7 line is supplied to an invertor 283 which inverts the logic "0" to a logic "1" which is supplied to the fourth input of nand gate 262. When the fifth bit of counter 46 is at the logic "1" state, that is line five of data bus 48 is a logic "1", the output of nand gate 262 is a logic "0" which results in a logic "1" at the output of nand gate 276. The leading edge of the CB·S2·clock signal of FIG. 5(N) provided by and gate 203 latches the "1" signal at the D input of D flip-flop 278 to the Q output of flip-flop 278. Since the BT and Di inputs to nand gate 200 are at the logic "1" state, nand gate 208 will provide the ads signal of FIG. 5(L) when the S3 and clock signals are at the logic "1" state. The branch portion of the BT instruction (A00 thru A11 of the instruction) is transferred to the program counter 26 by the ads signal of FIG. 5(L).

At this time it should be noted that bits D7-D4 of the second byte of the SET, RESET, OUTB and TEST instructions are stored in latch 62 while circuit 250 decodes these bits to determine which bit of the specified register or counter is to be tested, and that bits D7-D4 of the BT and BF instructions are stored in latch 60 while circuit 250 decodes these bits to determine which bit of the specified register or counter is to be tested.

Flag register 38 also includes a pair of master-slave D type flip-flops 284 and 285, with each flip-flop functioning as an external event indicator. The leading edge of an external event signal (EF0 or EF1), that is a transition of the clock input of flip-flop 284 or 285 from the logic "0" to the logic "1" state will change the Q output of flip-flop 284 or 285 to a logic "1" state and the $\overline{Q}$ output to the logic "0" state, thereby indicating the occurrence of an external event. When instruction decoding circuit 68 of binary decision apparatus 20 decodes a test instruction a logic "1" is supplied from the output of nor gate 88 to the first input of and gates 286 and 287. If the instruction to be executed by binary decision apparatus 20 is test event flag 0 (TEF0), the D4, D5, D6, and D7 lines are respectively 0, 1, 1, 1 resulting in a logic "1" at the output of and gate 286 which enables tristate invertor 292 allowing the logic "0" at the $\overline{Q}$ output of flip-flop 284 to be inverted by tristate invertor 292. The logic "1" at the output of tristate invertor 292 is supplied through the zero bit of data bus 48 and nand gates 293 and 276 to the D input of flip-flop 294 and the D input of flip-flop 278. The leading edge of the signal S3·CLK·(TEST+TEF0+TEF1) then clocks the logic "1" to the Q output of flip-flop 294, while the leading edge of the signal CB·S2·$\overline{CLK}$ clocks the logic "1" to the Q output of flip-flop 278.

For example, if the binary decision apparatus is to execute the instruction BT EF1,AFB (hexadecimal address) followed by the instruction CEF1, a logic "0" to "1" transition at the clock input of flip-flop 285 will result in a logic "0" at the $\overline{Q}$ output of flip-flop 285 indicating the occurrence of an external event. Since the BT instruction requires a source, input register 32 is selected, that is D2, D1 and D0 of the first byte of the BT instruction are respectively 1, 0, 1 resulting in a logic "1" at the output of nor gate 232 which is supplied to the first input of and gates 297 and 298. In order to test for a logic "0" at the $\overline{Q}$ output of flip-flop 285 the D4, D5, D6 and D7 of the second byte of the BT instruction are respectively set at 1, 1, 1, 1 resulting in a logic "1" at the output of and gate 298 which enables tristate invertor 295. The logic "0" at the $\overline{Q}$ output of flip-flop 285 is inverted by tristate invertor 295 resulting in a logic "1" being supplied through bus 48 to the output of nor gate 276. The leading edge of the CB·S2·$\overline{CLK}$ signal, FIG. 5(O) clocks the logic "1" to the output of flip-flop 278. During S3, FIG. 5(G), of the BT instruction the address strobe, FIG. 5(L) is asserted resulting in the AFB address (A0–A11 of the BT instruction) being put into program counter 26. Flip-flop 285 is then cleared by binary decision apparatus executing the CEF1 instruction of FIG. 2.

Figure 9:
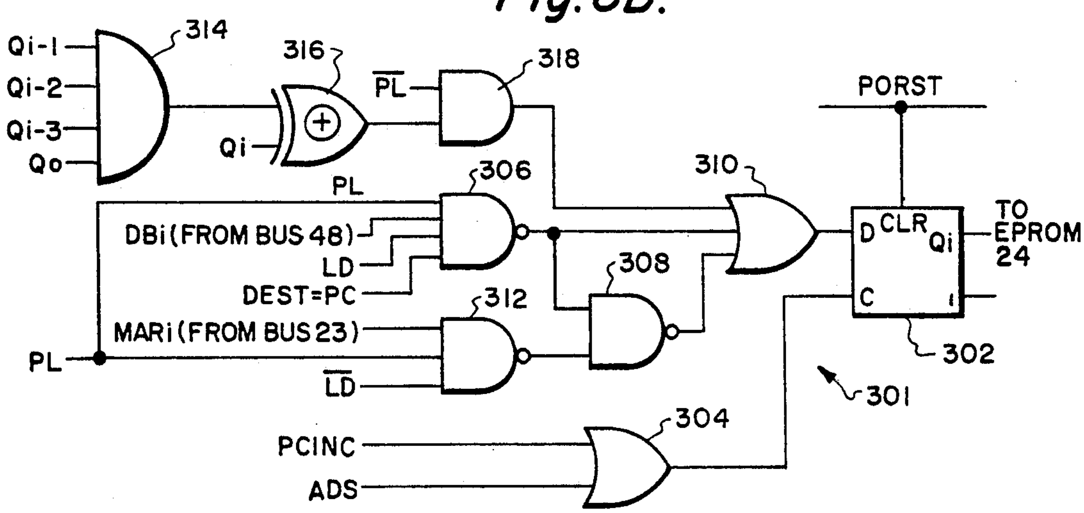
FIG. 9 is a detailed circuit diagram of one bit of the program counter of FIG. 1.

Referring now to FIGS. 4(A), 4(B) and 9, there is shown a circuit diagram which is representative of each bit/cell 301 of program counter 26. Program counter 26 which has 12 cells 301 is an up counter which may be parallel loaded with the data on data bus 23 or data on data bus 48 depending upon the instruction being executed by binary decision apparatus 20. Each cell of counter 26 includes a leading edge triggered master-slave D flip-flop 302 having a D input, a reset input and a clock input which allows either the pcinc signal provided by nand gate 180 or the ads signal provided by nand gate 208 to transfer the data bit at the D input of flip-flop 302 to the Q output of flip-flop 302. When binary decision apparatus 20 is executing a load (LD) instruction as decoded by instruction decoding circuit 28, the destination is program counter 26 as decoded by device decode circuit 220 and the PL signal provided by nand gate 306, FIG. 4(F) is at the logic "1" state, each data bit 0 thru 11 on bus 48 will pass from bus 48 through the DBi input of nand gate 306, nand gate 308 and or gate 310 to the D input flip-flop 302. At this time it should be noted that the DBi input of each and gate 306 is connected to one of the twelve data bit lines of bus 48.

The ads signal will then clock the respective data bits from data bus 48 to the output of each cell of flip-flop 302, thereby providing the next address for EPROM 24.

Referring now to FIG. 4(F), there is shown a decoding circuit 320 which provides the PL signal to each cell 320 of program cell 26. Decoding circuit 320 is defined by the following equation:

$$PL = Dt \cdot BBT + Di \cdot BT \cdot + \overline{Di} \cdot BF + BR + BNZ0 \cdot ZF0 + BNZ1 \cdot ZF1 + LD \cdot (dest = PC) \qquad (6)$$

which is implemented by the and or logic circuitry of nand gates 322–334. It should be noted that dest=PC is a logic "1" signal provided by nor gate 236.

When binary decision apparatus 20 is executing an instruction (e.g. BT instruction) that requires a twelve bit address stored in memory buffer register 22 to be loaded into program counter 26 via data bus 23, the $\overline{LD}$ input of nand gate 312 will be at the logic "1" state and the PL input of nand gate 312 will be at the logic "1" state allowing the data bit at the MARi input of nand gate 312 to be supplied to the D input of flip-flop 302.

The ads signal will then clock the respective data bits from data bus 23 to the output of each cell of flip-flop 302, thereby providing the next address for EPROM 24.

When it is required that program counter 26 be incremented by a count of one, the $\overline{PL}$ load input of and gate 318 will be at the logic "1" state allowing the next bit provided by the circuit combination of and gate 314 and exclusive gate 316 to be supplied to the D input of flip-flop 302. The pcinc signal then clocks the data bit from the D input of each flip-flop 302 of counter 26 to the outputs thereof, thereby providing the next address to EPROM 24.

It should be noted that the state of the logic signal supplied to the D input of flip-flop 302 is defined by the following expression:

$$D = \overline{PL} \cdot Q_i \veebar (Q_{i-1} \cdot Q_{i-2} \ldots Q_0) + PL \cdot \text{data bit bus } 48 \cdot LD \cdot (dest = PC) + MARi \cdot PL \cdot \overline{LD} \qquad (7)$$

where $Q_i$ is the Q output of the present bit of counter 26 and $Q_{i-1}$, $Q_{i-2}$ . . . $Q_0$ are the outputs of the bits of counter 26 having a lower numerical value then $Q_i$.

Referring now to FIGS. 4(A), 4(B), 9 and 10, when instruction decoding circuit 28 decodes a BNZ0 instruction binary decision apparatus 20 is required to branch to the address (A00–A11) specified by the instruction if counter 44 is not zero, otherwise binary decision apparatus 20 will proceed to the next instruction in sequence. When counter 44 is not zero, that is the output of or gate 340 is a logic "1", logic ones are provided to the first and second inputs of nand gate 330 resulting in a logic "1" at the PL input of nand gate 312. Since the $\overline{LD}$ input of nand gate 312 is also at the logic "1" state the data bit DBi from bus 23 will be provided to the D input of flip-flop 302. Since logic ones are also provided to the BNZ1 and ZF1 inputs of nand gate 206 an address strobe (ads) will be generated by clock and S3 with the leading edge of this address strobe latching the address on bus 23 into program counter 26.

Figure 11:
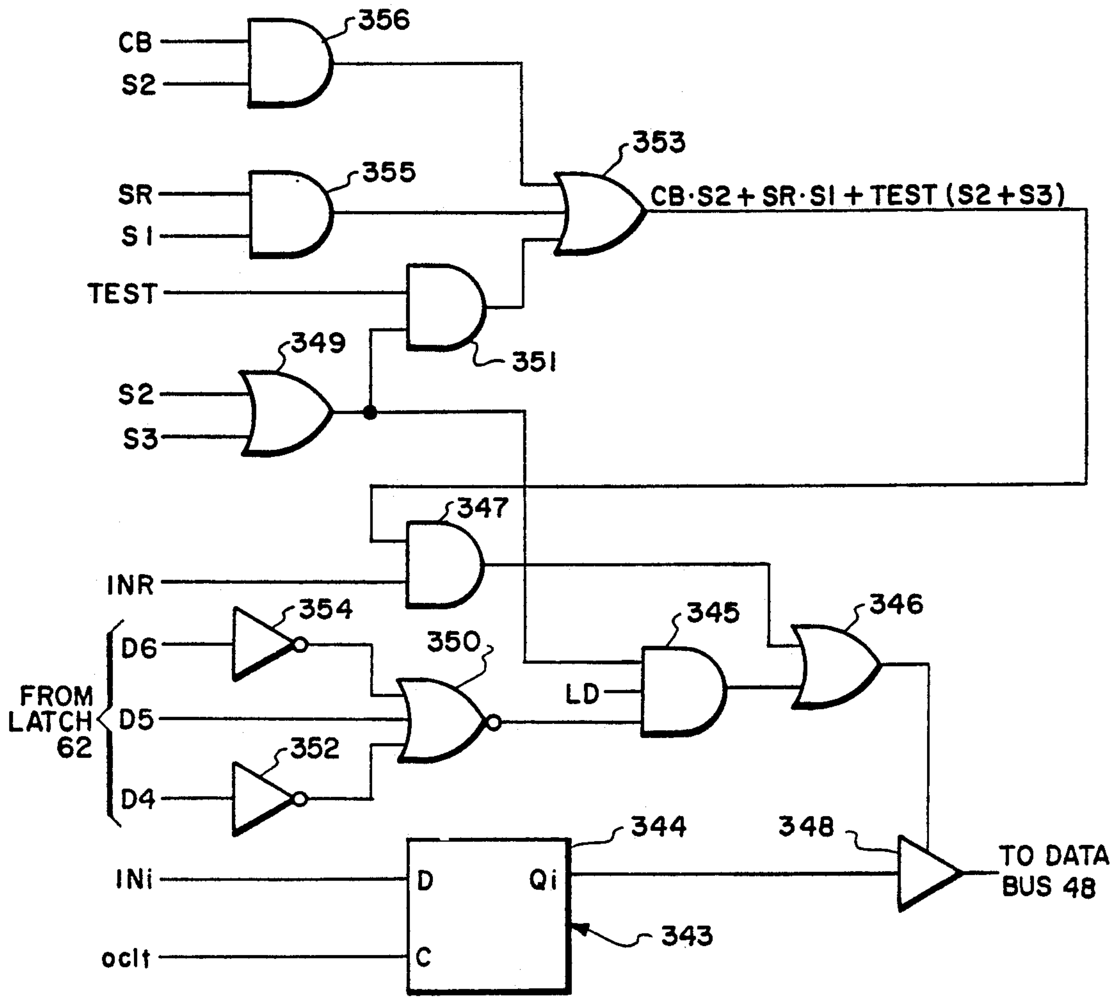
FIG. 11 is a detailed circuit diagram of one bit of the input register of FIG. 1.

Referring now to FIGS. 4(A), 4(B) and 11, there is shown a circuit diagram which is representative of each bit/cell 343 of input register 32. Input register 32 which has 12 cells 343 has external digital data latched into a D type latch 344 within each cell 343 by the leading edge of the oclt signal supplied by nand gate 175. The data bit stored within the latch 344 of each cell 343 is supplied to data bus 48 when a tristate output buffer 348 is enabled. Tristate output buffer 348 is, in turn, enabled by a logic "1" supplied to the enable input thereof. The logic equation for enabling tristate output buffer 348 may be expressed as follows:

$$tsen = LD \cdot source = INR \cdot (S2 + S3) + INR \cdot [TEST \cdot (S2 + S3) + SR \cdot S1 + CB \cdot S2] \qquad (8)$$

which is implemented by the logic circuitry of gates 345 thru 356.

When binary decision apparatus 20 executes a BT instruction and the specified register for the BT instruction is input register 32, that is, bits D0, D1, D2 of the first byte of the byte of the BT instruction are respectively 1, 0, 1 nor gate 232 of device decode circuit 220 will be at the logic "1" state indicating that input register 32 is the specified device. Since the CB input of and gate 356 is at the logic "1" state, that is nor gate 72 of circuit 28 has decoded a BT or BF instruction and the INR input of and gate 347 is at the logic "1" state, the S2 signal from and gate 182 will enable buffer 348 allowing the data bit in flip-flop 343 to be put onto data bus 48 while the S2 signal is at the logic "1" state.

When binary decision apparatus 20 is executing a LD instruction and input register 32 is specified as the source of the data (D4, D5, D6 of the second byte of the LD instruction are respectively 1, 0, 1) the output of nor gate 350 will be a logic "1" thereby enabling tristate output buffer 348 when the S2 and S3 signals are at the logic "1" state. This allows the data stored in input register 32 to be supplied to data bus 48 for loading into the destination specified by the LD instruction.

Figure 12:
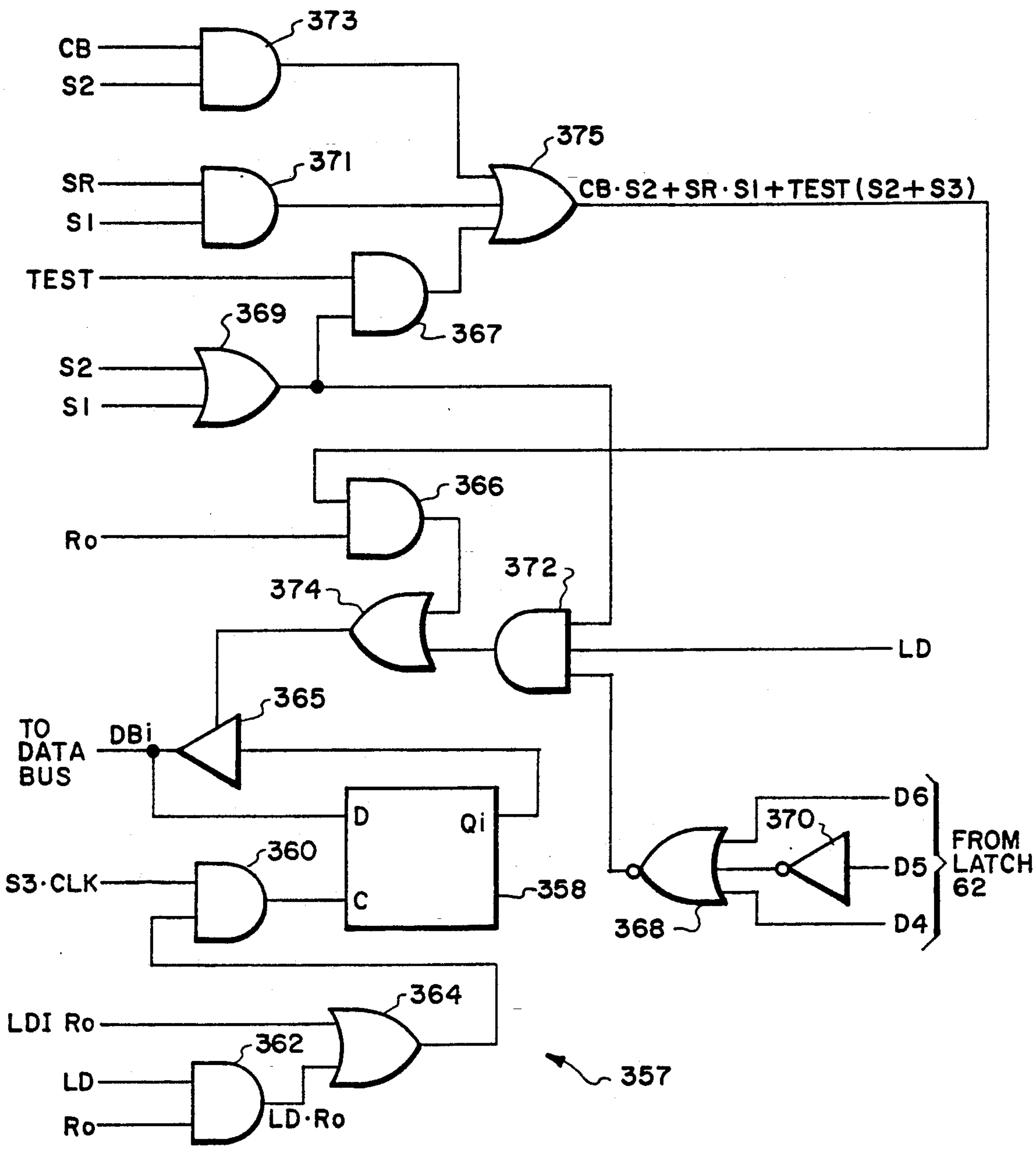
FIG. 12 is a detailed circuit diagram of one bit of a general purpose register of FIG. 1.
Figure 16:
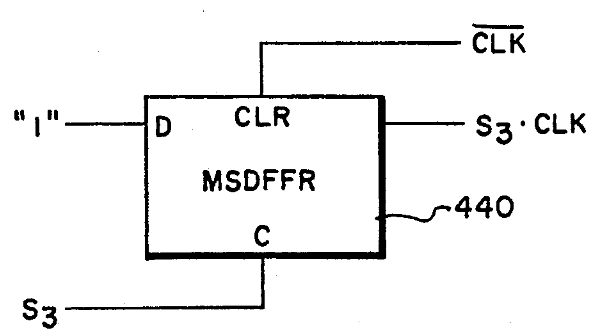
FIG. 16 is the circuit used to correct the problem illustrated in FIG. 15.

Referring now to FIGS. 4(A), 4(B) and 12, there is shown a circuit diagram which is representative of each bit/cell 357 of either general purpose register 40 or general purpose register 42. The following discussion will be with respect to general purpose register 40, but it should be understood that this discussion also applies to each cell of register 42. General purpose register 40 has twelve cells 357 with each cell 357 having a D type latch 358. A digital bit from data bus 48 is latched to the Q output of latch 358 by the leading edge of the signal S3·CLK·(LDI R0+LD·R0) provided by and gate 360. It should be noted that LDI R0 is a logic "1" when nor gate 96 decodes a LDI R0 instruction and LD·R0 is a logic "1" when nor gate 90 decodes an LD instruction and R0 which is provided by nor gate 226 is a logic "1".

Tristate output buffer 365 is enabled by a logic "1" to the enable input thereof allowing the date bit stored by latch 358 to be put on data bus 48. The logic equation for enabling tristate output buffer 348 may be expressed as follows:

$$tsen=LD\cdot source=R0\cdot(S2+S3)+R0\cdot[TEST\cdot(S2+S3)+SR\cdot S1+CB\cdot S2] \quad (9)$$

which is implemented by the logic circuitry of gates 366 thru 375.

For example, when a BT instruction specifies general purpose register 40 as the device to be tested nor gate 226 of device decode circuit 220 supplies a logic "1" to the R0 input of and gate 366. Since the CB input of and gate 373 is at the logic "1" state, that is nor gate 72 of circuit 68 has decoded a BT or BF instruction and the R0 input of and gate 366 is at the logic "1" state, the S2 signal from and gate 182 will enable buffer 365 allowing the data bit in flip-flop 358 to be put onto data bus 48 while the S2 signal is at the logic "1" state.

When binary decision apparatus 20 is executing a LD instruction and general purpose register 40 is specified as the source of the data (D4, D5, D6 of the second byte of the LD instruction are respectively 0, 1, 0) the output of nor gate 368 will a logic "1" thereby enabling tristate output buffer 366 when the S2 and S3 signals are at the logic "1" state. This allows the data stored in general purpose register 40 to be supplied to data bus 48 for loading into the destination specified by the LD instruction.

Figure 13:
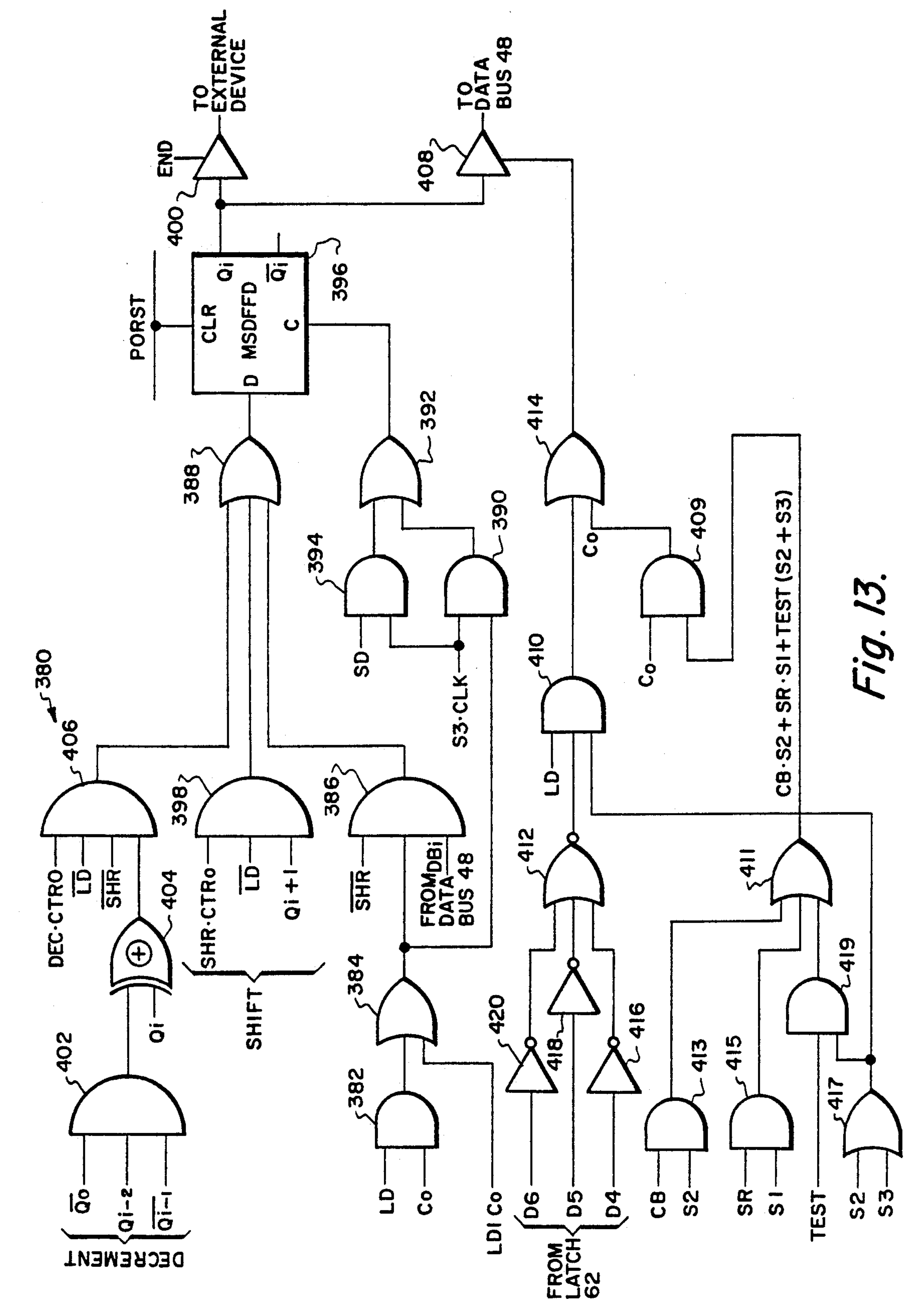
FIG. 13 is a detailed circuit diagram of one bit of a counter of FIG. 1.

Referring to FIGS. 4(A), 4(B) and 13, there is shown a circuit diagram which is representative of each bit/-cell 380 of either counter 44 or counter 46. The following discussion will be with respect to counter 44, but it should be understood that this discussion also applies to each cell of counter 46. Counter 44 which has twelve cells 380 functions in a count down mode, a load mode or shift mode. When binary decision apparatus 20 executes a LD instruction and the destination specified by the LD instruction is counter 44, nor gate 222 of device decode circuit 220 will provide a logic "1" to the CO input of and gate 382, while nor gate 90 of instruction decoding circuit 28 will provide a logic "1" to the LD input of and gate 382 resulting in logic ones at the outputs of and gate 382 and or gate 384. Since instruction decoding circuit 28 is not decoding an SHR instruction the $\overline{SHR}$ signal from invertor 125 will be a logic "1" resulting in logic ones at the first and second inputs of and gate 386 and the first input of and gate 390. The leading edge of the S3·CLK signal supplied by and gate 210 of instruction decode and control circuit 28 will then latch/store the data bit DBi on data bus 48 into the respective D flip-flop 396 of counter 44 for the data bit DBi where DBi can be any data bit 0–11 on data bus 48. When binary decision apparatus 20 executes an LDI C0 instruction a logic "1" from nor gate 92 of device decoding circuit 28 the S3·CLK signal to latch/store the data bits d00–d11 specified in the instruction into counter 44.

Counter 44 also operates in a shift mode, that is data bits in counter 44 are shifted to the right when binary decision apparatus is executing a SHR instruction. The most significant bit in counter 44 is replaced by a data bit provided through the serial input of counter 44. The least significant bit of counter 44 is the data bit which is serially output from counter 44. An external serial output enable signal controls whether the serial output tristate driver 400 is enabled or disabled with a logic "1" enabling tristate driver 400. This, in turn, allows multiple external devices to be connected on a bit serial communications bus to counter 44. It should be noted that output tristate driver is connected only to the flip-flop 396 of counter 44 holding the least significant bit.

When binary decision apparatus 20 executes an SHR instruction and counter 44 is specified by bit D0 of the first byte of the SHR instruction, the outputs of nor gate 86 and invertor 116 each go to a logic "1" state resulting in a logic "1" at the output of and gate 122 which is supplied to the first input of and gate 122. Since $\overline{LD}$ is also a logic "1" the leading edge of the S3·CLK signal will latch the data bit $Q_{i+1}$ into flip-flop 396 where $Q_{i+1}$ is either the next higher bit in counter 44 or an external data bit for the most significant cell of counter 44.

Counter 44 may also function in a decrement mode causing counter 44 to be reduced by an internal binary value of one. The circuitry to implement this decrement function includes and gate 402 having inputs connected to each of the $\overline{Q}$ outputs ($\overline{Q}_{i-1}$, $\overline{Q}_{i-2}$, ... $\overline{Q}_0$) for the lower binary value flip-flops 396 of counter 44, an exclusive or circuit 404 having a first input connected to the output of and gate 402 and a second input connected to the Q output of flip-flop 396 and gate 406 which is enabled when $\overline{LD}$ and $\overline{SHR}$ are at the logic "1" state and instruction decoding circuit 28 decodes the DEC instruction resulting in a logic "1" at the output of and gate 118 which is then supplied to and gate 406.

Tristate output buffer 408 is enabled by a logic "1" to the enable input thereof allowing the date bit stored by latch 396 to be put onto data bus 48. The logic equation for enabling tristate output buffer 408 may be expressed as follows:

$$tsen=LD\cdot(source=C0)\cdot(S2+S3)+C0\cdot[TEST\cdot(S2+S3)+SR\cdot S1+CB\cdot S2] \quad (10)$$

which is implemented by the logic circuitry of gates 410 thru 420.

When a BT instruction specifies counter 44 as the device to be tested nor gate 222 of device decode circuit 220 supplies a logic "1" to the C0 input of and gate 409, while nor gate 72 of circuit 28 supplies a logic "1" to the CB input of and gate 413 thereby enabling the enable input of buffer 408 allowing the data bit in latch 396 to be put on bus 48 while the S2 signal is a logic "1". This, in turn, allows for testing of the data bit by data bit state test circuit 250.

When binary decision apparatus 20 is executing a LD instruction and counter 44 is specified as the source of the data (D4, D5, D6 of the second byte of the LD instruction are respectively 0, 0, 0) the output of nor gate 412 will be a logic "1" thereby enabling tristate output buffer 408 during S2 and S3 which allows the data stored in counter 44 to be supplied to data bus 48 for loading into the destination specified by the LD instruction.

Figure 14:
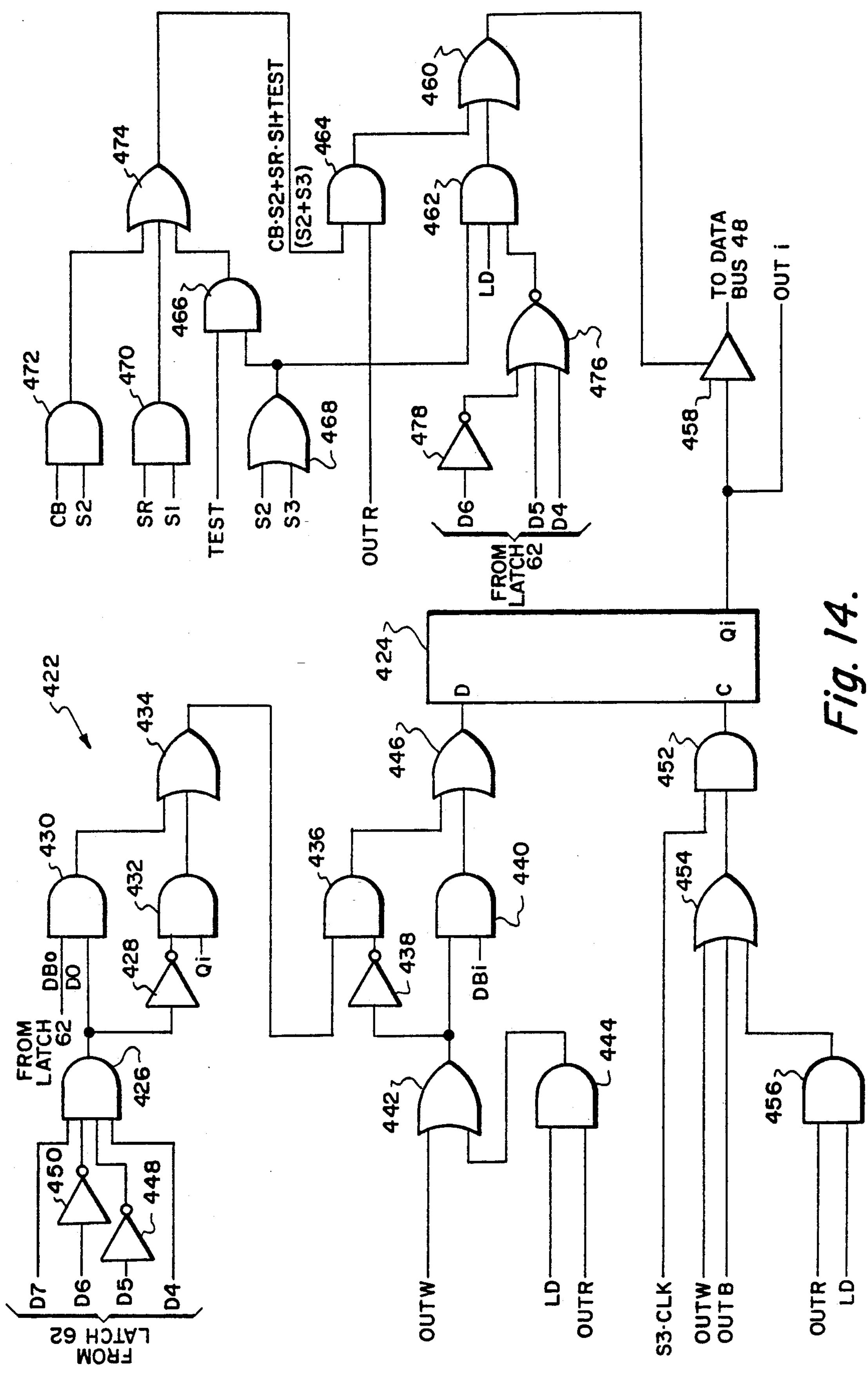
FIG. 14 is a detailed circuit diagram of one bit of a the output register of FIG. 1.

Referring now to FIGS. 4 and 14, there is shown a single bit/cell 422 of output register 34. While the twelve cells of output register 34 are identical, the following discussion will be with respect to cell nine of output register 34. Each cell 422 includes a D latch 424 having a data input D, a clock input and a Q output. The logic equation for the data input of latch 424 may be expressed as follows:

$$Di=DBi\cdot CBi+C\text{-}Bi\cdot[(b3\cdot b2\cdot b1\cdot b0)\cdot DB0+(\overline{b3}\cdot\overline{b2}\cdot\overline{b1}\cdot\overline{b0})\cdot Qi] \quad (11)$$

where DBi is a data bit from bus 48, DB0 is bit D0 of the second byte of the OUTB instruction, b3, b2, b1, and b0 are respectively bits D7 thru D4 of the OUTB instruction and CBi is defined by the following expression:

$$CBi=OUTW+LD\cdot(dest=OUTR) \quad (12)$$

Gates 426–446 comprise the logic circuitry for implementing logic equations 11 and 12. Since this discussion is with respect to cell nine of output register 34 the second and third inputs to and gate 426 are respectively connected to invertors 448 and 450 resulting in logic "1" at the output of and gate 426 when the binary value of bits D4–D7 of the OUTB instruction is nine.

The signal supplied to the clock input of each latch 424 of output register 34 is defined by the following expression:

$$strobe=S3\cdot CLK\cdot(OUTW+OUTB+LD\cdot OUTR) \quad (13)$$

which is implemented by the logic circuitry of gates 452 thru 456.

Tristate output buffer 458 is enabled by a logic "1" to the enable input thereof allowing the data bit stored by latch 424 to be put onto data bus 48. The logic equation for enabling tristate output buffer 458 may be expressed as follows:

$$tsen=LD\cdot(source=OUTR)\cdot(S2+S3)+OUTR\cdot[TEST\cdot(S2+S3)+SR\cdot S1+CB\cdot S2] \quad (14)$$

which is implemented by the logic circuitry of gates 460 thru 478.

For the purpose of illustrating the operation of output register 34 assume binary decision apparatus is executing an OUTB instruction and the designated bit to be set at a specified value of "1" is cell nine. The first byte of the OUTB instruction contains the operation code which when decoded by circuit 28 results in a logic "1" at the output of nor gate 80. Since circuit 28 did not decode the OUTW instruction or the LD instruction the first input of or gate 442 and the first input of and gate 444 will be at the logic "0" state resulting in a logic "0" at the output of or gate 442 which is inverted to a logic "1" by invertor 438 and then supplied to the first input of and gate 436. Since the second byte of the OUTB instruction (bits D4–D7) specifies cell nine as the bit to be set, the output of and gate 426 will be at the logic "1" state. This, in turn, allows the logic "1" at the first input of and gate 430, i.e. bit D0 of the second byte of the OUTB instruction to pass through gates 430, 434, 436 and 446 to the D input of latch 424. The leading edge of the S3·CLK signal will then latch/store the logic "1" signal into latch 424.

At this time it should be noted that tristate output buffer 458 is enabled in exactly the same manner as the tristate output buffers for counters 44 and 46. It should also be noted that if for example the OUTB instruction had specified cell eight as the cell to be set the D4 thru D6 inputs to and gate 426 would have to be inverted by invertors.

Referring to FIGS. 1 and 2, binary decision apparatus 20 also has a transient register 36 which is identical to output register 34 except the control signals are derived from the SET, RESET, and LD instructions. Transient register 36 allows any bit in any register except program counter 26 and input register 32 to be set or reset. Rather than complicate the design of binary decision apparatus by making all register bit addressable, transient register 36 is used to perform the bit set or reset operation in exactly the same manner as the operation is performed in output register 34 and the same logic circuitry as disclosed for output register 34 may be used to implement the set or reset operations. The contents of the destination register, e.g. general purpose register 40, are shuttled to transient register 36 via data bus 48, the specified bit is set by decoding the SET instruction or reset by decoding the RESET instruction, and the new data is put back into the destination register via data bus 48 using a load instruction. A copy of the data is retained in transient register 36. Transient register 36 may also be used as a general purpose register for storage provided the user does not use a bit SET or RESET instruction and erases the data. Transient register 36 contents are made available to the system bus 48 through tristate output buffers which use the same logic circuitry as the output register, general purpose registers and the counters to enable the transient register's tristate output buffers.

Figure 15:
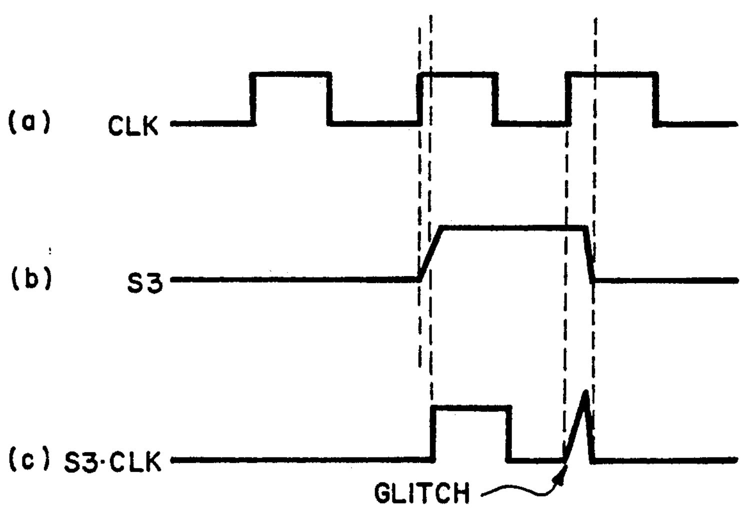
FIG. 15 is a timing diagram illustrating a glitch which may occur in the generation of certain timing signals by the circuit of FIG. 4.

Referring now to FIGS. 1, 4(A) to 4(F), 15 and 16, when instruction decode and control circuit 28 generates a timing signal a glitch may occur. For the purpose of illustrating the possible occurrence of a timing glitch the generation of the S3·CLK was selected, although it should be understood that the following discussion applies to the generation of all other timing signals by instruction decode and control circuit 28. As is best illustrated by FIG. 15, a glitch may occur because of a slight delay (generally in the order of a few nanoseconds) between the time input signals are provided to the inputs of and gate 166 and the time the output of and gate 166 transitions from a logic "1" to a logic "0" resulting in a glitch, FIG. 15(C), at the output of and gate 210. To alleviate this a rising edge triggered master slave D flip-flop 480 may be used in place of and gate 210. D flip-flop 480, in turn, has its D input connected to a logic "1" so that the leading edge of the S3 signal can latch the logic "1" into flip-flop 480 thereby providing the signal S3·CLK at the Q output of flip-flop 480. The flip-flop 480 is then reset by the $\overline{CLK}$ signal.

Referring to Appendix A there is disclosed the Register Transfer Language (RTL) for each of the instructions of binary decision apparatus 20. A state identifier is included in the RTL to identify when an action takes place in a machine cycle. S0:1, for example, means the activities occur during the positive half of the clock cycle in state 0, FIG. 6. As an example S0:1 $MBR_{15-8} \leftarrow$ (PC) for the BR instruction means that the first byte of the branch instruction is latched into memory buffer register 22, eight bit latch 60 (mbrh) during the positive half of the clock cycle in state 0.

Appendix B illustrates the simulated results for several of the instructions of FIG. 2 and was used to validate the timing of the control and other signals for binary decision apparatus 20. The simulation tool used was ESIM, an event driven switch simulator, developed by the Computer Science Division at the Massachusetts Institute of Technology which is described in "ESIM USERS MANUAL", 1986 VLSI DESIGN Tools: Still More Works by the Original Artist, Report No. UCB/CSD 86/272.

From the foregoing, it may readily be seen that the subject invention comprises a new, unique, and exceedingly useful binary decision apparatus which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

APPENDIX A

RTL DESCRIPTION OF BDC INSTRUCTIONS

| | | |
|---|---|---|
| **BR** | S0:1 | $MBR_{15-8} \leftarrow (PC)$ |
| | S0:0 | $PC \leftarrow PC + 1;\ IR \leftarrow MBR_{15-8};$ decode; |
| | | $SD \leftarrow 0;\ BR \leftarrow 1;\ CB \leftarrow 0$ |
| | S1:1 | |
| | S1:0 | $MBR_{7-0} \leftarrow (PC)$ |
| | S3:1 | $PC \leftarrow MBR_{11-0}$ |
| | S3:0 | |
| **BF** | S0:1 | $MBR_{15-8} \leftarrow (PC)$ |
| | S0:0 | $PC \leftarrow PC + 1;\ IR \leftarrow MBR_{15-8};$ decode; |
| | | $SD \leftarrow 0;\ BR \leftarrow 0;\ CB \leftarrow 1;$ |
| | S1:1 | $dev \leftarrow f(IR_{10-8})$ |
| | S1:0 | $MBR_{15-8} \leftarrow (PC)$ |
| | S2:1 | $PC \leftarrow PC + 1$ |
| | S2:0 | $DB_i \leftarrow bit(dev:MBR_{15-12})$ |
| | S2A:1 | $MBR_{7-0} \leftarrow (PC)$ |
| | S2A:0 | $PC \leftarrow PC + 1$ |
| | S3:1 | if $DB_i = 0$ then $PC \leftarrow MBR_{11-0}$ |
| | S3:0 | |
| **BT** | S0:1 | $MBR_{15-8} \leftarrow (PC)$ |
| | S0:0 | $PC \leftarrow PC + 1;\ IR \leftarrow MBR_{15-8};$ decode; |
| | | $SD \leftarrow 0;\ BR \leftarrow 0;\ CB \leftarrow 1;$ |
| | S1:1 | $dev \leftarrow f(IR_{10-8})$ |
| | S1:0 | $MBR_{15-8} \leftarrow (PC)$ |
| | S2:1 | $PC \leftarrow PC + 1$ |
| | S2:0 | $DB_i \leftarrow bit(dev:MBR_{15-12})$ |
| | S2A:1 | $MBR_{7-0} \leftarrow (PC)$ |
| | S2A:0 | $PC \leftarrow PC + 1$ |
| | S3:1 | if $DB_i = 1$ then $PC \leftarrow MBR_{11-0}$ |
| | S3:0 | |
| **BNZO** | S0:1 | $MBR_{15-8} \leftarrow (PC)$ |
| | S0:0 | $PC \leftarrow PC + 1;\ IR \leftarrow MBR_{15-8};$ decode; |
| | | $SD \leftarrow 0;\ BR \leftarrow 0;\ CB \leftarrow 0$ |

```
        S1:1
        S1:0    MBR7-0 ← (PC)
        S2:1    PC ← PC + 1
        S2:0
        S3:1    if ZF0 = 0 then PC ← MBR11-0
        S3:0

BNZ1    S0:1    MBR15-8 ← (PC)
        S0:0    PC ← PC + 1; IR ← MBR15-8; decode;
                SD ← 0; BR ← 0; CB ← 0
        S1:1
        S1:0    MBR7-0 ← (PC)
        S2:1    PC ← PC + 1
        S2:0
        S3:1    if ZF1 = 0 then PC ← MBR11-0
        S3:0

BBT     S0:1    MBR15-8 ← (PC)
        S0:0    PC ← PC + 1; IR ← MBR15-8; decode;
                SD ← 0; BR ← 0; CB ← 0
        S1:1
        S1:0    MBR7-0 ← (PC)
        S2:1    PC ← PC + 1
        S2:0
        S3:1    if Dt = 1 then PC ← MBR11-0
        S3:0

SET     S0:1    MBR15-8 ← (PC)
        S0:0    PC ← PC + 1; IR ← MBR15-8; decode;
                SD ← 0; BR ← 0; CB ← 0;
        S1:1    DB11-0 ← dev(IR10-8)
        S1:0    MBR7-0 ← (PC); TR ← DB11-0
        S2:1    PC ← PC + 1; bit(TR:MBR7-0) ← IR0
        S2:0    DB11-0 ← TR
        S3:1    dev(IR10-8) ← DB11-0
        S3:0

RESET   S0:1    MBR15-8 ← (PC)
        S0:0    PC ← PC + 1; IR ← MBR15-8; decode;
                SD ← 0; BR ← 0; CB ← 0;
        S1:1    DB11-0 ← dev(IR10-8)
        S1:0    MBR7-0 ← (PC); TR ← DB11-0
        S2:1    PC ← PC + 1; bit(TR:MBR7-0) ← IR0
        S2:0    DB11-0 ← TR
        S3:1    dev(IR10-8) ← DB11-0
        S3:0

OUTB    S0:1    MBR15-8 ← (PC)
        S0:0    PC ← PC + 1; IR ← MBR15-8; decode;
                SD ← 0; BR ← 0; CB ← 0
        S1:1
        S1:0    MBR7-0 ← (PC)
        S2:1    PC ← PC + 1
        S2:0    bit sel ← MBR7-4
        S3:1    OUTR:bit sel ← MBR0
        S3:0

CEF0    S0:1    MBR15-8 ← (PC)
        S0:0    PC ← PC + 1; IR ← MBR15-8; decode;
                SD ← 0; BR ← 0; CB ← 0
        S1:1
        S1:0    MBR7-0 ← (PC)
        S2:1    PC ← PC + 1
        S2:0
        S3:1    EF0 ← 0
        S3:0

CEF1    S0:1    MBR15-8 ← (PC)
        S0:0    PC ← PC + 1; IR ← MBR15-8; decode;
                SD ← 0; BR ← 0; CB ← 0
```

```
          S1:1
          S1:0     MBR7-0 ← (PC)
          S2:1     PC ← PC + 1
          S2:0
          S3:1     EF1 ← 0
          S3:0
```

```
OUTW      S0:1     MBR15-8 ← (PC)
          S0:0     PC ← PC + 1; IR ← MBR15-8; decode;
                   SD ← 0; BR ← 0; CB ← 0
          S1:1
          S1:0     MBR7-0 ← (PC)
          S2:1     PC ← PC + 1
          S2:0     DB11-0 ← MBR11-0
          S3:1     OUTR ← DB11-0
          S3:0

DEC       S0:1     MBR15-8 ← (PC)
          S0:0     PC ← PC + 1; IR ← MBR15-8; decode; SD ← 1;
                   BR ← 0; CB ← 0; LD ← 0; SH ← 0
          S3:1     Cn ← Cn-1
          S3:0

SHR       S0:1     MBR15-8 ← (PC)
          S0:0     PC ← PC + 1; IR ← MBR15-8; decode; SD ← 1;
                   BR ← 0; CB ← 0; LD ← 0; SH ← 1
          S3:1     Cn ← Cn SHR1
          S3:0

TEST      S0:1     MBR15-8 ← (PC)
          S0:0     PC ← PC + 1; IR ← MBR15-8; decode;
                   SD ← 0; BR ← 0; CB ← 0
          S1:1     dev ← f(IR2-0)
          S1:0     MBR7-0 ← (PC)
          S2:1     PC ← PC + 1; bit sel ← f(MBR7-4)
          S2:0     DB11-0 ← dev11-0
          S3:1     Dt ← DB11-0:(bit sel)
          S3:0

TEF0      S0:1     MBR15-8 ← (PC)
          S0:0     PC ← PC + 1; IR ← MBR15-8; decode;
                   SD ← 0; BR ← 0; CB ← 0
          S1:1
          S1:0     MBR7-0 ← (PC)
          S2:1     PC ← PC + 1;
          S2:0
          S3:1     Dt ← EF0
          S3:0

TEF1      S0:1     MBR15-8 ← (PC)
          S0:0     PC ← PC + 1; IR ← MBR15-8; decode;
                   SD ← 0; BR ← 0; CB ← 0

          S1:1
          S1:0     MBR7-0 ← (PC)
          S2:1     PC ← PC + 1;
          S2:0
          S3:1     Dt ← EF1
          S3:0

LD        S0:1     MBR15-8 ← (PC)
          S0:0     PC ← PC + 1; IR ← MBR15-8; decode;
                   SD ← 0; BR ← 0; CB ← 0; LD ← 0
          S1:1     if IR2-0 < 2 then LD ← 1
          S1:0     MBR7-0 ← (PC)
          S2:1     PC ← PC + 1; DB11-0 ← dev(MBR6-4)
          S2:0
          S3:1     dest(IR2-0) ← DB11-0
          S3:0
```

| | | |
|---|---|---|
| **LDI C0** | S0:1 | $MBR_{15-8} \leftarrow (PC)$ |
| | S0:0 | $PC \leftarrow PC + 1$; $IR \leftarrow MBR_{15-8}$; decode; |
| | | $SD \leftarrow 0$; $BR \leftarrow 0$; $CB \leftarrow 0$; $LD \leftarrow 1$ |
| | S1:1 | |
| | S1:0 | $MBR_{7-0} \leftarrow (PC)$ |
| | S2:1 | $PC \leftarrow PC + 1$; |
| | S2:0 | $DB_{11-0} \leftarrow MBR_{11-0}$ |
| | S3:1 | $CO_{11-0} \leftarrow DB_{11-0}$ |
| | S3:0 | |
| **LDI C1** | S0:1 | $MBR_{15-8} \leftarrow (PC)$ |
| | S0:0 | $PC \leftarrow PC + 1$; $IR \leftarrow MBR_{15-8}$; decode; |
| | | $SD \leftarrow 0$; $BR \leftarrow 0$; $CB \leftarrow 0$; $LD \leftarrow 1$ |
| | S1:1 | |
| | S1:0 | $MBR_{7-0} \leftarrow (PC)$ |
| | S2:1 | $PC \leftarrow PC + 1$; |
| | S2:0 | $DB_{11-0} \leftarrow MBR_{11-0}$ |
| | S3:1 | $C1_{11-0} \leftarrow DB_{11-0}$ |
| | S3:0 | |
| **LDI R0** | S0:1 | $MBR_{15-8} \leftarrow (PC)$ |
| | S0:0 | $PC \leftarrow PC + 1$; $IR \leftarrow MBR_{15-8}$; decode; |
| | | $SD \leftarrow 0$; $BR \leftarrow 0$; $CB \leftarrow 0$; $LD \leftarrow 1$ |
| | S1:1 | |
| | S1:0 | $MBR_{7-0} \leftarrow (PC)$ |
| | S2:1 | $PC \leftarrow PC + 1$; |
| | S2:0 | $DB_{11-0} \leftarrow MBR_{11-0}$ |
| | S3:1 | $R0_{11-0} \leftarrow DB_{11-0}$ |
| | S3:0 | |
| **LDI R1** | S0:1 | $MBR_{15-8} \leftarrow (PC)$ |
| | S0:0 | $PC \leftarrow PC + 1$; $IR \leftarrow MBR_{15-8}$; decode; |
| | | $SD \leftarrow 0$; $BR \leftarrow 0$; $CB \leftarrow 0$; $LD \leftarrow 1$ |
| | S1:1 | |
| | S1:0 | $MBR_{7-0} \leftarrow (PC)$ |
| | S2:1 | $PC \leftarrow PC + 1$; |
| | S2:0 | $DB_{11-0} \leftarrow MBR_{11-0}$ |
| | S3:1 | $R1_{11-0} \leftarrow DB_{11-0}$ |
| | S3:0 | |

APPENDIX B

```
7890 transistors, 3884 nodes (0 pulled up)
******** simulation of counter instructions
initialization took 11395 steps
********* SIMULATION RESULTS *******
_____|__LDI C1,001H__|DEC C1_|___TEST C1:0___|___BNZ1 ABC___|

>001100110011001100110011001100110011001100110011001100110011001100:sysclk
>111100000000000000000000000000000000000000000000000000000000000000:porst
>110011000000000000001100000011000000000000000011000000000000001100000:oclt
>001100000000000000110000001100000000000000001100000000000000110000000:mbrh
>000000001100000000000000000000001100000000000000110000000000000011:mbrl
>111111000000000000111100001111000000000000111100000000000011110000:s0
>001100000000000000110000001100000000000000001100000000000000110000000:s0clk
>000000111100000000000000000000111100000000000011110000000000001111:s1
>000000000011110000000000000000000011110000000000001111000000000000:s2
>000000000011000000000000000000000011000000000000001100000000000000:s2clk
>000000000000000000000000000000000000000000000000000000000000000000:s2A
>000000000000000000000000000000000000000000000000000000000000000000:s2Aclk
>000000000000001111000011110000000000001111000000000000111100000000:s3
>000000000000001100000011000000000000001100000000000000110000000000:s3clk
>000011111111111111111111111111111111111111110000000000000000000000:oc15
>000011111111111111110000000000000000000000000000000000000000000000:oc14
>000000000000000000000000000011111111111111111111111111111111000000:oc13
```

```
>0000111111111111111100000000000000000000000111111111111111000000:oc12
>0000000000000000000000000000000000000000000111111111111111000000:oc11
>0000000000000000000000000000000000000000000000000000000000000000:oc10
>0000000000000000000000000000000000000000000111111111111111000000:oc9
>0000000000000000000011111111111111111111110000000000000000000000:oc8
>1111000000000000000000000000000000000000000000000000000000111111:BR
>0000000000000000000000000000000000000000000000000000000000000000:cb
>0000000000000000000000000000000000000000000111111111111111000000:BNZ
>0000000000000000000000000000000000000000000000000000000000000000:BBT
>0000000000000000000000000000000000000000000000000000000000000000:SR
>0000000000000000000000000000000000000000000000000000000000000000:OUTB
>0000000000000000000000000000000000000000000000000000000000000000:OUTW
>0000000000000000000011111110000000000000000000000000000000000000:sd
>0000000000000000000000000000111111111111110000000000000000000000:TEST
>0000000000000000000000000000000000000000000000000000000000000000:LD
>0000111111111111111100000000000000000000000000000000000000000000:LDI
>0000000000000000000000000000000000000000000000000000000000000000:ZF0
>0000000000001111111111111111111111111111111111111111111111111111:ZF1
>00000000111111111111XXXXXXXX000000000000000XXXXXXXXXXXXXXXXXXXXX:Di
>1111111111111111111111111111111111111110000000000000000000000000:BF
>1111111111111111111111111111111111111111111111111111111111111111:EF0
>0000000001111111111111111111111111111111111111111111111111111111:EF1
>1111100000111111111111111111111000000000000001111110000000000000:D7
>1111100000000000000000000000000000000000000000000000000000000000:D6
>0000000000000000000000011111100000000111111111111100000000000000:D5
>1111100000000000000000000000000000000111111111111100000000000000:D4
>0000000000000000000000000000000000000111111111111100000000000000:D3
>0000000000000000000000000000000000000000000011111100000000000000:D2
>0000011111100000000000000000000000000111111100000000000000000000:D1
>0000011111111111111111111111111000000000000000000000000000000000:D0
>0000000000000000000000000000000000000000000XXXXXXXXXXXXXXXXXXXXX:db11
>0000000000000000000000000000000000000000000000000000000000000000:db10
>0000000000000000000000000000000000000000000XXXXXXXXXXXXXXXXXXXXX:db9
>00000000000000000011XXXXXXXX000000000000000XXXXXXXXXXXXXXXXXXXXX:db8
>0000111000000000000000000000000000000000000000000000000000000000:db7
>0000111000000000000000000000000000000000000000000000000000000000:db6
>0000000000000000000000000000000000000000000000000000000000000000:db5
>0000111000000000000XXXXXXXX000000000000000XXXXXXXXXXXXXXXXXXXXXX:db4
>0000000000000000000000000000000000000000000000000000000000000000:db3
>0000000000000000000000000000000000000000000000000000000000000000:db2
>0000000001111111111111111111111111111111111111111111111111111111:db1
>00000000111111111111XXXXXXXX000000000000000XXXXXXXXXXXXXXXXXXXXX:db0
>0000000000000000000000000000000000000000000000000000000000000000:C0tsen
>0000000000000000000000000000000000000000000000000000000000000000:C0stb
>0000000000000000000011111111111111111111110000000000000000000000:selcl
>0000000000000000000000000000111111111111110000000000000000000000:C1tsen
>0000000000000011000000000000000000000000000000000000000000000000:C1stb
>0000000000000000000000000000000000000000000111111111111111000000:R0sel
>0000000000000000000000000000000000000000000000000000000000000000:R0tsen
>0000000000000000000000000000000000000000000000000000000000000000:R0stb
>0000000000000000000000000000000000000000000000000000000000000000:R1sel
>0000000000000000000000000000000000000000000000000000000000000000:R1tsen
>0000000000000000000000000000000000000000000000000000000000000000:R1stb
>0000000000000000000000000000000000000000000000000000000000000000:INRsel
>0000000000000000000000000000000000000000000000000000000000000000:INRtsen
>1100110000000000000011000000110000000000000011000000000000110000:INRstb
>0000000000000000000000000000000000000000000000000000000000000000:ORsel
>0000000000000000000000000000000000000000000000000000000000000000:ORtsen
>0000000000000000000000000000000000000000000000000000000000000000:ORstb
>0000000000000000000000000000000000000000000000000000000000000000:EF0tsen
>0000000000000000000000000000000000000000000000000000000000000000:EF1tsen
>1100110000110000000011000000110000110000000011000011000000110000:pcinc
>0000000000000000000000000000000000000000000000000000110000000000:ads
>0000000000000000000000000000000000000000000000000000011111111111:A11
>0000000000000000000000000000000000000000000000000000000000000000:A10
>0000000000000000000000000000000000000000000000000000011111111111:A9
>0000000000000000000000000000000000000000000000000000000000000000:A8
>0000000000000000000000000000000000000000000000000000011111111111:A7
```

```
>000000000000000000000000000000000000000000000000000000000000000000:A6
>000000000000000000000000000000000000000000000000000000011111111111:A5
>000000000000000000000000000000000000000000000000000000011111111111:A4
>000000000000000000000000000000000000000000000000000000011111111111:A3
>000000000000000000000000000011111111111111111111111111111111111111:A2
>000000000011111111111111111100000000000000000111111111100000000000:A1
>000011111100000000001111111100000011111111111000000111100000111111:A0
```

```
7694 transistors, 3870 nodes (0 pulled up)
******** ESIM runs on R0 instructions
initialization took 10638 steps
```

```
_____LDI R0,3A4 _____SET_R0,1________RESET_R0,7______LD_PC,R0
_____s0__s1__s2__s3__s0__s1__s2__s3__s0__s1__s2__s3__s0__s1__s2__s3
______1_______________1_______________1_______________1____________
>001100110011001100110011001100110011001100110011001100110011001100:sysclk
>111100000000000000000000000000000000000000000000000000000000000000:porst
>110011000000000000000011000000000000000011000000000000000011000000000000:oclt
>111111000000000000111100000000000011110000000000001111000000000000:s0
>000000111100000000000011110000000000001111000000000000111100000000:s1
>000000000011110000000000001111000000000000111100000000000011110000:s2
>000000000000000000000000000000000000000000000000000000000000000000:s2A
>000000000000001111000000000000111100000000000011110000000000001111:s3
>001100000000000000110000000000000000110000000000000000110000000000000000:s0clk
>000000000011000000000000000011000000000000000011000000000000000011000000:s2clk
>000000000000000000000000000000000000000000000000000000000000000000:s2Aclk
>000000000000001100000000000000001100000000000000001100000000000000001100:s3clk
>000011111111111111110000000000000000000000000000000011111111111111:oc15
>000011111111111111111111111111111111111111111111111100000000000000:oc14
>000011111111111111110000000000000000000000000000000011111111111111:oc13
>000000000000000000001111111111111111111111111111111111111111111111:oc12
>000000000000000000000000000000000000000000000000000000000000000000:oc11
>000000000000000000000000000000000000000000000000000011111111111111:oc10
>000011111111111111111111111111111111111111111111111111111111111111:oc9
>000011111111111111110000000000000000000000000000000011111111111111:oc8
>001100000000000000110000000000000000110000000000000000110000000000000000:mbrh
>000000001100000000000000001100000000000000001100000000000000001100000000:mbrl
>111100000000000000000000000000000000000000000000000000000000000000:BR
>000000000000000000000000000000000000000000000000000000000000000000:cb
>000000000000000000000000000000000000000000000000000000000000000000:BNZ
>000000000000000000000000000000000000000000000000000000000000000000:BBT
>000000000000000000001111111111111111111111111111111100000000000000:SR
>000000000000000000000000000000000000000000000000000000000000000000:OUTB
>000000000000000000000000000000000000000000000000000000000000000000:OUTW
>000000000000000000000000000000000000000000000000000000000000000000:sd
>000000000000000000000000000000000000000000000000000000000000000000:TEST
>000000000000000000000000000000000000000000000000000011111111111111:LD
>000011111111111111110000000000000000000000000000000000000000000000:LDI
>111111111110000000000000000000000000000000001111111111000000000000000:D7
>111110000001111111111000000111111111111111100000000000000000000000:D6
>111111111110000000000000000000000000001111111111111111111111110000000:D5
>000000000001111111111111111111111111111111111111111110000000000000:D4
>000000000000000000000000000000000000000000000000000000000000000000:D3
>000001111110000000000000000000000000000000001111111111000000000000000:D2
>111110000001111111111000000111111111100000011111111110000000000000:D1
>111110000000000000000111111000000000000000011111111110000000000000:D0
>000000000000000000X000000000000000XXXX000000000000XXXXXX0000000000:db11
>000000000000000000000000000000000000000000000000000011110000000000:db10
>000011111111111111XX11111111111111XXXX111111111111XX11111111111111:db9
>00001111111111110 0XX11111111111111XXXX111111111111XX11111111111111:db8
>000011111111111111111111111111111111111111110000000000000000000000:db7
>000011100000000000000000000000000000000000000000000011110000000000:db6
>000011111111111111XX11111111111111XXXX111111111111XX11111111111111:db5
>000000000000000000000000000000000000000000000000000011110000000000:db4
>000000000000000000000000000000000000000000000000000000000000000000:db3
>000000001111111111111111111111111111111111111111111110000111111111:db2
>000011100000000000000000000011111111111111111111111110000111111111:db1
>00001110000000000000XX00000000000000XXXX000000000000XXXXXX0000000000:db0
```

```
>1111000000000000000000000000000000000000000000000000000000000000:selc0
>0000000000000000000000000000000000000000000000000000000000000000:C0tsen
>0000000000000000000000000000000000000000000000000000000000000000:C0stb
>0000000000000000000000000000000000000000000000000000000000000000:selc1
>0000000000000000000000000000000000000000000000000000000000000000:C1tsen
>0000000000000000000000000000000000000000000000000000000000000000:C1stb
>0000000000000000000011111111111111111111111111111110000000000000:R0sel
>0000000000000000000011110000000000000000111100000000000011111111:R0tsen
>0000000000000011000000000000001100000000000000110000000000000000:R0stb
>0000111111111111111100000000000000000000000000000000000000000000:R1sel
>0000000000000000000000000000000000000000000000000000000000000000:R1tsen
>0000000000000000000000000000000000000000000000000000000000000000:R1stb
>0000000000000000000000000000000000000000000000000000000000000000:INRsel
>0000000000000000000000000000000000000000000000000000000000000000:INRtsen
>1100110000000000000011000000000000110000000000000011000000000000:INRstb
>0000000000000000000000000000000000000000000000000000000000000000:ORsel
>0000000000000000000000000000000000000000000000000000000000000000:ORtsen
>0000000000000000000000000000000000000000000000000000000000000000:ORstb
>0000000000000000000000000000000000000000000000000000000000000000:TRsel
>0000000000000000000000000111111110000000111111110000000000000000:TRtsen
>0000000000000000000000000110011000000000110011000000000000000000:TRstb
>1111111111111111111111100000000000000000000000000000000000000000:AB7
>1100110001100000001100011000000000110001100000000011000110000000:pcinc
>0000000000000000000000000000000000000000000000000000000000001100:ads
>0000000000000000000000000000000000000000000000000000000000000000:A11
>0000000000000000000000000000000000000000000000000000000000000000:A10
>0000000000000000000000000000000000000000000000000000000000001111:A9
>0000000000000000000000000000000000000000000000000000000000001111:A8
>0000000000000000000000000000000000000000000000000000000000000000:A7
>0000000000000000000000000000000000000000000000000000000000000000:A6
>0000000000000000000000000000000000000000000000000000000000001111:A5
>0000000000000000000000000000000000000000000000000000000000000000:A4
>0000000000000000000000000000000000000000000000000000000011110000:A3
>0000000000000000000000000111111111111111111111111111111100001111:A2
>0000000001111111111111111000000000000000011111111111111100001111:A1
>0000111111000000000011111100000000001111110000000000111111000000:A0
7694 transistors, 3870 nodes (0 pulled up)
7460 transistors, 3785 nodes (0 pulled up)
******** ESIM of SET instruction
initialization took 10714 steps
_____OUTW_800H_______SET_OUTR,2______RESET_OUTR,2____BBT_7A2H
_____s0__s1__s2__s3__s0__s1__s2__s3__s0__s1__s2__s3__s0__s1__s2__s3
______1_______________1_______________1_______________1____________
>0011001100110011001100110011001100110011001100110011001100110011:sysclk
>1111000000000000000000000000000000000000000000000000000000000000:porst
>1100110000000000000011000000000000110000000000000011000000000000:oclt
>1111110000000000001111000000000001111000000000001111000000000000:s0
>0000001111000000000000111100000000000111100000000000111100000000:s1
>0000000000111100000000000011110000000000011110000000000011110000:s2
>0000000000000000000000000000000000000000000000000000000000000000:s2A
>0000000000000011110000000000011110000000000011110000000000001111:s3
>0000000000000011000000000000001100000000000011000000000000001100:s3clk

>0000000000000000000000000000000000000000000000000000000000000000:oc15
>0000111111111111111111111111111111111111111111111111111111111111:oc14
>0000111111111111111100000000000000000000000000000000000000000000:oc13
>0000111111111111111111111111111111111111111111111110000000000000:oc12
>0000111111111111111100000000000000000000000000000000000000000000:oc11
>0000000000000000000011111111111111111111111111111111111111111111:oc10
>0000000000000000000000000000000000000000000000000001111111111111:oc9
>0000000000000000000000000000000000000000000000000001111111111111:oc8

>0011000000000000001100000000000000110000000000000011000000000000:mbrh
>0000000011000000000000001100000000000000110000000000000011000000:mbrl

>1111000000000000000000000000000000000000000000000000000000000000:BR
>0000000000000000000000000000000000000000000000000000000000000000:cb
>0000000000000000000000000000000000000000000000000000000000000000:BNZ
```

```
>0000000000000000000000000000000000000000000000000000011111111111111:BBT
>000000000000000000011111111111111111111111111111111110000000000000:SR
>000000000000000000000000000000000000000000000000000000000000000000:OUTB
>000011111111111111100000000000000000000000000000000000000000000000:OUTW
>000000000000000000000000000000000000000000000000000000000000000000:sd
>000000000000000000000000000000000000000000000000000000000000000000:TEST
>000000000000000000000000000000000000000000000000000000000000000000:LD
>000000000000000000000000000000000000000000000000000000000000000000:LDI

>000000000000000000000000000000000000000000000000000001111110000000:D7
>111110000001111111111000000111111111100000011111111110000000000000:D6
>111110000000000000001111100000000000011111000000000000111110000000:D5
>111110000001111111111000000111111111100000000000000000000000000000:D4
>111110000000000000000000000000000000000000000000000000000000000000:D3
>000000000001111111111000000111111111100000011111111110000000000000:D2
>000000000000000000000000000000000000000000011111111111111110000000:D1
>000000000000000000001111100000000000000000011111111110000000000000:D0

>000011111111111111100001111111111111111111111111111111111111111111:db11
>000000000000000000011110000000000000000000000000000000000000000000:db10
>00000000000000000000000000000000000000000000000000XXXXXXXXXXXXXXXX:db9
>00000000000000000000000000000000000000000000000000XXXXXXXXXXXXXXXX:db8
>000000000000000000000000000000000000000000000000000000000000000000:db7
>000011110000000000000000000000000000000000000000000000000000000000:db6
>XXXX1111000000000000XX000000000000XXXX000000000000XXXXXXXXXXXXXXXX:db5
>XXXX1111000000000000XX000000000000XXXX000000000000XXXXXXXXXXXXXXXX:db4
>000011110000000000000000000000000000000000000000000000000000000000:db3
>000000000000000000000000000011111111111111110000000000000000000000:db2
>00000000000000000000000000000000000000000000000000000000XXXXXXXXXX:db1
>000000000000000000000000000000000000000000000000000000000000000000:db0

>000000000000000000000000111111111111111100000000000000000000000000:mar0
>111111111111111111110000000000000000000000000000000000000000000000:selc0
>000000000000000000000000000000000000000000000000000000000000000000:C0tsen
>000000000000000000000000000000000000000000000000000000000000000000:C0stb
>000000000000000000000000000000000000000000000000000000000000000000:selc1
>000000000000000000000000000000000000000000000000000000000000000000:C1tsen
>000000000000000000000000000000000000000000000000000000000000000000:C1stb
>000000000000000000000000000000000000000000000000000000000000000000:R0sel
>000000000000000000000000000000000000000000000000000000000000000000:R0tsen
>000000000000000000000000000000000000000000000000000000000000000000:R0stb
>000000000000000000000000000000000000000000000000000000000000000000:R1sel
>000000000000000000000000000000000000000000000000000000000000000000:R1tsen
>000000000000000000000000000000000000000000000000000000000000000000:R1stb
>000000000000000000000000000000000000000000000000000000000000000000:INRsel
>000000000000000000000000000000000000000000000000000000000000000000:INRtsen
>110011000000000000001100000000000000110000000000000011000000000000:INRstb
>000000000000000000001111111111111111111111111111111110000000000000:ORsel
>000000000000000000000011110000000000001111000000000000000000000000:ORtsen
>000000000000001100000000000000110000000000000011000000000000000000:ORstb
>000000000000000000000000000000000000000000000000000000000000000000:TRsel
>000000000000000000000000001111111100000000111111110000000000000000:TRtsen
>000000000000000000000000110011000000000011001100000000000000000000:TRstb

>110011000011000000001100001100000000110000110000000011000011000000:pcinc
>000000000000000000000000000000000000000000000000000000000000001100:ads

>000000000000000000000000000000000000000000000000000000000000000000:A11
>000000000000000000000000000000000000000000000000000000000000001111:A10
>000000000000000000000000000000000000000000000000000000000000001111:A9
>000000000000000000000000000000000000000000000000000000000000001111:A8
>000000000000000000000000000000000000000000000000000000000000001111:A7
>000000000000000000000000000000000000000000000000000000000000000000:A6
>000000000000000000000000000000000000000000000000000000000000001111:A5
>000000000000000000000000000000000000000000000000000000000000000000:A4
>000000000000000000000000000000000000000000000000000000000011110000:A3
>000000000000000000000000001111111111111111111111111111111100000000:A2
>000000000011111111111111110000000000000000111111111111111100001111:A1
>000011111100000000001111110000000000111111000000000011111100000000:A0
```

```
>00000000000000111111111111111111111111111111111111111111111111111111:O11
>000000000000000000000000000000000000000000000000000000000000000000:O10
>000000000000000000000000000000000000000000000000000000000000000000:O9
>000000000000000000000000000000000000000000000000000000000000000000:O8
>111111111111110000000000000000000000000000000000000000000000000000:O7
>111111111111110000000000000000000000000000000000000000000000000000:O6
>000000000000000000000000000000000000000000000000000000000000000000:O5
>000000000000000000000000000000000000000000000000000000000000000000:O4
>000000000000000000000000000000000000000000000000000000000000000000:O3
>111111111111110000000000000000001111111111111110000000000000000000:O2
>111111111111110000000000000000000000000000000000000000000000000000:O1
>000000000000000000000000000000000000000000000000000000000000000000:O0
```

```
8928 transistors, 4127 nodes (0 pulled up)
******** simulation of various LD instructions
initialization took 13048 steps
********* SIMULATION RESULTS *******
_____|___LD C1,INR_|____LD R0,C1___|___LD PC,R0___|___LD PC,INR____

>001100110011001100110011001100110011001100110011001100110011001100:CLK
>000011111111111111111111111111111111111111111111111111111111111111:RESET*
>110011000000000000001100000000000000110000000000000011000000000000:oclt
>111110000000000000111100000000000011110000000000001111000000000000:S0
>000000111100000000000011110000000000001111000000000000111100000000:S1
>000000000011110000000000001111000000000000111100000000000011110000:S2
>000000000000000000000000000000000000000000000000000000000000000000:S2A
>000000000000001111000000000000111100000000000011110000000000001111:S3
>000000000000000000000000000000000000000000000000000000000000000000:LDC
>000000000000000000000000000000000000000000000000000000000000000000:SHC
>111100000000000000000000000000000000000000000000000000000000000000:BR
>000000000000000000000000000000000000000000000000000000000000000000:CB
>000000000000000000000000000000000000000000000000000000000000000000:BNZ
>000000000000000000000000000000000000000000000000000000000000000000:BBT
>000000000000000000000000000000000000000000000000000000000000000000:SR
>000000000000000000000000000000000000000000000000000000000000000000:OUTB
>000000000000000000000000000000000000000000000000000000000000000000:OUTW
>000000000000000000000000000000000000000000000000000000000000000000:SD
>000000000000000000000000000000000000000000000000000000000000000000:TEST
>000011111111111111111111111111111111111111111111111111111111111111:LD
>000000000000000000000000000000000000000000000000000000000000000000:LDI
>000000000000000000000000000000000000000000000000000000000000000000:ZF0
>000000000000000000000000000000000000000000000000000000000000000000:ZF1
>000000001111111111111111111111111111111111111111111111111111111111:Di
>111111111111111111111111111111111111111111111111111111111111111111:BF
>000000000000000000000000000000000011111111111111111111111111111111:EF0
>000000000111111111111111111111111111111111111111111111111111111111:EF1
>000000000000000000000000000000000010000000000000000000000000000000:EF0stb
>000000000100000000000000000000000000000000000000000000000000000000:EF1stb
>111110000000011111111000000001111111100000000111111110000000000000:D7
>000001111111100000000111111110000000011111111000000001111111100000:D6
>111110000000011111111111111111111111111111111111111110000000000000:D5
>111111111111111111111000000001111111100000000111111111111111100000:D4
>000000000000000000000000000000000000000000000000000000000000000000:D3
>111110000000000000000000000001111111100000000111111110000000000000:D2
>111110000000011111111000000001111111100000000111111110000000000000:D1
>000000000000000000000000000001111111100000000111111110000000000000:D0
>000000000000000000000000000000000000000000000000000000000111111111:db11
>000000001111111111111111111111111111111111111111111111111111111111:db10
>000000000000000000000000000000000000000000000000000000000000000000:db9
>000000001111111111111111111111111111111111111111111111111000000000:db8
>000000000000000000000000000000000000000000000000000000000000000000:db7
>000000001111111111111111111111111111111111111111111111111111111111:db6
>000000001111111111111111111111111111111111111111111111111111111111:db5
>000000000000000000000000000000000000000000000000000000000000000000:db4
>000000001111111111111111111111111111111111111111111111111111111111:db3
>000000000000000000000110000000000000000000000000000000000111111111:db2
>000000001111111111111111111111111111111111111111111111111111111111:db1
>000000001111111111111111111111111111111111111111111111111111111111:db0
```

```
>000011110000000000000000000000000000000000000000000000000000000000:C0tsen
>000000000000000000000000000000000000000000000000000000000000000000:C1tsen
>000000000000000000000000000000000000000000000000000000000000000000:R0tsen
>000000000000000000000000000000110000000000000000000000000000000000:R0stb
>000000000000000000000000000000000000000000000000000000000000000000:R1tsen
>000000000000000000000000000000000000000000000000000000000000000000:R1stb
>000000001111111111111111000000000000000000000000000000001111111111:INRtsen
>110011000000000000001100000000000000110000000000000011000000000000:INRstb
>000000000000000000000000000000000000000000000000000000000000000000:ORtsen
>000000000000000000000000000000000000000000000000000000000000000000:ORstb
>000000000000000000000000000000000000000000000000000000000000000000:EF0tsen
>000000000000000000000000000000000000000000000000000000000000000000:EF1tsen
>110011000011000000001100001100000000110000110000000011000011000000:pcinc
>000000000000000000000000000000000000000000000011000000000000001100:ads
>000000000000000000000000000000000000000000000000000000000000001111:A11
>000000000000000000000000000000000000000000000011111111111111111111:A10
>000000000000000000000000000000000000000000000000000000000000000000:A9
>000000000000000000000000000000000000000000000011111111111111110000:A8
>000000000000000000000000000000000000000000000000000000000000000000:A7
>000000000000000000000000000000000000000000000011111111111111111111:A6
>000000000000000000000000000000000000000000000011111111111111111111:A5
>000000000000000000000000000000000000000000000000000000000000000000:A4
>000000000000000000000000000000000000000000000011111111111111111111:A3
>000000000000000000000000001111111111111111111100000011111111111111:A2
>000000000011111111111111110000000000000000111111111100000000001111:A1
>000011111100000000001111110000000000111111000011111100000011111111:A0
>000000000000000000000000000000000000000111111111111111111111111111:I11
>111111111111111111111111111111111111111111111111111111111111111111:I10
>000000000000000000000000000000000000000000000000000000000000000000:I9
>111111111111111111111111111111111111111111111100000000000000000000:I8
>000000000000000000000000000000000000000000000000000000000000000000:I7
>111111111111111111111111111111111111111111111111111111111111111111:I6
>000000000000000000000000000000000000000000000000000000000000000000:I5
>111111111111111111111111111111111111111111111111111111111111111111:I4
>111111111111111111111111111111111111111111111111111111111111111111:I3
>000000000000000000000011111111111111111111111111111111111111111111:I2
>111111111111111111111111111111111111111111111111111111111111111111:I1
>111111111111111111111111111111111111111111111111111111111111111111:I0
```

```
7890 transistors, 3883 nodes (0 pulled up)
******** simulation of OUTW & SET instructions
initialization took 11487 steps
********* SIMULATION RESULTS *******
_____¦___OUTW 0____¦___SET OUTR:8__¦___SET OUTR:1__¦___SET OUTR:A__

>001100110011001100110011001100110011001100110011001100110011001100:sysclk
>111100000000000000000000000000000000000000000000000000000000000000:porst
>110011000000000000001100000000000000110000000000000011000000000000:oclt
>001100000000000000110000000000000011000000000000001100000000000000:mbrh
>000000001100000000000000110000000000000011000000000000001100000000:mbrl
>111111000000000000111100000000000011110000000000001111000000000000:s0
>001100000000000000110000000000000011000000000000001100000000000000:s0clk
>000000111100000000000011110000000000001111000000000000111100000000:s1
>000000000011110000000000001111000000000000111100000000000011110000:s2
>000000000011000000000000001100000000000000110000000000000011000000:s2clk
>000000000000000000000000000000000000000000000000000000000000000000:s2A
>000000000000000000000000000000000000000000000000000000000000000000:s2Aclk
>000000000000001111000000000000111100000000000011110000000000001111:s3
>000000000000001100000000000000110000000000000011000000000000001100:s3clk
>000000000000000000000000000000000000000000000000000000000000000000:oc15
>000011111111111111111111111111111111111111111111111111111111111111:oc14
>000011111111111111110000000000000000000000000000000000000000000000:oc13
>000011111111111111111111111111111111111111111111111111111111111111:oc12
>000000000000000000000000000000000000000000000000000000000000000000:oc11
>000000000000000000001111111111111111111111111111111111111111111111:oc10
>000000000000000000000000000000000000000000000000000000000000000000:oc9
>000000000000000000000000000000000000000000000000000000000000000000:oc8
>111100000000000000000000000000000000000000000000000000000000000000:BR
```

```
>000000000000000000000000000000000000000000000000000000000000000000:cb
>000000000000000000000000000000000000000000000000000000000000000000:BNZ
>000000000000000000000000000000000000000000000000000000000000000000:BBT
>000000000000000000001111111111111111111111111111111111111111111111:SR
>000000000000000000000000000000000000000000000000000000000000000000:OUTB
>000011111111111111110000000000000000000000000000000000000000000000:OUTW
>000000000000000000000000000000000000000000000000000000000000000000:sd
>000000000000000000000000000000000000000000000000000000000000000000:TEST
>000000000000000000000000000000000000000000000000000000000000000000:LD
>000000000000000000000000000000000000000000000000000000000000000000:LDI
>000000000000000000000000000000000000000000000000000000000000000000:ZF0
>000000000000000000000000000000000000000000000000000000000000000000:ZF1
>000000000000000000000000000011111111111100001111111111110000111111:Di
>111111111111111111111111111111111111111111111111111111111111111111:BF
>111111111111111111111111111111111111111111111111111111111111111111:EF0
>000000000111111111111111111111111111111111111111111111111111111111:EF1
>000000000000000000000000000000000000100000000000000000000000000000:EF0stb
>000000000100000000000000000000000000000000000000000000000000000000:EF1stb
>000000000000000000000111111110000000000000000000000001111111111111:D7
>111110000000011111111000000001111111100000000111111110000000000000:D6
>111110000000000000000000000000000000000000000000000001111111111111:D5
>111110000000011111111000000001111111111111111111111110000000000000:D4
>000000000000000000000000000000000000000000000000000000000000000000:D3
>000000000000011111111000000001111111100000000111111110000000000000:D2
>000000000000000000000000000000000000000000000000000000000000000000:D1
>000000000000000000000111111110000000011111111000000001111111111111:D0
>000000000000000000000000000000000000000000000000000000000000000000:db11
>000000000000000000111100000000000000000000000000000000000000111111:db10
>000000000000000000000000000000000000000000000000000000000000000000:db9
>000000000000000000000000000001111111111111111111111111111111111111:db8
>000000000000000000000000000000000000000000000000000000000000000000:db7
>000011110000000000000XX000000000000XXXX000000000000XXXX000000000000:db6
>000011110000000000000XX000000000000XXXX000000000000XXXX000000000000:db5
>000011110000000000000XX000000000000XXXX000000000000XXXX000000000000:db4
>000000000000000000000000000000000000000000000000000000000000000000:db3
>000000000000000000000000000000000000000000000000000000000000000000:db2
>000000000000000000000000000000000000000000000011111111111111111111:db1
>000000000000000000000000000000000000000000000000000000000000000000:db0
>111111111111111111110000000000000000000000000000000000000000000000:selc0
>000000000000000000000000000000000000000000000000000000000000000000:C0tsen
>000000000000000000000000000000000000000000000000000000000000000000:C0stb
>000000000000000000000000000000000000000000000000000000000000000000:selc1
>000000000000000000000000000000000000000000000000000000000000000000:C1tsen
>000000000000000000000000000000000000000000000000000000000000000000:C1stb
>000000000000000000000000000000000000000000000000000000000000000000:R0sel
>000000000000000000000000000000000000000000000000000000000000000000:R0tsen
>000000000000000000000000000000000000000000000000000000000000000000:R0stb
>000000000000000000000000000000000000000000000000000000000000000000:R1sel
>000000000000000000000000000000000000000000000000000000000000000000:R1tsen
>000000000000000000000000000000000000000000000000000000000000000000:R1stb
>000000000000000000000000000000000000000000000000000000000000000000:INRsel
>000000000000000000000000000000000000000000000000000000000000000000:INRtsen
>110011000000000000001100000000000000110000000000000011000000000000:INRstb
>000000000000000000001111111111111111111111111111111111111111111111:ORsel
>000000000000000000000011110000000000001111000000000000111100000000:ORtsen
>000000000000001100000000000000110000000000000011000000000000001100:ORstb
>000000000000000000000000000000000000000000000000000000000000000000:EF0tsen
>000000000000000000000000000000000000000000000000000000000000000000:EF1tsen
>110011000011000000001100001100000000110000110000000011000011000000:pcinc
>000000000000000000000000000000000000000000000000000000000000000000:ads
>000000000000000000000000000000000000000000000000000000000000000000:A11
>000000000000000000000000000000000000000000000000000000000000000000:A10
>000000000000000000000000000000000000000000000000000000000000000000:A9
>000000000000000000000000000000000000000000000000000000000000000000:A8
>000000000000000000000000000000000000000000000000000000000000000000:A7
>000000000000000000000000000000000000000000000000000000000000000000:A6
>000000000000000000000000000000000000000000000000000000000000000000:A5
>000000000000000000000000000000000000000000000000000000000000000000:A4
```

```
>000000000000000000000000000000000000000000000000000000000011111111:A3
>000000000000000000000000011111111111111111111111111111111100000000:A2
>000000000011111111111111100000000000000000111111111111111100000000:A1
>000011111100000000001111100000000000111111000000000011111100000000:A0
>000000000000000000000000000000000000000000000000000000000000000000:O11
>000000000000000000000000000000000000000000000000000000000000001111:O10
>000000000000000000000000000000000000000000000000000000000000000000:O9
>000000000000000000000000000000111111111111111111111111111111111111:O8
>111111111111110000000000000000000000000000000000000000000000000000:O7
>111111111111110000000000000000000000000000000000000000000000000000:O6
>000000000000000000000000000000000000000000000000000000000000000000:O5
>000000000000000000000000000000000000000000000000000000000000000000:O4
>000000000000000000000000000000000000000000000000000000000000000000:O3
>111111111111110000000000000000000000000000000000000000000000000000:O2
>111111111111110000000000000000000000000000000011111111111111111111:O1
>000000000000000000000000000000000000000000000000000000000000000000:O0

7890 transistors, 3884 nodes (0 pulled up)
******** simulation of BBT instruction
initialization took 11395 steps
********* SIMULATION RESULTS *******
_____|__LDI C0,002H__|DEC C0_|___TEST C0:0___|___BBT ABC___|

>001100110011001100110011001100110011001100110011001100110011001100:sysclk
>111100000000000000000000000000000000000000000000000000000000000000:porst
>110011000000000000001100000011000000000000001100000000000000110000:oclt
>001100000000000000110000001100000000000000110000000000000011000000:mbrh
>000000001100000000000000000000001100000000000000110000000000000011:mbrl
>111111000000000000111100001111000000000000111100000000000011110000:s0
>001100000000000000110000001100000000000000110000000000000011000000:s0clk
>000000111100000000000000000000111100000000000011110000000000001111:s1
>000000000011110000000000000000000011110000000000001111000000000000:s2
>000000000011000000000000000000000011000000000000001100000000000000:s2clk
>000000000000000000000000000000000000000000000000000000000000000000:s2A
>000000000000000000000000000000000000000000000000000000000000000000:s2Aclk
>000000000000001111000011110000000000001111000000000000111100000000:s3
>000000000000001100000011000000000000001100000000000000110000000000:s3clk
>000011111111111111111111111111111111111111110000000000000000000000:oc15
>000011111111111111110000000000000000000000001111111111111111000000:oc14
>000000000000000000000000000011111111111111110000000000000000000000:oc13
>000000000000000000000000000000000000000000000000000000000000000000:oc12
>000000000000000000000000000000000000000000001111111111111111000000:oc11
>000000000000000000000000000000000000000000000000000000000000000000:oc10
>000000000000000000000000000000000000000000001111111111111111000000:oc9
>000000000000000000000000000000000000000000000000000000000000000000:oc8
>111100000000000000000000000000000000000000000000000000000000111111:BR
>000000000000000000000000000000000000000000000000000000000000000000:cb
>000000000000000000000000000000000000000000000000000000000000000000:BNZ
>000000000000000000000000000000000000000000001111111111111111000000:BBT
>000000000000000000000000000000000000000000000000000000000000000000:SR
>000000000000000000000000000000000000000000000000000000000000000000:OUTB
>000000000000000000000000000000000000000000000000000000000000000000:OUTW
>000000000000000000001111111100000000000000000000000000000000000000:sd
>000000000000000000000000000011111111111111110000000000000000000000:TEST
>000000000000000000000000000000000000000000000000000000000000000000:LD
>000011111111111111110000000000000000000000000000000000000000000000:LDI
>000000000000001111111111111111111111111111111111111111111111111111:ZF0
>000000000000000000000000000000000000000000000000000000000000000000:ZF1
>0000000000000000000000000000111111111111111111XXXX0000000000000000XX:Di
>111111111111111111111111111111111111111111111111111111111111111111:BF
>111111111111111111111111111111111111111111111111111111111111111111:EF0
>000000000111111111111111111111111111111111111111111111111111111111:EF1
>111110000011111111111111111100000000000000001111110000000000000000:D7
>111110000000000000000000000000111111110000000000000000000000000000:D6
>000000000000000000000011111100000000000000001111110000000000000000:D5
>000000000000000000000000000000000000000000001111110000000000000000:D4
>000000000000000000000000000000000000111111111111110000000000000000:D3
>000000000000000000000000000000000000000000001111110000000000000000:D2
```

```
>000011111100000000000000000000000000111111110000000000000000000000:D1
>000000000000000000000000000000000000000000000000000000000000000000:D0
>000000000000000000000000000000000000000000000000000000000000000000:db11
>000000000000000000000000000000000000000000000000000000000000000000:db10
>000000000000000000000000000000000000000000000000000000000000000000:db9
>00000000000000000000000000000000000000000000XXXXXXXXXXXXXXXXXXXXXX:db8
>000011110000000000000000000000000000000000000000000000000000000000:db7
>000011110000000000000000000000000000000000000000000000000000000000:db6
>000000000000000000000000000000000000000000000000000000000000000000:db5
>000000000000000000000000000000000000000000000000000000000000000000:db4
>000000000000000000000000000000000000000000000000000000000000000000:db3
>000000000000000000000000000000000000000000000000000000000000000000:db2
>000000001111111111111111111100000000000000000000000000000000000000:db1
>00000000000000000000000000001111111111111111XXXXXXXXXXXXXXXXXXXXXX:db0
>111111111111111111111111111111111111111111110000000000000000111111:selc0
>000000000000000000000000000011111111111111110000000000000000000000:C0tsen
>000000000000001100000000000000000000000000000000000000000000000000:C0stb
>000000000000000000000000000000000000000000000000000000000000000000:selc1
>000000000000000000000000000000000000000000000000000000000000000000:C1tsen
>000000000000000000000000000000000000000000000000000000000000000000:C1stb
>000000000000000000000000000000000000000000001111111111111111000000:R0sel
>000000000000000000000000000000000000000000000000000000000000000000:R0tsen
>000000000000000000000000000000000000000000000000000000000000000000:R0stb
>000000000000000000000000000000000000000000000000000000000000000000:R1sel
>000000000000000000000000000000000000000000000000000000000000000000:R1tsen
>000000000000000000000000000000000000000000000000000000000000000000:R1stb
>000000000000000000000000000000000000000000000000000000000000000000:INRsel
>000000000000000000000000000000000000000000000000000000000000000000:INRtsen
>110011000000000000001100000011000000000000001100000000000000110000:INRstb
>000000000000000000000000000000000000000000000000000000000000000000:ORsel
>000000000000000000000000000000000000000000000000000000000000000000:ORtsen
>000000000000000000000000000000000000000000000000000000000000000000:ORstb
>000000000000000000000000000000000000000000000000000000000000000000:EF0tsen
>000000000000000000000000000000000000000000000000000000000000000000:EF1tsen
>110011000011000000001100000011000011000000001100001100000000110000:pcinc
>000000000000000000000000000000000000000000000000000000110000000000:ads
>000000000000000000000000000000000000000000000000000000111111111111:A11
>000000000000000000000000000000000000000000000000000000000000000000:A10
>000000000000000000000000000000000000000000000000000000111111111111:A9
>000000000000000000000000000000000000000000000000000000000000000000:A8
>000000000000000000000000000000000000000000000000000000111111111111:A7
>000000000000000000000000000000000000000000000000000000000000000000:A6
>000000000000000000000000000000000000000000000000000000111111111111:A5
>000000000000000000000000000000000000000000000000000000111111111111:A4
>000000000000000000000000000000000000000000000000000000111111111111:A3
>000000000000000000000000000011111111111111111111111111111111111111:A2
>000000000011111111111111111100000000000000001111111111000000000000:A1
>000011111100000000001111111100000011111111110000001111000000111111:A0
```

```
7890 transistors, 3884 nodes (0 pulled up)
******** simulation of counter instructions
initialization took 11395 steps
********* SIMULATION RESULTS *******
_____¦__LDI C1,001H__¦DEC C1_¦___TEST C1:0___¦___BNZ1 ABC___¦

>001100110011001100110011001100110011001100110011001100110011001100:sysclk
>111100000000000000000000000000000000000000000000000000000000000000:porst
>110011000000000000001100000011000000000000001100000000000000110000:oclt
>001100000000000000110000001100000000000000110000000000000011000000:mbrh
>000000001100000000000000000000001100000000000000110000000000000011:mbrl
>111111000000000000111100001111000000000000111100000000000011110000:s0
>001100000000000000110000001100000000000000110000000000000011000000:s0clk
>000000111100000000000000000000111100000000000011110000000000001111:s1
>000000000011110000000000000000000000111100000000000011110000000000:s2
>000000000011000000000000000000000000110000000000000011000000000000:s2clk
>000000000000000000000000000000000000000000000000000000000000000000:s2A
>000000000000000000000000000000000000000000000000000000000000000000:s2Aclk
>000000000000001111000011110000000000001111000000000000111100000000:s3
```

```
>0000000000000011000000110000000000000000001100000000000000110000000000:s3clk
>0000111111111111111111111111111111111111111111110000000000000000000000:oc15
>0000111111111111111100000000000000000000000000000000000000000000000000:oc14
>0000000000000000000000000000011111111111111111111111111111111111000000:oc13
>0000111111111111111100000000000000000000000000001111111111111111000000:oc12
>0000000000000000000000000000000000000000000000001111111111111111000000:oc11
>0000000000000000000000000000000000000000000000000000000000000000000000:oc10
>0000000000000000000000000000000000000000000000001111111111111111000000:oc9
>0000000000000000000011111111111111111111111111110000000000000000000000:oc8
>1111000000000000000000000000000000000000000000000000000000000000111111:BR
>0000000000000000000000000000000000000000000000000000000000000000000000:cb
>0000000000000000000000000000000000000000000000001111111111111111000000:BNZ
>0000000000000000000000000000000000000000000000000000000000000000000000:BBT
>0000000000000000000000000000000000000000000000000000000000000000000000:SR
>0000000000000000000000000000000000000000000000000000000000000000000000:OUTB
>0000000000000000000000000000000000000000000000000000000000000000000000:OUTW
>0000000000000000000011111110000000000000000000000000000000000000000000:sd
>0000000000000000000000000001111111111111111000000000000000000000000000:TEST
>0000000000000000000000000000000000000000000000000000000000000000000000:LD
>0000111111111111111100000000000000000000000000000000000000000000000000:LDI
>0000000000000000000000000000000000000000000000000000000000000000000000:ZF0
>0000000000000111111100000000000000000000000000000000000000000000000000:ZF1
>00000000011111111111XXXXXXX000000000000000000000XXXXXXXXXXXXXXXXXXXXXX:Di
>1111111111111111111111111111111111111110000000000000000000000000000000:BF
>1111111111111111111111111111111111111111111111111111111111111111111111:EF0
>0000000001111111111111111111111111111111111111111111111111111111111111:EF1
>1111100000111111111111111000000000000000000000001111110000000000000000:D7
>1111100000000000000000000000000000000000000000000000000000000000000000:D6
>0000000000000000000000000011111100000011111111111111000000000000000000:D5
>1111100000000000000000000000000000000011111111111111000000000000000000:D4
>0000000000000000000000000000000000000001111111111111000000000000000000:D3
>0000000000000000000000000000000000000000000000001111110000000000000000:D2
>0000000000000000000000000000000000000000111111110000000000000000000000:D1
>0000011111111111111111111111100000000000000000000000000000000000000000:D0
>000000000000000000000000000000000000000000000000XXXXXXXXXXXXXXXXXXXXXX:db11
>0000000000000000000000000000000000000000000000000000000000000000000000:db10
>000000000000000000000000000000000000000000000000XXXXXXXXXXXXXXXXXXXXXX:db9
>00000000000000000011XXXXXXX000000000000000000000XXXXXXXXXXXXXXXXXXXXXX:db8
>0000111100000000000000000000000000000000000000000000000000000000000000:db7
>0000111100000000000000000000000000000000000000000000000000000000000000:db6
>0000000000000000000000000000000000000000000000000000000000000000000000:db5
>00001111000000000000XXXXXXX000000000000000000000XXXXXXXXXXXXXXXXXXXXXX:db4
>0000000000000000000000000000000000000000000000000000000000000000000000:db3
>0000000000000000000000000000000000000000000000000000000000000000000000:db2
>0000000000000000000000000000000000000000000000000000000000000000000000:db1
>00000000011111111111XXXXXXX000000000000000000000XXXXXXXXXXXXXXXXXXXXXX:db0
>1111111111111111111100000000000000000000000000000000000000000000111111:selc0
>0000000000000000000000000000000000000000000000000000000000000000000000:C0tsen
>0000000000000000000000000000000000000000000000000000000000000000000000:C0stb
>0000000000000000000011111111111111111111111110000000000000000000000000:selc1
>0000000000000000000000000000011111111111111110000000000000000000000000:C1tsen
>0000000000000110000000000000000000000000000000000000000000000000000000:C1stb
>0000000000000000000000000000000000000000000000001111111111111111000000:R0sel
>0000000000000000000000000000000000000000000000000000000000000000000000:R0tsen
>0000000000000000000000000000000000000000000000000000000000000000000000:R0stb
>0000000000000000000000000000000000000000000000000000000000000000000000:R1sel
>0000000000000000000000000000000000000000000000000000000000000000000000:R1tsen
>0000000000000000000000000000000000000000000000000000000000000000000000:R1stb
>0000000000000000000000000000000000000000000000000000000000000000000000:INRsel
>0000000000000000000000000000000000000000000000000000000000000000000000:INRtsen
>1100110000000000000110000000110000000000000000110000000000000000110000:INRstb
>0000000000000000000000000000000000000000000000000000000000000000000000:ORsel
>0000000000000000000000000000000000000000000000000000000000000000000000:ORtsen
>0000000000000000000000000000000000000000000000000000000000000000000000:ORstb
>0000000000000000000000000000000000000000000000000000000000000000000000:EF0tsen
>0000000000000000000000000000000000000000000000000000000000000000000000:EF1tsen
>1100110000110000000001100000011000011000000000110000110000000000110000:pcinc
>0000000000000000000000000000000000000000000000000000000000000000000000:ads
```

```
>000000000000000000000000000000000000000000000000000000000000000000:A11
>000000000000000000000000000000000000000000000000000000000000000000:A10
>000000000000000000000000000000000000000000000000000000000000000000:A9
>000000000000000000000000000000000000000000000000000000000000000000:A8
>000000000000000000000000000000000000000000000000000000000000000000:A7
>000000000000000000000000000000000000000000000000000000000000000000:A6
>000000000000000000000000000000000000000000000000000000000000000000:A5
>000000000000000000000000000000000000000000000000000000000000000000:A4
>000000000000000000000000000000000000000000000000000000000000111111:A3
>000000000000000000000000000011111111111111111111111111111111000000:A2
>000000000111111111111111111100000000000000000011111111111111000000:A1
>000011111100000000001111111100000011111111110000001111111111000000:A0
7694 transistors, 3870 nodes (0 pulled up)
******** ESIM runs on R0 instructions
initialization took 10639 steps
_____LDI R1,3A4 _____SET_R1,1________RESET_R1,7______LD_PC,R1
_____s0__s1__s2__s3__s0__s1__s2__s3__s0__s1__s2__s3__s0__s1__s2__s3
______1_______________1_______________1_______________1____________
>001100110011001100110011001100110011001100110011001100110011001100:sysclk
>111100000000000000000000000000000000000000000000000000000000000000:porst
>110011000000000000001100000000000000110000000000000011000000000000:oclt
>111111000000000000111100000000000011110000000000001111000000000000:s0
>000000111100000000000011110000000000001111000000000000111100000000:s1
>000000000011110000000000001111000000000000111100000000000011110000:s2
>000000000000000000000000000000000000000000000000000000000000000000:s2A
>000000000000001111000000000000111100000000000011110000000000001111:s3
>001100000000000000110000000000000011000000000000001100000000000000:s0clk
>000000000011000000000000001100000000000000110000000000000011000000:s2clk
>000000000000000000000000000000000000000000000000000000000000000000:s2Aclk
>000000000000001100000000000000110000000000000011000000000000001100:s3clk
>000011111111111111110000000000000000000000000000000011111111111111:oc15
>000011111111111111111111111111111111111111111111111100000000000000:oc14
>000011111111111111110000000000000000000000000000000011111111111111:oc13
>000011111111111111111111111111111111111111111111111111111111111111:oc12
>000000000000000000000000000000000000000000000000000000000000000000:oc11
>000000000000000000000000000000000000000000000000000011111111111111:oc10
>000011111111111111111111111111111111111111111111111111111111111111:oc9
>000011111111111111111111111111111111111111111111111111111111111111:oc8
>001100000000000000110000000000000011000000000000001100000000000000:mbrh
>000000001100000000000000110000000000000011000000000000001100000000:mbrl
>111100000000000000000000000000000000000000000000000000000000000000:BR
>000000000000000000000000000000000000000000000000000000000000000000:cb
>000000000000000000000000000000000000000000000000000000000000000000:BNZ
>000000000000000000000000000000000000000000000000000000000000000000:BBT
>000000000000000000001111111111111111111111111111111100000000000000:SR
>000000000000000000000000000000000000000000000000000000000000000000:OUTB
>000000000000000000000000000000000000000000000000000000000000000000:OUTW
>000000000000000000000000000000000000000000000000000000000000000000:sd
>000000000000000000000000000000000000000000000000000000000000000000:TEST
>000000000000000000000000000000000000000000000000000011111111111111:LD
>000011111111111111110000000000000000000000000000000000000000000000:LDI
>111111111110000000000000000000000000000000011111111110000000000000:D7
>111110000001111111110000001111111111111111100000000000000000000000:D6
>111111111110000000000000000000000000001111111111111111111111000000:D5
>111110000001111111111111111111111111111111111111111111111111000000:D4
>000000000000000000000000000000000000000000000000000000000000000000:D3
>000001111110000000000000000000000000000000011111111110000000000000:D2
>111110000001111111110000001111111111100000011111111110000000000000:D1
>111110000001111111111111111111111111100000011111111110000000000000:D0
>000000000000000000000000000000000000000000000000000000000000000000:db11
>000000000000000000000000000000000000000000000000000011110000000000:db10
>000011111111111111111111111111111111111111111111111111111111111111:db9
>000011111111111111111111111111111111111111111111111111111111111111:db8
>000011111111111111111111111111111111111111110000000000000000000000:db7
>000011110000000000000000000000000000000000000000000011110000000000:db6
>000011111111111111111111111111111111111111111111111111111111111111:db5
>000011110000000000000000000000000000000000000000000011110000000000:db4
>000000000000000000000000000000000000000000000000000000000000000000:db3
```

```
>000000011111111111111111111111111111111111111111111110000111111111:db2
>000011100000000000000000000001111111111111111111111111110000111111111:db1
>000011100000000000000000000000000000000000000000000000000000000000:db0
>111100000000000000000000000000000000000000000000000000000000000000:selc0
>000000000000000000000000000000000000000000000000000000000000000000:C0tsen
>000000000000000000000000000000000000000000000000000000000000000000:C0stb
>000000000000000000000000000000000000000000000000000000000000000000:selc1
>000000000000000000000000000000000000000000000000000000000000000000:C1tsen
>000000000000000000000000000000000000000000000000000000000000000000:C1stb
>000000000000000000000000000000000000000000000000000000000000000000:R0sel
>000000000000000000000000000000000000000000000000000000000000000000:R0tsen
>000000000000000000000000000000000000000000000000000000000000000000:R0stb
>000011111111111111111111111111111111111111111111111100000000000000:R1sel
>000000000000000000000111100000000000000001111000000000000111111111:R1tsen
>000000000000011000000000000110000000000000000001100000000000000000:R1stb
>111111111111111111111111111111111111111111111111111111111111111111:LDIR0*
>111111111111100111111111111111111111111111111111111111111111111111:LDIR1*
>000000000000000000000000000000000000000000000000000000000000000000:INRsel
>000000000000000000000000000000000000000000000000000000000000000000:INRtsen
>110011000000000000001100000000000000110000000000000011000000000000:INRstb
>000000000000000000000000000000000000000000000000000000000000000000:ORsel
>000000000000000000000000000000000000000000000000000000000000000000:ORtsen
>000000000000000000000000000000000000000000000000000000000000000000:ORstb
>000000000000000000000000000000000000000000000000000000000000000000:TRsel
>000000000000000000000000011111111100000000111111111000000000000000:TRtsen
>000000000000000000000000110011000000000011001100000000000000000000:TRstb
>111111111111111111111111000000000000000000000000000000000000000000:AB7
>111111110000000000000000000000000000000011111111111111110000000000:AB6
>111111111111111111111111000000000000000011111111111111111111111111:AB5
>111111110000000000000000111111111111111111111111111111111111111111:AB4
>110011000011000000001100001100000000110000110000000000110000110000000:pcinc
>000000000000000000000000000000000000000000000000000000000000001100:ads
>000000000000000000000000000000000000000000000000000000000000000000:A11
>000000000000000000000000000000000000000000000000000000000000000000:A10
>000000000000000000000000000000000000000000000000000000000000001111:A9
>000000000000000000000000000000000000000000000000000000000000001111:A8
>000000000000000000000000000000000000000000000000000000000000000000:A7
>000000000000000000000000000000000000000000000000000000000000000000:A6
>000000000000000000000000000000000000000000000000000000000000001111:A5
>000000000000000000000000000000000000000000000000000000000000000000:A4
>000000000000000000000000000000000000000000000000000000000011110000:A3
>000000000000000000000000001111111111111111111111111111111100001111:A2
>000000000011111111111111110000000000000000111111111111111100001111:A1
>000011111100000000001111110000000000111111000000000011111100000000:A0
```

```
7886 transistors, 3882 nodes (0 pulled up)
******** simulation of counter instructions
initialization took 11411 steps
********* SIMULATION RESULTS *******
_____|__LDI C0,0AAH__|SHR C0_|DEC C0_|___LD OUTR,C0__|___BR 0

>001100110011001100110011001100110011001100110011001100110011001100:sysclk
>111100000000000000000000000000000000000000000000000000000000000000:porst
>110011000000000000001100000011000000110000000000000011000000000011:oclt
>001100000000000000110000000011000000110000000000000011000000000011 00:mbrh
>000000001100000000000000000000000000000011000000000000001100000000:mbrl
>111111000000000000111100001111000011110000000000000011110000000000001111:s0
>001100000000000000110000000011000000110000000000000011000000000011 00:s0clk
>000000111100000000000000000000000000001111000000000000111100000000:s1
>000000000011110000000000000000000000000000111100000000000000000000:s2
>000000000011000000000000000000000000000000110000000000000000000000:s2clk
>000000000000000000000000000000000000000000000000000000000000000000:s2A
>000000000000000000000000000000000000000000000000000000000000000000:s2Aclk
>000000000000001111000011110000111100000000000011110000000011110000:s3
>000000000000001100000011000000110000000000000011000000000011000000:s3clk
>000011111111111111111111111111111111111111111111110000000000000000:oc15
>000011111111111111000000000000000000000000000000000000000000000000:oc14
>000000000000000000000000000000000011111111111111110000000000000000:oc13
```

```
>0000000000000000000011111111000000011111111111111110000000000000:oc12
>0000000000000000000000000000000000000000000000000000000000000000:oc11
>0000000000000000000000000000000000011111111111111110000000000000:oc10
>0000000000000000000000000000000000000000000000000000000000000000:oc9
>0000000000000000000000000000000000000000000000000000000000000000:oc8
>1111000000000000000000000000000000000000000000000001111111111111:BR
>0000000000000000000000000000000000000000000000000000000000000000:cb
>0000000000000000000000000000000000000000000000000000000000000000:BNZ
>0000000000000000000000000000000000000000000000000000000000000000:BBT
>0000000000000000000000000000000000000000000000000000000000000000:SR
>0000000000000000000000000000000000000000000000000000000000000000:OUTB
>0000000000000000000000000000000000000000000000000000000000000000:OUTW
>0000000000000000000011111111111111100000000000000000000000000000:sd
>0000000000000000000000000000000000000000000000000000000000000000:TEST
>0000000000000000000000000000000000011111111111111110000000000000:LD
>0000111111111111100000000000000000000000000000000000000000000000:LDI
>1111111111111100000000000000000000000000000000000000000000000000:ZF0
>1111111111111111111111111111111111111111111111111111111111111111:ZF1
>00000000000000000000000000000000000XXXX000000000000000XXXXXXXXXX:Di
>1111111111111111111111111111111111111111111111111111111111111111:BF
>1111111111111111111111111111111111111111111111111111111111111111:EF0
>0000000001111111111111111111111111111111111111111111111111111111:EF1
>1111111111111111111111111111111111110000000000000000000000000000:D7
>1111100000000000000000000000000000000000000000000000000000000000:D6
>0000011111100000000000000000111111100000000000000000000000000000:D5
>0000000000111111111000000001111111111111100000000000000000000000:D4
>0000011111100000000000000000000000000000000000000000000000000000:D3
>0000000000000000000000000000111111100000000000000000000000000000:D2
>0000011111100000000000000000000000000000000000000000000000000000:D1
>0000000000000000000000000000000000000000000000000000000000000000:D0
>00000000000000000000XXXXXXXXXXXXXXXXXXX000000000000XXXXXXXXXXXXX:db11
>00000000000000000000000000000000000XXXX0000000000000000000000000:db10
>00000000000000000000000000000000000XXXX000000000000XXXXXXXXXXXXX:db9
>00000000000000000000000000000000000XXXX000000000000XXXXXXXXXXXXX:db8
>00001111111111111111111111111111111XXXX0000000000000000000000000:db7
>00001111000000000000000000000000000XXXX000000000000XXXXXXXXXXXXX:db6
>0000000011111111111XXXXXXXXXXXXXXXXXXXX000000000000XXXXXXXXXXXXX:db5
>00000000000000000000000000000000000XXXX000000000000XXXXXXXXXXXXX:db4
>00000000111111111111111111111111111XXXX0000000000000000000000000:db3
>00000000000000000000000000000000000XXXX000000000000XXXXXXXXXXXXX:db2
>00000000111111111111111111111111111XXXX0000000000000000000000000:db1
>00000000000000000000000000000000000XXXX000000000000XXXXXXXXXXXXX:db0
>1111111111111111111111111111111111100000000000000001111111111111:selc0
>0000000000000000000000000000000000000000000000000000000000000000:C0tsen
>0000000000000011000000000000000000000000000000000000000000000000:C0stb
>0000000000000000000000000000000000000000000000000000000000000000:selc1
>0000000000000000000000000000000000000000111111111110000000000000:C1tsen
>0000000000000000000000000000000000000000000000000000000000000000:C1stb
>0000000000000000000000000000000000000000000000000000000000000000:R0sel
>0000000000000000000000000000000000001111000000000000000000000000:R0tsen
>0000000000000000000000000000000000000000000000000000000000000000:R0stb
>0000000000000000000000000000000000000000000000000000000000000000:R1sel
>0000000000000000000000000000000000000000000000000000000000000000:R1tsen
>0000000000000000000000000000000000000000000000000000000000000000:R1stb
>0000000000000000000000000000000000000000000000000000000000000000:INRsel
>0000000000000000000000000000000000000000000000000000000000000000:INRtsen
>1100110000000000001100000011000000110000000000000011000000000011:INRstb
>0000000000000000000000000000000000001111111111111111000000000000:ORsel
>0000000000000000000000000000000000000000000000000000000000000000:ORtsen
>0000000000000000000000000000000000000000000011000000000000000000:ORstb
>0000000000000000000000000000000000000000000000000000000000000000:EF0tsen
>0000000000000000000000000000000000000000000000000000000000000000:EF1tsen
>1100110000110000000011000000110000110000011000000011000000000011:pcinc
>0000000000000000000000000000000000000000000000000000000011000000:ads
>0000000000000000000000000000000000000000000000000000000000000000:A11
>0000000000000000000000000000000000000000000000000000000000000000:A10
>0000000000000000000000000000000000000000000000000000000000000000:A9
>0000000000000000000000000000000000000000000000000000000000000000:A8
>0000000000000000000000000000000000000000000000000000000000000000:A7
```

```
>000000000000000000000000000000000000000000000000000000000000000000:A6
>000000000000000000000000000000000000000000000000000000000000000000:A5
>000000000000000000000000000000000000000000000000000000000000000000:A4
>000000000000000000000000000000000000000000000000000000000000000000:A3
>000000000000000000000000000011111111111111111111111111111100000000:A2
>000000000011111111111111110000000000000000111111111111111100000000:A1
>000011111100000000001111111100000000111111000000000011111110000011:A0
>000000000000000000000000000000000000000000000000000000000000000000:O11
>000000000000000000000000000000000000000000000000000000000000000000:O10
>000000000000000000000000000000000000000000000000000000000000000000:O9
>000000000000000000000000000000000000000000000000000000000000000000:O8
>111111111111111111111111111111111111111111000000000000000000000000:O7
>111111111111111111111111111111111111111111000000000000000000000000:O6
>000000000000000000000000000000000000000000000000000000000000000000:O5
>000000000000000000000000000000000000000000000000000000000000000000:O4
>000000000000000000000000000000000000000000000000000000000000000000:O3
>111111111111111111111111111111111111111111000000000000000000000000:O2
>111111111111111111111111111111111111111111000000000000000000000000:O1
>000000000000000000000000000000000000000000000000000000000000000000:O0
>000000000000000000000111111100000000000000000000000000000000000000:sout0
>000000000000000000000000000000000000000000000000000000000000000000:sout1

7890 transistors, 3883 nodes (0 pulled up)
******** simulation of OUTW & RESET instructions
initialization took 11487 steps
********* SIMULATION RESULTS *******
_____|___OUTW FFF__|_RESET OUTR:9__|_RESET OUTR:A__|_RESET OUTR:B__

>001100110011001100110011001100110011001100110011001100110011001100:sysclk
>111100000000000000000000000000000000000000000000000000000000000000:porst
>110011000000000000001100000000000000110000000000000011000000000000:oclt
>001100000000000000110000000000000011000000000000001100000000000000:mbrh
>000000001100000000000000110000000000000011000000000000001100000000:mbrl
>111111000000000000111100000000000011110000000000001111000000000000:s0
>001100000000000000110000000000000011000000000000001100000000000000:s0clk
>000000111100000000000011110000000000001111000000000000111100000000:s1
>000000000011110000000000001111000000000000111100000000000011110000:s2
>000000000011000000000000001100000000000000110000000000000011000000:s2clk
>000000000000000000000000000000000000000000000000000000000000000000:s2A
>000000000000000000000000000000000000000000000000000000000000000000:s2Aclk
>000000000000001111000000000000111100000000000011110000000000001111:s3
>000000000000001100000000000000110000000000000011000000000000001100:s3clk
>000000000000000000000000000000000000000000000000000000000000000000:oc15
>000011111111111111111111111111111111111111111111111111111111111111:oc14
>000011111111111111110000000000000000000000000000000000000000000000:oc13
>000011111111111111111111111111111111111111111111111111111111111111:oc12
>000011111111111111110000000000000000000000000000000000000000000000:oc11
>000011111111111111111111111111111111111111111111111111111111111111:oc10
>000011111111111111110000000000000000000000000000000000000000000000:oc9
>000011111111111111110000000000000000000000000000000000000000000000:oc8
>111000000000000000000000000000000000000000000000000000000000000000:BR
>000000000000000000000000000000000000000000000000000000000000000000:cb
>000000000000000000000000000000000000000000000000000000000000000000:BNZ
>000000000000000000000000000000000000000000000000000000000000000000:BBT
>000000000000000000001111111111111111111111111111111111111111111111:SR
>000000000000000000000000000000000000000000000000000000000000000000:OUTB
>000011111111111111110000000000000000000000000000000000000000000000:OUTW
>000000000000000000000000000000000000000000000000000000000000000000:sd
>000000000000000000000000000000000000000000000000000000000000000000:TEST
>000000000000000000000000000000000000000000000000000000000000000000:LD
>000000000000000000000000000000000000000000000000000000000000000000:LDI
>000000000000000000000000000000000000000000000000000000000000000000:ZF0
>000000000000000000000000000000000000000000000000000000000000000000:ZF1
>00000000111111111111111111110000000XXXX001111000000000000111000000:Di
>111111111111111111111111111111111111111111111111111111111111111111:BF
>111111111111111111111111111111111111111111111111111111111111111111:EF0
>000000000111111111111111111111111111111111111111111111111111111111:EF1
>000000000000000000000000000000000010000000000000000000000000000000:EF0stb
>000000000100000000000000000000000000000000000000000000000000000000:EF1stb
```

```
>000001111111100000000111111110000000011111111000000001111111111111:D7
>111111111111111111111000000001111111100000000111111110000000000000:D6
>111111111111100000000000000000000000011111111000000001111111111111:D5
>111111111111111111111111111111111111100000000111111111111111111111:D4
>111111111111100000000000000000000000000000000000000000000000000000:D3
>111111111111111111111000000001111111100000000111111110000000000000:D2
>111111111111100000000000000000000000000000000000000000000000000000:D1
>111111111111100000000000000000000000000000000000000000000000000000:D0
>000011111111111111000011111111111111111111111111111111111111000000:db11
>000011111111111111111111111111111111111111000000000000000000000000:db10
>0000111111111111110000111111000000XXXX000000000000XXXX000000000000:db9
>000011111111111111000011111111111111111111111111111111111111111111:db8
>000000001111111111111111111111111111111111111111111111111111111111:db7
>000011111111111111111111111111111111111111111111111111111111111111:db6
>000011111111111111111111111111111111111111111111111111111111111111:db5
>000011111111111111111111111111111111111111111111111111111111111111:db4
>000011111111111111111111111111111111111111111111111111111111111111:db3
>000011111111111111111111111111111111111111111111111111111111111111:db2
>000011111111111111111111111111111111111111111111111111111111111111:db1
>000011111111111111111111111111111111111111111111111111111111111111:db0
>111100000000000000000000000000000000000000000000000000000000000000:selc0
>000000000000000000000000000000000000000000000000000000000000000000:C0tsen
>000000000000000000000000000000000000000000000000000000000000000000:C0stb
>000000000000000000000000000000000000000000000000000000000000000000:selc1
>000000000000000000000000000000000000000000000000000000000000000000:C1tsen
>000000000000000000000000000000000000000000000000000000000000000000:C1stb
>000000000000000000000000000000000000000000000000000000000000000000:R0sel
>000000000000000000000000000000000000000000000000000000000000000000:R0tsen
>000000000000000000000000000000000000000000000000000000000000000000:R0stb
>000000000000000000000000000000000000000000000000000000000000000000:R1sel
>000000000000000000000000000000000000000000000000000000000000000000:R1tsen
>000000000000000000000000000000000000000000000000000000000000000000:R1stb
>000000000000000000000000000000000000000000000000000000000000000000:INRsel
>000000000000000000000000000000000000000000000000000000000000000000:INRtsen
>110011000000000000001100000000000000110000000000000011000000000000:INRstb
>000000000000000000001111111111111111111111111111111111111111111111:ORsel
>000000000000000000000011110000000000001111000000000000111100000000:ORtsen
>000000000000001100000000000000110000000000000011000000000000001100:ORstb
>000000000000000000000000000000000000000000000000000000000000000000:EF0tsen
>000000000000000000000000000000000000000000000000000000000000000000:EF1tsen
>110011000011000000001100001100000000110000110000000011000011000000:pcinc
>000000000000000000000000000000000000000000000000000000000000000000:ads
>000000000000000000000000000000000000000000000000000000000000000000:A11
>000000000000000000000000000000000000000000000000000000000000000000:A10
>000000000000000000000000000000000000000000000000000000000000000000:A9
>000000000000000000000000000000000000000000000000000000000000000000:A8
>000000000000000000000000000000000000000000000000000000000000000000:A7
>000000000000000000000000000000000000000000000000000000000000000000:A6
>000000000000000000000000000000000000000000000000000000000000000000:A5
>000000000000000000000000000000000000000000000000000000000000000000:A4
>000000000000000000000000000000000000000000000000000000000001111111:A3
>000000000000000000000000001111111111111111111111111111111100000000:A2
>000000000111111111111111110000000000000000111111111111111100000000:A1
>000011111100000000001111110000000000111111000000000011111100000000:A0
>000000000000001111111111111111111111111111111111111111111111110000:O11
>000000000000001111111111111111111111111111111100000000000000000000:O10
>000000000000001111111111111111000000000000000000000000000000000000:O9
>000000000000001111111111111111111111111111111111111111111111111111:O8
>111111111111111111111111111111111111111111111111111111111111111111:O7
>111111111111111111111111111111111111111111111111111111111111111111:O6
>000000000000001111111111111111111111111111111111111111111111111111:O5
>000000000000001111111111111111111111111111111111111111111111111111:O4
>000000000000001111111111111111111111111111111111111111111111111111:O3
>111111111111111111111111111111111111111111111111111111111111111111:O2
>111111111111111111111111111111111111111111111111111111111111111111:O1
>000000000000001111111111111111111111111111111111111111111111111111:O0
```

```
7890 transistors, 3884 nodes (0 pulled up)
******** simulation of TEF & CEF instructions
initialization took 11395 steps
********* SIMULATION RESULTS *******
_____|_____CEF0_____|_____TEF0_____|_____TEF0_____|___BBT 73A_____

>001100110011001100110011001100110011001100110011001100110011001100:sysclk
>111100000000000000000000000000000000000000000000000000000000000000:porst
>110011000000000000001100000000000000110000000000000011000000000000:oclt
>001100000000000000110000000000000011000000000000001100000000000000:mbrh
>000000001100000000000000110000000000000011000000000000001100000000:mbrl
>111111000000000000111100000000000011110000000000001111000000000000:s0
>001100000000000000110000000000000011000000000000001100000000000000:s0clk
>000000111100000000000011110000000000001111000000000000111100000000:s1
>000000000011110000000000000011110000000000001111000000000000111100:s2
>000000000011000000000000000011000000000000001100000000000000110000:s2clk
>000000000000000000000000000000000000000000000000000000000000000000:s2A
>000000000000000000000000000000000000000000000000000000000000000000:s2Aclk
>000000000000001111000000000000111100000000000011110000000000001111:s3
>000000000000001100000000000000110000000000000011000000000000001100:s3clk
>000000000000000000001111111111111111111111111111111100000000000000:oc15
>000011111111111111110000000000000000000000000000000011111111111111:oc14
>000011111111111111111111111111111111111111111111111100000000000000:oc13
>000000000000000000000000000000000000000000000000000000000000000000:oc12
>000000000000000000000000000000000000000000000000000000000000000000:oc11
>000000000000000000001111111111111111111111111111111111111111111111:oc10
>000000000000000000000000000000000000000000000000000011111111111111:oc9
>000000000000000000001111111111111111111111111111111111111111111111:oc8
>111100000000000000000000000000000000000000000000000000000000000000:BR
>000000000000000000000000000000000000000000000000000000000000000000:cb
>000000000000000000000000000000000000000000000000000000000000000000:BNZ
>000000000000000000000000000000000000000000000000000011111111111111:BBT
>000000000000000000000000000000000000000000000000000000000000000000:SR
>000011111111111111110000000000000000000000000000000000000000000000:OUTB
>000000000000000000000000000000000000000000000000000000000000000000:OUTW
>000000000000000000000000000000000000000000000000000000000000000000:sd
>000000000000000000001111111111111111111111111111111100000000000000:TEST
>000000000000000000000000000000000000000000000000000000000000000000:LD
>000000000000000000000000000000000000000000000000000000000000000000:LDI
>000000000000000000000000000000000000000000000000000000000000000000:ZF0
>000000000000000000000000000000000000000000000000000000000000000000:ZF1
>000000000000000000000000000000000111111111111111111111XXXX0000000000:Di
>111111111111111111111111111110000000000000000111111111111111111111:BF
>111111111111100000000000000000000111111111111111111111111111111111:EF0
>000000001111111111111111111111111111111111111111111111111111111111:EF1
>000000000000000000000000000000000100000000000000000000000000000000:EF0stb
>000000001000000000000000000000000000000000000000000000000000000000:EF1stb
>000001111111111111111111111111111111111111110000000000000000000000:D7
>111111111111100000001111111100000000111111111111111100000000000000:D6
>111111111111111111111111111111111111111111110000000011111111111111:D5
>000000000000000000000000000000000000000000000000000011111111111111:D4
>000000000000000000000000000000000000000000000000000011111111111111:D3
>000000000000011111110000000011111111000000001111111100000000000000:D2
>000000000000000000000000000000000000000000001111111111111111111111:D1
>000000000000011111110000000011111111000000001111111100000000000000:D0
>000000000000000000000000000000000000000000000000000000000000000000:db11
>000000000000000000000000000000000000000000000000000000000000000000:db10
>000000000000000000000000000000000000000000000000000000000000000000:db9
>000000000000000000000000000000000000000000000000000000000000000000:db8
>000000000000000000000000000000000000000000000000000000000000000000:db7
>000000000000000000000000000000000000000000000000000000000000000000:db6
>000000000000000000000000000000000000000000000000000000000000000000:db5
>000000000000000000000000000000000000000000000000000000000000000000:db4
>000000000000000000000000000000000000000000000000000000000000000000:db3
>000000000000000000000000000000000000000000000000000000000000000000:db2
>000000000000000000000000000000000000000000000000000000000000000000:db1
>0000000000000000000000000000000001111111111111111111XXXXXXXXXXXXXX:db0
>111111111111111111110000000000000000000000000000000000000000000000:selc0
```

```
>000000000000000000000000000000000000000000000000000000000000000000:C0tsen
>000000000000000000000000000000000000000000000000000000000000000000:C0stb
>000000000000000000000000000000000000000000000000000000000000000000:selc1
>000000000000000000000000000000000000000000000000000000000000000000:C1tsen
>000000000000000000000000000000000000000000000000000000000000000000:C1stb
>000000000000000000000000000000000000000000000000000000000000000000:R0sel
>000000000000000000000000000000000000000000000000000000000000000000:R0tsen
>000000000000000000000000000000000000000000000000000000000000000000:R0stb
>000000000000000000000000000000000000000000000000000000000000000000:R1sel
>000000000000000000000000000000000000000000000000000000000000000000:R1tsen
>000000000000000000000000000000000000000000000000000000000000000000:R1stb
>000000000000000000001111111111111111111111111111111100000000000000:INRsel
>000000000000000000000000000000000000000000000000000000000000000000:INRtsen
>110011000000000000001100000000000000110000000000000011000000000000:INRstb
>000000000000000000000000000000000000000000000000000000000000000000:ORsel
>000000000000000000000000000000000000000000000000000000000000000000:ORtsen
>000000000000001100000000000000000000000000000000000000000000000000:ORstb
>000000000000000000001111111111111111111111111111111100000000000000:EF0tsen
>000000000000000000000000000000000000000000000000000000000000000000:EF1tsen
>110011000011000000001100001100000000110000110000000011000011000000:pcinc
>000000000000000000000000000000000000000000000000000000000000001100:ads
>000000000000000000000000000000000000000000000000000000000000000000:A11
>000000000000000000000000000000000000000000000000000000000000001111:A10
>000000000000000000000000000000000000000000000000000000000000001111:A9
>000000000000000000000000000000000000000000000000000000000000001111:A8
>000000000000000000000000000000000000000000000000000000000000000000:A7
>000000000000000000000000000000000000000000000000000000000000000000:A6
>000000000000000000000000000000000000000000000000000000000000001111:A5
>000000000000000000000000000000000000000000000000000000000000001111:A4
>000000000000000000000000000000000000000000000000000000000011111111:A3
>000000000000000000000000001111111111111111111111111111111100000000:A2
>000000000011111111111111110000000000000000111111111111111100001111:A1
>000011111100000000001111110000000000111111000000000011111100000000:A0
```

What is claimed is:

1. A binary decision apparatus for executing a plurality of program instructions, said binary decision apparatus comprising:

a programmed read only memory for providing each of said program instructions, each of said program instructions having at least a first byte of control data;

memory buffer register means, connected to said programmed read only memory, for receiving and storing therein said program instructions;

instruction register means, connected to said memory buffer register means, for storing therein the first byte of control data of each of said program instructions;

instruction decoding means, connected to said instruction register means, for receiving and decoding the first byte of control data of each of said program instructions to provide a plurality of digital input condition signals, each of said digital input condition signals having a binary value;

machine cycle timing generating means, connected to said instruction decoding means, said instruction register means and said memory buffer register means, for providing a predetermined number of state machine timing signals for each of said program instructions, said predetermined number of state machine timing signals provided for each of said program instructions being dependent upon the binary value of each of said digital input condition signals;

said predetermined number of state machine timing signals for each of said program instructions including at least a first state machine timing signal and a last of said predetermined number of state machine timing signals;

said first state machine timing signal having a logic one portion and a logic zero portion, the first byte of control data of each of said program instructions being latched into said memory buffer register means during the logic one portion of said first state machine timing signal, the first byte of control of each of said program instructions being latched into said instruction register means during the logic zero portion of said first state machine timing signal and the first byte of control data of each of said program instructions being decoded by said instruction decoding means during the logic zero portion of said first state machine timing signal;

each of said program instructions being executed by said binary decision apparatus during the last of said predetermined number of state machine timing signals; and program counter means, connected to said memory buffer register means, said programmed read only memory and said machine cycle timing generating means, for generating at least one address for each of said program instructions;

said program counter means providing said at least one address for each of said program instructions to said programmed read only memory.

2. A binary decision apparatus for executing a plurality of program instructions, said binary decision apparatus comprising:

a programmed read only memory for providing each of said program instructions, each of said program instructions having a first byte of control bits;

memory buffer register means, connected to said programmed read only memory, for receiving and storing therein each of said program instructions, said memory buffer register means having a first latch and a second latch;

instruction register means, connected to said memory buffer register means, for receiving and storing therein the first byte of control bits of each of said program instructions;

instruction decoding means, connected to said instruction register means, for decoding the first byte of control bits of each of said program instructions to provide a plurality of digital input condition signals;

said digital input condition signals comprising a conditional branch signal, a not conditional branch signal, a shift decrement signal, and a branch signal;

machine cycle timing generating means, connected to said instruction decoding means, said instruction register means and said memory buffer register means, for receiving said digital input condition signals;

said machine cycle timing generating means, responsive to said digital input condition signals, providing a first state machine timing signal, a second state machine timing signal, a third state machine timing signal, a fourth state machine timing signal and a fifth state machine timing signal;

said machine cycle timing generating means providing at least said first state machine timing signal and said fifth state machine timing signal for each of said program instructions decoded by said instruction decoding means;

said first state machine timing signal having a logic one portion and a logic zero portion, the first byte of control bits of each of said program instructions being latched into said memory buffer register means during the logic one portion of said first state machine timing signal, the first byte of control bits of each of said program instructions being latched into said instruction register means during the logic zero portion of said first state machine timing signal and the first byte of control bits of each of said program instructions being decoded by said instruction decoding means during the logic zero portion of said first state machine timing signal;

each of said program instructions being executed by said binary decision apparatus during said fifth state machine timing signal; and program counter means, connected to said memory buffer register means, said programmed read only memory and said machine cycle timing generating means, for generating at least one address for each of said program instructions;

said program counter means supplying the at least one address for each of said program instructions to said programmed read only memory;

said programmed read only memory, responsive to the at least one address for each of said program instructions, providing each of said program instructions to said memory buffer register means.

3. The binary decision apparatus of claim 2 wherein said machine cycle timing generating means comprises:

a first master slave D flip-flop 132 having a data input, a clock input, a Q output and a not Q output;

a second master slave D flip-flop 134 having a data input, a clock input, a Q output and a not Q output;

a third master slave D flip-flop 136 having a data input, a clock input, a Q output and a not Q output;

the clock input of said first master slave D flip-flop 132, the clock input of said second master slave D flip-flop 134 and the clock input of said third master slave D flip-flop 136 each being coupled to receive an externally generated clock signal;

a first nand gate 144 having a first input for receiving the not conditional branch signal provided by said instruction decoding means, a second input connected to the not Q output of said first master slave D flip-flop 132, a third input connected to the Q output of said second master slave D flip-flop 134 and an output;

a second nand gate 146 having a first input connected to the not Q output of said first master slave D flip-flop 132, a second input connected to the not Q output of said second master slave D flip-flop 134, a third input connected to the not Q output of said third master slave D flip-flop 136 and an output;

a third nand gate 148 having a first input connected to the not Q output of said first master slave D flip-flop 132, a second input for receiving the shift decrement signal provided by said instruction decoding means, a third input connected to the not Q output of said third master slave D flip-flop 136 and an output;

a fourth nand gate 150 having a first input connected to the not Q output of said first master slave D flip-flop 132, a second input connected to the not Q output of said second master slave D flip-flop 134, a third input connected to the Q output of said third master slave flip-flop 136, a fourth input for receiving the branch signal provided by said instruction decoding means and an output;

a fifth nand gate 152 having a first input for receiving an externally generated wait signal, a second input and an output;

a sixth nand gate 138 having a first input connected to the output of said first nand gate 144, a second input connected to the output of said second nand gate 146, a third input connected to the output of said third nand gate 148, a fourth input connected to the output of said fourth nand gate 150, a fifth input connected to the output of said fifth nand gate 152 and an output connected to the data input of said first master slave D flip-flop 132 flip-flop;

a first invertor 196 having an input for receiving the branch signal provided by said instruction decoding circuit means and an output;

a second invertor 176 having an input for receiving the shift decrement signal provided by said instruction decoding means and an output;

a seventh nand gate 154 having a first input connected to the not Q output of said first master slave flip-flop 132, a second input for receiving the shift decrement signal provided by said instruction decoding means and an output;

an eighth nand gate 156 having a first input connected to the not Q output of said first master slave D flip-flop 132, a second input connected to the Q output of said second master slave D flip-flop 134 and an output;

a ninth nand gate 158 having a first input connected to the not Q output of said first master slave D flip-flop 132, a second input connected to the Q output of said third master slave D flip-flop 136 and an output;

a tenth nand gate 160 having a first input for receiving said externally generated wait signal, a second input and an output;

an eleventh nand gate 140 having a first input connected to the output of said seventh nand gate 154, a second input connected to the output of said eighth nand gate 156, a third input connected to the output of said ninth nand gate 158, a fourth input connected to the output of said tenth nand gate 160 and an output connected to the data input of said second master slave D flip-flop 134;

a twelfth nand gate 162 having a first input connected to the not Q output of said first master slave D flip-flop 132, a second input connected to the not Q output of said second master slave D flip-flop 134, a third input connected to the not Q output of said third master slave D flip-flop 136, a fourth input connected to the output of said second inverter 176, and an output;

a thirteenth nand gate 164 having a first input connected to the not Q output of said first master slave D flip-flop 132, a second input connected to the not Q output of said second master slave D flip-flop 134, a third input connected to the Q output of said third master slave D flip-flop 136, a fourth input connected to the output of said first invertor 196, and an output;

a fourteenth nand gate 142 having a first input connected to the output of said twelfth nand gate 162, a second input connected to the output of nand gate 164 and an output connected to the data input of said third master slave D flip-flop 136;

a first and gate 170 having a first input connected to the not Q output of said first master slave D flip-flop 132, a second input connected to the not Q output of said second master slave D flip-flop 134, a third input connected to the not Q output of said third master slave D flip-flop 136, and an output;

a second and gate 178 having a first input connected to the not Q output of said first master slave D flip-flop 132, a second input connected to the not Q output of said second master slave D flip-flop 134, a third input connected to the Q output of said third master slave D flip-flop 136, and an output;

a third and gate 182 having a first input connected to the not Q output of said first master slave D flip-flop 132, a second input connected to the Q output of said second master slave D flip-flop 134, a third input connected to the Q output of said third master slave D flip-flop 136, and an output;

a fourth and gate 186 having a first input connected to the not Q output of said first master slave D flip-flop 132, a second input connected to the Q output of said second master slave D flip-flop 134, a third input connected to the not Q output of said third master slave D flip-flop 136, and an output; and a fifth and gate 166 having a first input connected to the Q output of said first master slave D flip-flop 132, a second input connected to the Q output of said second master slave D flip-flop 134, and a third input connected to the not Q output of said third master slave D flip-flop 136, and an output connected to the second input of said fifth nand gate 152 and the second input of said tenth nand gate 160.

4. The binary decision apparatus of claim 3 further comprising:

an inverter 177 having an input for receiving said externally generated clock signal and an output;

a fifteenth nand gate 179 having a first input connected to the output of said inverter 177, a second input connected to the output of said first and gate 170 and an output;

a sixteenth nand gate 184 having a first input for receiving said externally generated clock signal, a second input connected to the output of said third and gate 182 and an output;

a seventeenth nand gate 194 having a first input connected to the output of said inverter 177, a second input connected to the output of said third and gate 182 and an output;

an eighteenth nand gate 180 having a first input connected to the output of said fifteenth nand gate 179, a second input connected to the output of said sixteenth nand gate 184, a third input connected to the output of said seventeenth nand gate 194 and an output connected to said program counter means;

a nineteenth nand gate 172 having a first input for receiving said externally generated clock signal, a second input connected to the output of said first and gate 170 and an output;

a twentieth nand gate 168 having a first input for receiving said conditional branch signal, a second input connected to the output of said second and gate 178, a third input connected to the output of said inverter 177 and an output;

a twenty first nand gate 174 having a first input connected to the output of said nineteenth nand gate 172, a second input connected to the output of said twentieth nand gate 168 and an output connected to the first latch of said memory buffer register means;

a twenty second nand gate 192 having a first input for receiving said not conditional branch signal, a second input connected to the output of said second and gate 178, a third input connected to the output of said inverter 177 and an output;

a twenty third nand gate 188 having a first input connected to the output of said fourth and gate 186, a second input for receiving said externally generated clock signal and an output;

a twenty fourth nand gate 190 having a first input connected to the output of said twenty second nand gate 192, a second input connected to the output of said twenty third nand gate 188 and an output connected to the second latch of said memory buffer register means; and a twenty fifth nand gate 175 having a first input connected to the output of first and gate 170, a second input connected to the output of said inverter 177 and an output connected to said instruction register means.

5. A binary decision apparatus for executing a plurality of program instructions, said binary decision apparatus comprising:

a programmed read only memory for providing each of said program instructions, each of said program instructions having a first byte of control bits;

memory buffer register means, connected to said programmed read only memory, for receiving and storing therein each of said program instructions, said memory buffer register means having a first latch and a second latch;

instruction register means, connected to said memory buffer register means, for receiving and storing therein the first byte of control bits of each of said program instructions;

instruction decoding means, connected to said instruction register means, for decoding the first byte of control bits of each of said program instructions to provide a plurality of digital input condition signals;

said digital input condition signals comprising a conditional branch signal, a not conditional branch signal, a shift decrement signal, and a branch signal;

machine cycle timing generating means, connected to said instruction decoding means, said instruction register means and said memory buffer register means, for receiving said digital input condition signals;

said machine cycle timing generating means, responsive to said digital input condition signals, providing a first state machine timing signal, a second state machine timing signal, a third state machine timing signal, a fourth state machine timing signal and a fifth state machine timing signal;

said machine cycle timing generating means providing at least said first state machine timing signal and said fifth state machine timing signal for each of said program instructions decoded by said instruction decoding means;

said first state machine timing signal having a logic one portion and a logic zero portion, the first byte of control bits of each of said program instructions being latched into said memory buffer register means during the logic one portion of said first state machine timing signal, the first byte of control bits of each of said program instructions being latched into said instruction register means during the logic zero portion of said first state machine timing signal and the first byte of control bits of each of said program instructions being decoded by said instruction decoding means during the logic zero portion of said first state machine timing signal;

each of said program instructions being executed by said binary decision apparatus during said fifth state machine timing signal;

program counter means, connected to said memory buffer register means, said programmed read only memory and said machine cycle timing generating means, for generating at least one address for each of said program instructions;

said program counter means supplying the at least one address for each of said program instructions to said programmed read only memory;

said programmed read only memory, responsive to the at least one address for each of said program instructions, providing each of said program instructions to said memory buffer register means;

a data bus for connecting said program counter means to said memory buffer register means; and input register means, connected to said data bus, for receiving and latching therein input digital data, said input digital data being latched into said input register means during said first state machine timing signal.

6. The binary decision apparatus of claim 5 wherein said machine cycle timing generating means comprises:

a first master slave D flip-flop 132 having a data input, a clock input, a Q output and a not Q output;

a second master slave D flip-flop 134 having a data input, a clock input, a Q output and a not Q output;

a third master slave D flip-flop 136 having a data input, a clock input, a Q output and a not Q output;

the clock input of said first master slave D flip-flop 132, the clock input of said second master slave D flip-flop 134 and the clock input of said third master slave D flip-flop 136 each being coupled to receive an externally generated clock signal;

a first nand gate 144 having a first input for receiving the not conditional branch signal provided by said instruction decoding means, a second input connected to the not Q output of said first master slave D flip-flop 132, a third input connected to the Q output of said second master slave D flip-flop 134 and an output;

a second nand gate 146 having a first input connected to the not Q output of said first master slave D flip-flop 132, a second input connected to the not Q output of said second master slave D flip-flop 134, a third input connected to the not Q output of said third master slave D flip-flop 136 and an output;

a third nand gate 148 having a first input connected to the not Q output of said first master slave D flip-flop 132, a second input for receiving the shift decrement signal provided by said instruction decoding means, a third input connected to the not Q output of said third master slave D flip-flop 136 and an output;

a fourth nand gate 150 having a first input connected to the not Q output of said first master slave D flip-flop 132, a second input connected to the not Q output of said second master slave D flip-flop 134, a third input connected to the Q output of said third master slave flip-flop 136, a fourth input for receiving the branch signal provided by said instruction decoding means and an output;

a fifth nand gate 152 having a first input for receiving an externally generated wait signal, a second input and an output;

a sixth nand gate 138 having a first input connected to the output of said first nand gate 144, a second input connected to the output of said second nand gate 146, a third input connected to the output of said third nand gate 148, a fourth input connected to the output of said fourth nand gate 150, a fifth input connected to the output of said fifth nand gate 152 and an output connected to the data input of said first master slave D flip-flop 132 flip-flop;

a first invertor 196 having an input for receiving the branch signal provided by said instruction decoding circuit means and an output;

a second invertor 176 having an input for receiving the shift decrement signal provided by said instruction decoding means and an output;

a seventh nand gate 154 having a first input connected to the not Q output of said first master slave flip-flop 132, a second input for receiving the shift decrement signal provided by said instruction decoding means and an output;

an eighth nand gate 156 having a first input connected to the not Q output of said first master slave D flip-flop 132, a second input connected to the Q output of said second master slave D flip-flop 134 and an output;

a ninth nand gate 158 having a first input connected to the not Q output of said first master slave D flip-flop 132, a second input connected to the Q output of said third master slave D flip-flop 136 and an output;

a tenth nand gate 160 having a first input for receiving said externally generated wait signal, a second input and an output;

an eleventh nand gate 140 having a first input connected to the output of said seventh nand gate 154, a second input connected to the output of said eighth nand gate 156, a third input connected to the output of said ninth nand gate 158, a fourth input connected to the output of said tenth nand gate 160 and an output connected to the data input of said second master slave D flip-flop 134;

a twelfth nand gate 162 having a first input connected to the not Q output of said first master slave D flip-flop 132, a second input connected to the not Q output of said second master slave D flip-flop 134, a third input connected to the not Q output of said third master slave D flip-flop 136, a fourth input connected to the output of said second inverter 176, and an output;

a thirteenth nand gate 164 having a first input connected to the not Q output of said first master slave D flip-flop 132, a second input connected to the not Q output of said second master slave D flip-flop 134, a third input connected to the Q output of said third master slave D flip-flop 136, a fourth input connected to the output of said first invertor 196, and an output;

a fourteenth nand gate 142 having a first input connected to the output of said twelfth nand gate 162, a second input connected to the output of nand gate 164 and an output connected to the data input of said third master slave D flip-flop 136;

a first and gate 170 having a first input connected to the not Q output of said first master slave D flip-flop 132, a second input connected to the not Q output of said second master slave D flip-flop 134, a third input connected to the not Q output of said third master slave D flip-flop 136, and an output;

a second and gate 178 having a first input connected to the not Q output of said first master slave D flip-flop 132, a second input connected to the not Q output of said second master slave D flip-flop 134, a third input connected to the Q output of said third master slave D flip-flop 136, and an output;

a third and gate 182 having a first input connected to the not Q output of said first master slave D flip-flop 132, a second input connected to the Q output of said second master slave D flip-flop 134, a third input connected to the Q output of said third master slave D flip-flop 136, and an output;

a fourth and gate 186 having a first input connected to the not Q output of said first master slave D flip-flop 132, a second input connected to the Q output of said second master slave D flip-flop 134, a third input connected to the not Q output of said third master slave D flip-flop 136, and an output; and a fifth and gate 166 having a first input connected to the Q output of said first master slave D flip-flop 132, a second input connected to the Q output of said second master slave D flip-flop 134, and a third input connected to the not Q output of said third master slave D flip-flop 136, and an output connected to the second input of said fifth nand gate 152 and the second input of said tenth nand gate 160.

7. The binary decision apparatus of claim 6 further comprising:

an inverter 177 having an input for receiving said externally generated clock signal and an output;

a fifteenth nand gate 179 having a first input connected to the output of said inverter 177, a second input connected to the output of said first and gate 170 and an output;

a sixteenth nand gate 184 having a first input for receiving said externally generated clock signal, a second input connected to the output of said third and gate 182 and an output;

a seventeenth nand gate 194 having a first input connected to the output of said inverter 177, a second input connected to the output of said third and gate 182 and an output;

an eighteenth nand gate 180 having a first input connected to the output of said fifteenth nand gate 179, a second input connected to the output of said sixteenth nand gate 184, a third input connected to the output of said seventeenth nand gate 194 and an output connected to said program counter means;

a nineteenth nand gate 172 having a first input for receiving said externally generated clock signal, a second input connected to the output of said first and gate 170 and an output;

a twentieth nand gate 168 having a first input for receiving said conditional branch signal, a second input connected to the output of said second and gate 178, a third input connected to the output of said inverter 177 and an output;

a twenty first nand gate 174 having a first input connected to the output of said nineteenth nand gate 172, a second input connected to the output of said twentieth nand gate 168 and an output connected to the first latch of said memory buffer register means;

a twenty second nand gate 192 having a first input for receiving said not conditional branch signal, a second input connected to the output of said second and gate 178, a third input connected to the output of said inverter 177 and an output;

a twenty third nand gate 188 having a first input connected to the output of said fourth and gate 186, a second input for receiving said externally generated clock signal and an output;

a twenty fourth nand gate 190 having a first input connected to the output of said twenty second nand gate 192, a second input connected to the output of said twenty third nand gate 188 and an output connected to the second latch of said memory buffer register means;

a twenty fifth nand gate 175 having a first input connected to the output of first and gate 170, a second input connected to the output of said inverter 177 and an output connected to said instruction register means.

8. The binary decision apparatus of claim 5 further comprising output register means, connected to said data bus, for providing output digital data, said output digital data being provided by said output register means during said fifth state machine timing signal.

9. The binary decision apparatus of claim 5 further comprising at least one general purpose register connected to said data bus, said at least one general purpose register being coupled to receive said input digital data from said input register means.

10. The binary decision apparatus of claim 5 further comprising at least one data counter connected to said data bus, said at least one data counter being coupled to receive said input digital data from said input register means.

11. The binary decision apparatus of claim 5 further comprising a transient register connected to said data bus, said transient register being coupled to receive said input digital data from said input register means.

* * * * *